United States Patent
Pollack et al.

(10) Patent No.: US 9,417,479 B2
(45) Date of Patent: Aug. 16, 2016

(54) METHOD FOR REDUCING SIMULTANEOUS CONTRAST ERROR

(71) Applicant: Samsung Display Co., Ltd., Yongin (KR)

(72) Inventors: Joel M. Pollack, San Jose, CA (US); Candice Hellen Brown Elliott, Santa Rosa, CA (US); Michael Francis Higgins, Duncans Mills, CA (US); Anthony Botzas, San Jose, CA (US)

(73) Assignee: Samsung Display Co., Ltd. (KR)

( * ) Notice: Subject to any disclaimer, the term of this patent is extended or adjusted under 35 U.S.C. 154(b) by 311 days.

(21) Appl. No.: 13/855,587

(22) Filed: Apr. 2, 2013

(65) Prior Publication Data
US 2013/0215360 A1 Aug. 22, 2013

Related U.S. Application Data

(63) Continuation-in-part of application No. 13/107,839, filed on May 13, 2011, now Pat. No. 9,153,200.

(51) Int. Cl.
*G09G 3/36* (2006.01)
*G09G 5/10* (2006.01)
*G02F 1/1335* (2006.01)
*G09G 3/34* (2006.01)
*G09G 5/02* (2006.01)

(52) U.S. Cl.
CPC ........ *G02F 1/133621* (2013.01); *G09G 3/3413* (2013.01); *G09G 3/3426* (2013.01); *G09G 3/3607* (2013.01); *G09G 5/02* (2013.01); *G09G 2300/0452* (2013.01); *G09G 2310/0235* (2013.01); *G09G 2320/0276* (2013.01); *G09G 2320/0646* (2013.01); *G09G 2330/021* (2013.01); *G09G 2340/0407* (2013.01); *G09G 2340/0457* (2013.01); *G09G 2340/06* (2013.01); *G09G 2360/16* (2013.01)

(58) Field of Classification Search
None
See application file for complete search history.

(56) References Cited

U.S. PATENT DOCUMENTS

| 7,847,805 B2* | 12/2010 | Ogasawara | G09G 3/2003 345/593 |
|---|---|---|---|
| 2002/0070914 A1* | 6/2002 | Bruning et al. | 345/102 |
| 2008/0238856 A1* | 10/2008 | Bhowmik et al. | 345/102 |
| 2009/0058876 A1* | 3/2009 | Wang et al. | 345/590 |
| 2009/0115803 A1* | 5/2009 | Langendijk et al. | 345/690 |
| 2010/0026705 A1* | 2/2010 | Im | G09G 5/02 345/590 |
| 2010/0128064 A1* | 5/2010 | Taylor et al. | 345/690 |
| 2012/0154451 A1* | 6/2012 | Kao et al. | 345/690 |

\* cited by examiner

*Primary Examiner* — Christopher R Lamb
(74) *Attorney, Agent, or Firm* — Innovation Counsel LLP

(57) ABSTRACT

Facilitating the display of an image in a display system comprising a display panel having sub-pixels, and a backlight having individually addressable colored light emitters configured to provide light to the sub-pixels. From received image data, sub-pixel color values corresponding to color values transmitted by respective ones of the sub-pixels for display of the image are determined. From the image data, backlight values corresponding to brightnesses of ones of the colored light emitters for display of the image are determined, as are a portion of the sub-pixel color values and a portion of the backlight values that collectively correspond to a saturated or near-saturated yellow color in the displayed image. The backlight values are adjusted by increasing an amount of yellow light to be emitted by emitters of the backlight, and the color values are adjusted by decreasing an amount of yellow light to be transmitted by the sub-pixels.

15 Claims, 31 Drawing Sheets

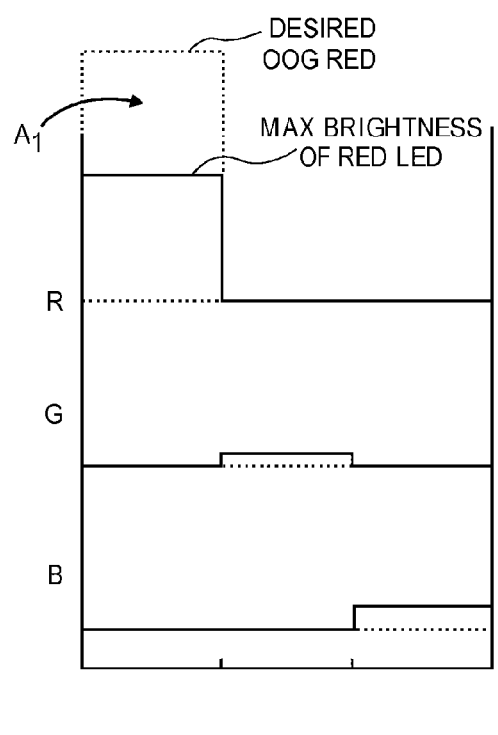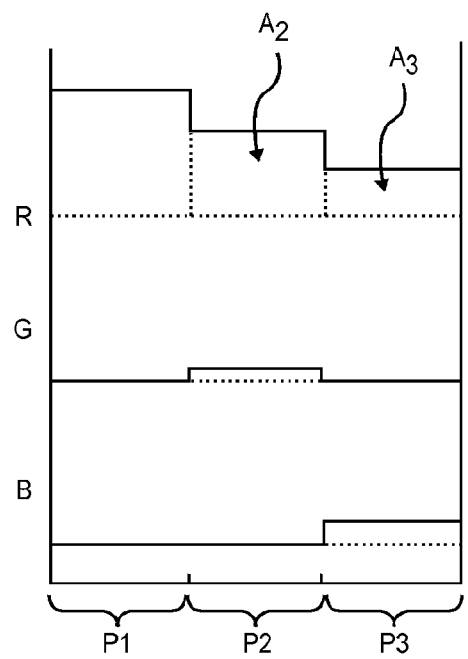
FIG. 19A  FIG. 19B

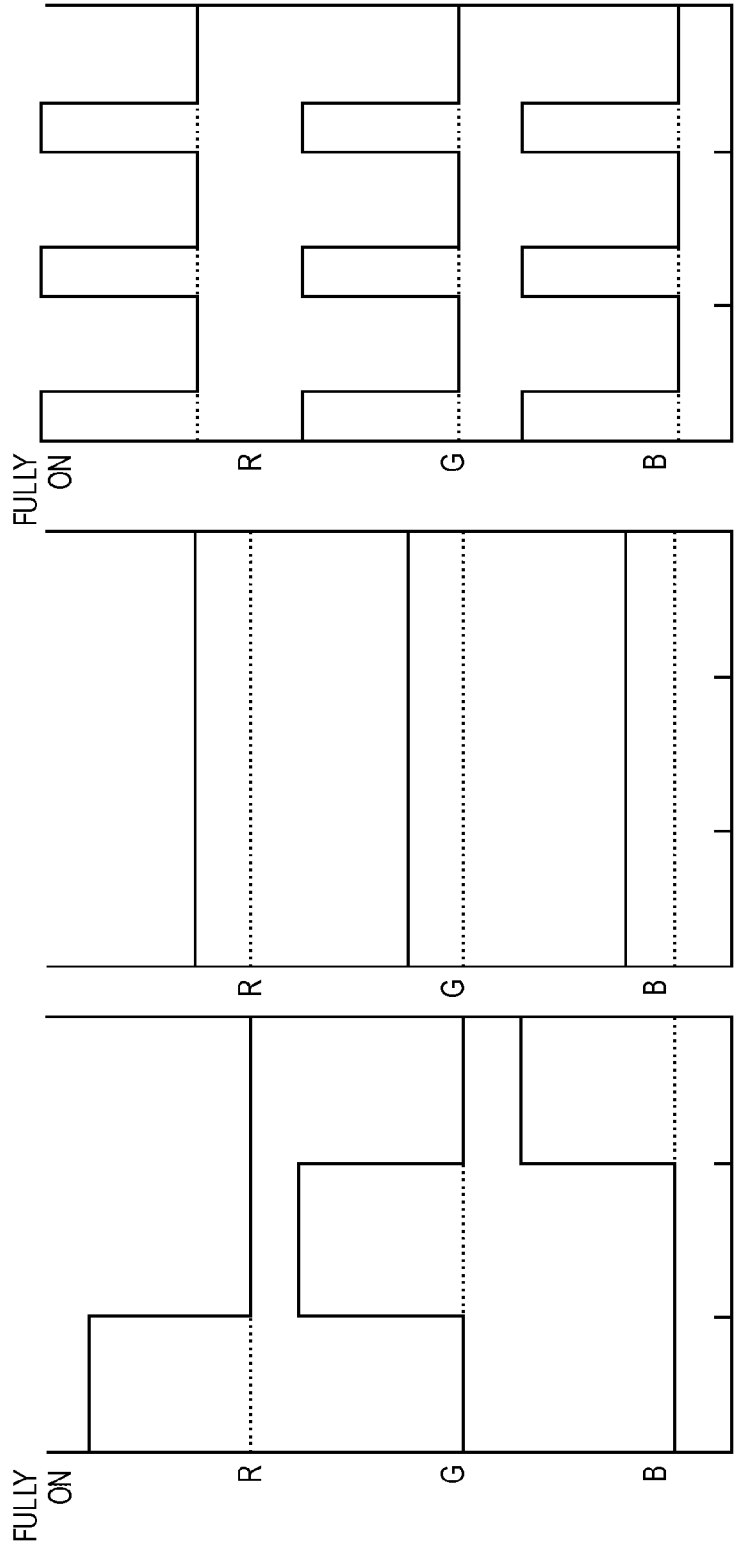

METHOD FOR REDUCING SIMULTANEOUS CONTRAST ERROR

This application is a continuation-in-part of U.S. patent application Ser. No. 13/107,839 filed on May 13, 2011 and entitled "Method for Selecting Backlight Color Values," the entire contents of which are herein incorporated by reference in their entirety and for all purposes.

BRIEF DESCRIPTION

Embodiments of the present invention relate generally to display systems. More specifically, embodiments of the present invention relate to methods for reducing simultaneous contrast error in display systems.

BACKGROUND

A display system with a light emitting component or source, referred to as a backlight, functions as a dynamic light modulation device that absorbs or transmits optical energy from the light emitting source in order to provide images for viewing by a user. A backlit liquid crystal display (LCD) device is an example of such a display system. The optical energy emitted by the light emitting source is the active source of light that creates the displayed image seen by a user viewing an image on the display panel of an LCD. In display systems that utilize color filters to produce the colors in an image, the typically relatively narrow band color filters subtract optical energy from the light emitted by the display system's light emitting source to create the appearance of colors. The color filters are disposed on the display panel to correspond to various sub-pixel layouts such as those described in the applications referenced above, including those illustrated in FIGS. 3 and 6-9 herein. It has been estimated that as little as four to ten percent (4-10%) of the illumination from a backlight source is actually emitted from the display as light viewed by the viewer of the image. In an LCD display, the TFT array and color filter substrate are typically the largest illumination barriers.

Arrays of light emitting diodes (LEDs) are used as light emitting sources in backlit display systems. U.S. Pat. No. 6,923,548 B2 discloses a backlight unit in a liquid crystal display that includes a plurality of lamps or chips arranged such that LED chips realizing R, G, and B colors are built in the respective lamps or chips. U.S. Pat. No. 6,923,548 B2 describes the backlight unit as realizing high brightness and providing a thin backlight unit. U.S. Pat. No. 7,002,547, which is hereby incorporated by reference herein, discloses a backlight control device for a transmissive type or for a transreflective type liquid crystal display equipped with LEDs as a backlight. The backlight control device includes an LED driving circuit connected to a power supply circuit for driving the LED, and a current control device that detects brightness around the liquid crystal display for controlling the driving current for the LED according to the detected brightness. Hideyo Ohtsuki et al., in a paper entitled "18.1-inch XGA TFT-LCD with wide color reproduction using high power led-backlighting," published in the Proc. of the Society for Information Display International Symposium, in 2002, disclose an 18.1 inch XGA TFT-LCD module using an LED-backlighting unit. Ohtsuki et al. disclose that a side-edge type backlight is applied and two LED strips are located on the top and bottom edges of a light-pipe. Each LED strip arranges multiple red, green and blue LEDs. The lights from the red, green and blue LEDs are mixed and injected into the light-pipe. The brightness of the red, green and blue LEDs can be dimmed independently by a control circuit. Ohtsuki et al. disclose that the color-filter of this LCD panel is well-tuned to get higher color saturation.

U.S. Pat. No. 6,608,614 B1 entitled "Led-based LCD backlight with extended color space" discloses a backlight for a liquid-crystal display that includes a first LED array that provides light with a first chromaticity and a second LED array that provides light with a second chromaticity. A combining element combines the light from the first LED array and the second LED array and directs the combined light toward the liquid crystal display. A control system is operationally connected to the second LED array. The controller adjusts the brightness of at least one LED in the second LED array to thereby adjust the chromaticity of the combined light.

US 2005/0162737 A1 (hereafter, "the '737 publication)", entitled "High Dynamic Range Display Devices," discloses a display having a screen which incorporates a light modulator and which is illuminated with light from a light source comprising an array of controllable light-emitters. The controllable-emitters and elements of the light modulator may be controlled to adjust the intensity of light emanating from corresponding areas on the screen. FIG. 15 shows a section through a display 60 in which a rear-projection screen 53 comprising a diffusing layer 22 is illuminated by an array 50 of LEDs 52. The brightness of each LED 52 is controlled by a controller 39. Screen 53 includes a light modulator 20. The rear face of light modulator 20 is illuminated by LED array 50. FIG. 14 is a schematic front view of a portion of display 60 for a case where controllable elements (pixels) 42 of light modulator 20 correspond to each LED 52. Each of the controllable elements 42 may comprise a plurality of colored sub-pixels. The '737 publication discloses that LEDs 52 may be arranged in any suitable manner, and shows two likely arrangements of LEDs 52 as being rectangular and hexagonal arrays. A diffuser 22A in conjunction with the light-emitting characteristics of LEDs 52 causes the variation in intensity of light from LEDs 52 over the rear face of light modulator 20 to be smooth. The '737 publication further discloses that light modulator 20 may be a monochrome light modulator, or a high resolution color light modulator. Light modulator 20 may comprise, for example, a LCD array. The '737 publication discloses that display 60 can be quite thin. For example, display 60 may be 10 centimeters or less in thickness. US 2005/0162737 A1 is hereby incorporated by reference herein.

BRIEF DESCRIPTION OF THE DRAWINGS

The organization and methods of operation of the display systems and techniques disclosed herein are best understood from the following description of several illustrated embodiments when read in connection with the following drawings in which the same reference numbers are used throughout the drawings to refer to the same or like parts:

FIGS. 19A and 19B are diagrammatical representations of the two methods of reconstructing a given color by the system shown in FIG. 18.

FIGS. 20A, 20B, and 20C are diagrammatical representations of methods of using virtual primaries.

Figure 1A:
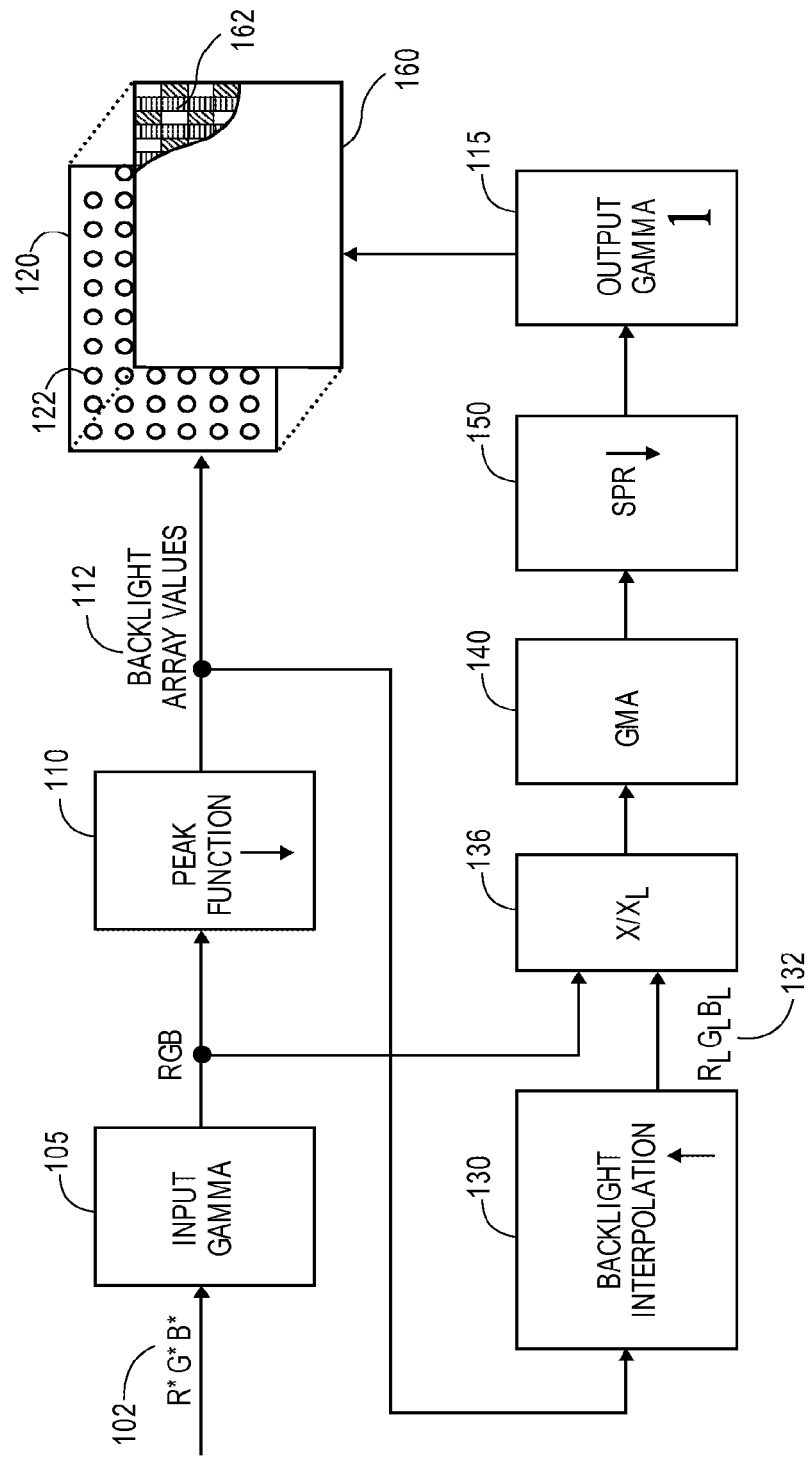
FIG. 1A is a block diagram of selected components of a first embodiment of a multi-primary display system with a first backlight array of multi-color light emitters.

The various Figures are not necessarily to scale.

SUMMARY

The invention can be implemented in a number of ways, including as a method and as a non-transitory, computer-readable memory.

In one embodiment, a method of facilitating the display of an image comprises, in a display system comprising a display panel having sub-pixels and a backlight having individually addressable colored light emitters configured to provide light to the sub-pixels of the display panel, receiving image data corresponding to an image for display upon the display panel, the sub-pixels each having a color to be displayed. From the image data, sub-pixel color values corresponding to color values transmitted by respective ones of the sub-pixels for display of the image are determined. From the image data, backlight values corresponding to brightnesses of ones of the colored light emitters for display of the image are determined, as are a portion of the sub-pixel color values and a portion of the backlight values that collectively correspond to a saturated or near-saturated yellow color in the displayed image. The backlight values are adjusted by increasing an amount of yellow light to be emitted by emitters of the backlight, and the color values are adjusted by decreasing an amount of yellow light to be transmitted by the sub-pixels of the display panel.

Such method can also include displaying the image using the adjusted backlight values and the adjusted color values. Additionally, an amount of yellow light added by the increasing can be at least approximately equal to an amount of yellow light reduced by the decreasing.

The adjusting backlight values can further comprise increasing an amount of red light to be emitted by red emitters from among the emitters of the backlight, and increasing an amount of green light to be emitted by green emitters from among the emitters of the backlight. The adjusting color values can further comprise decreasing an amount of red light to be transmitted by red sub-pixels of the sub-pixels of the display panel, and decreasing an amount of green light to be transmitted by green sub-pixels of the sub-pixels of the display panel. The adjusting backlight values can further comprise increasing an amount of yellow light so as to increase an amount of yellow light transmitted through white sub-pixels of the sub-pixels of the display panel.

The colored light emitters may include emitters of multiple different colors. In particular, the colored light emitters can include red, green, blue, and white color emitters.

In another embodiment, a method of reducing simultaneous contrast error in a displayed image can comprise: in a display system comprising a display panel having colored sub-pixels and white sub-pixels, and a backlight having individually addressable colored light emitters configured to provide light to the sub-pixels of the display panel, receiving image data corresponding to an image for display upon the display panel. The method may also include detecting a region of a saturated or near-saturated color in the image. The method may further include increasing an amount of the color to be emitted by the emitters of the backlight, so as to increase an amount of the color to be transmitted by the white sub-pixels of the display panel. Additionally, the method may include decreasing an amount of the color to be transmitted by the colored sub-pixels of the display panel, so as to compensate for the increased amount of the color to be transmitted by the white sub-pixels of the display panel.

The method may include, after the increasing and the decreasing, displaying the image. An amount of the color added by the increasing may be at least approximately equal to an amount of the color reduced by the decreasing. This color may be a yellow color.

The increasing can further comprise increasing an amount of red light to be emitted by red emitters from among the emitters of the backlight, and increasing an amount of green light to be emitted by green emitters from among the emitters of the backlight. The decreasing may further comprise decreasing an amount of red light to be transmitted by red sub-pixels of the display panel, and decreasing an amount of green light to be transmitted by green sub-pixels of the display panel.

In another embodiment, one or more non-transitory, computer-readable memories store instructions for executing a method of reducing simultaneous contrast error in a displayed image. The method includes, in a display system comprising a display panel having colored sub-pixels and white sub-pixels, and a backlight having individually addressable colored light emitters configured to provide light to the sub-pixels of the display panel, receiving image data corresponding to an image for display upon the display panel. The method also includes detecting a region of a saturated or near-saturated color in the image, and increasing an amount of the color to be emitted by the emitters of the backlight, so as to increase an amount of the color to be transmitted by the white sub-pixels of the display panel. The method further includes decreasing an amount of the color to be transmitted by the colored sub-pixels of the display panel, so as to compensate for the increased amount of the color to be transmitted by the white sub-pixels of the display panel.

In the method, the increasing may further comprise increasing an amount of the color to be emitted by emitters of multiple different colors. The increasing may also further comprise increasing an amount of the color to be emitted by red, green, blue, and white color emitters.

Other aspects and advantages of the invention will become apparent from the following detailed description taken in conjunction with the accompanying drawings which illustrate, by way of example, the principles of the invention.

DETAILED DESCRIPTION

The use of an array of light emitters, such as light emitting diodes (LED), as a backlight in a subpixelated display system generally provides higher purity color points that can be filtered for reasonably high color purity on the display when compared to other backlight technologies. However, since contrast is not infinite (i.e., the black level is not perfectly black) in some types of display panels (e.g., LCDs), there is typically some bleed of color from the off-state subpixels that will limit the saturation of the color. In addition, the color filters themselves may not have good color purity, and may allow some unwanted light to pass through from other colored light emitters. In a display system in which the individual light emitters disposed in a backlight array can be independently addressed, adjustment of the color of the backlight is possible. This ability to adjust the color of the backlight provides an additional degree of freedom that may be used to increase the dynamic range and color purity of the display. It may also increase the effectiveness of the subpixel rendering methods by optimizing the spread of luminance information on the display panel subpixels with the color temperature, either globally or locally, of the light emitted from the backlight array.

The discussion proceeds now to an overview of the components of the display system, followed by a description of techniques for controlling the backlight array, and concluding with a discussion of techniques for implementing backlight control that show the interaction among aspects of the human vision system, the colors in the particular image being displayed and the particular subpixel layout of the display panel.

In the discussion that follows, a display system includes a display panel on which color images are formed by combining the individual colors disposed on a color filter substrate in an arrangement, or layout, referred to as a subpixel repeating group. The term "primary color" refers to each of the colors that occur in the subpixel repeating group. When a subpixel repeating group is repeated across a display panel to form a device with the desired matrix resolution, the display panel is said to be substantially comprised of the subpixel repeating group. In this discussion, a display panel is described as "substantially" comprising a subpixel repeating group because it is understood that size and/or manufacturing factors or constraints of the display panel may result in panels in which the subpixel repeating group is incomplete at one or more of the panel edges. By way of example, a display panel substantially comprised of a subpixel repeating group of red, green and blue (RGB) colors disposed on the color filter substrate in vertical columns (i.e., the conventional RGB stripe configuration) has three primary colors of red, green and blue, while a display panel substantially comprising subpixel repeating group 801 of FIG. 8 including magenta subpixels 809, and green subpixels 808 has two primary colors of magenta and green. Reference to display systems using more than three primary subpixel colors to form color images are referred to as "multi-primary" display systems. In a display panel having a subpixel repeating group that includes a white (clear) subpixel, the white subpixel represents a primary color referred to as white (W) or "clear", and so a display system with a display panel having a subpixel repeating group including RGBW subpixels is a multi-primary display system.

The term "emitter" is sometimes used in earlier ones of the above-referenced patent applications to refer to an individual subpixel of a particular color. In the discussion herein, "light emitter" refers to a light source disposed in the backlight array of the display system. The term "backlight-controlled (BC) primary color" or "Variable Primary" refers to the color of the light that passes through a white (W) subpixel that is produced by one or more light emitters in an array of light emitters functioning as a backlight in the display system.

First Embodiment of a Display System

Figure 3:
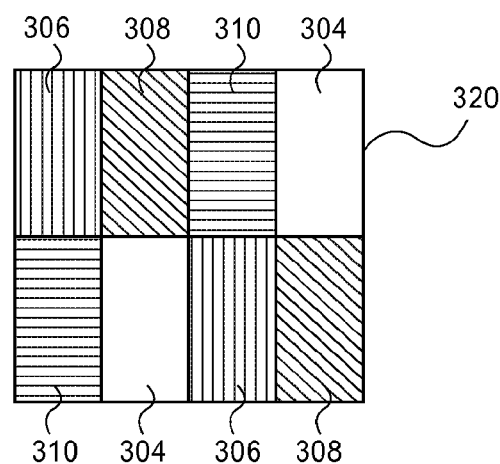
FIG. 3 shows an eight subpixel repeating group for a four color display panel.
Figure 6:
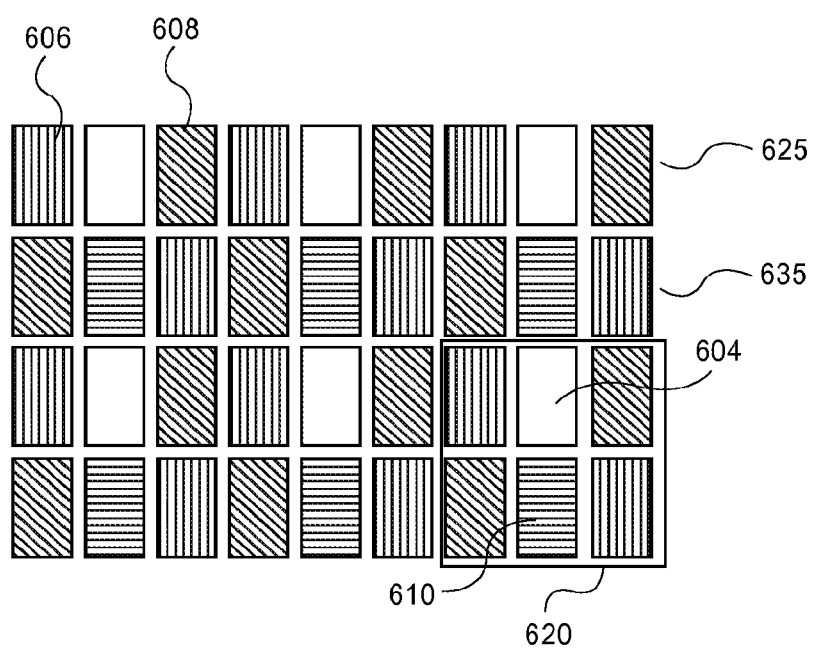
FIG. 6 shows a portion of a four color display panel that includes a six subpixel repeating group.

FIG. 1A is a block diagram of an exemplary display system 100 having a spatial light modulator panel 160 for producing images. Panel 160 is a subpixelated display panel substantially comprising a subpixel repeating group 162 as shown, for example in any one of FIGS. 3, 6, 7, 8 and 9. FIG. 3 illustrates a subpixel repeating group 320 suitable for use on panel 160. Subpixel repeating group 320 includes red subpixels 306, green subpixels 308, blue subpixels 310, and white (i.e., clear, with no color filter) subpixels 304. Many other variations of RGBW subpixel repeating group 320 are possible, as described in U.S. Pat. Nos. 7,876,341 "Subpixel layouts for high brightness displays and systems" and 7,583,279 "Subpixel layouts and arrangements for high brightness displays". For example, subpixel repeating group 620 of FIG. 6 comprises two red subpixels 606 and two green subpixels 608 on a checkerboard with white subpixel 604 and blue subpixel 610 between them. Note that in the figures showing subpixel repeating groups or portions of display panels showing subpixel layouts, the hatching lines used to represent the subpixel colors are used consistently across all figures.

Figure 7:
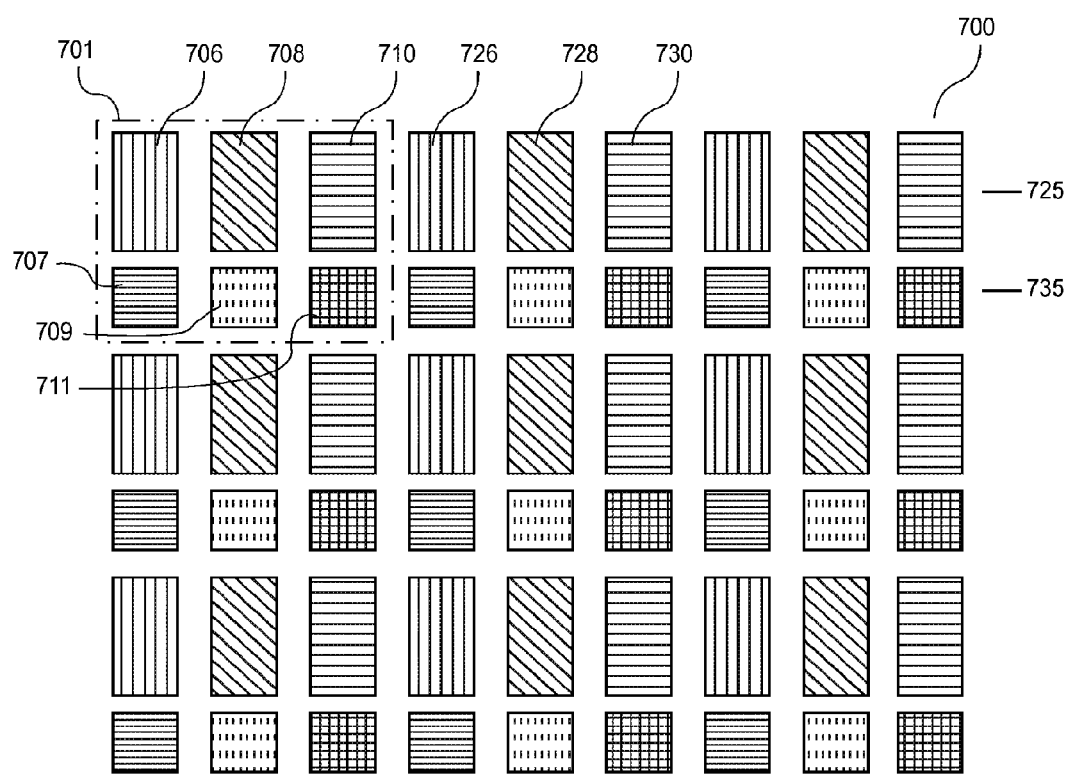
FIG. 7 shows a portion of a six color display panel that includes a six subpixel repeating group.
Figure 9:
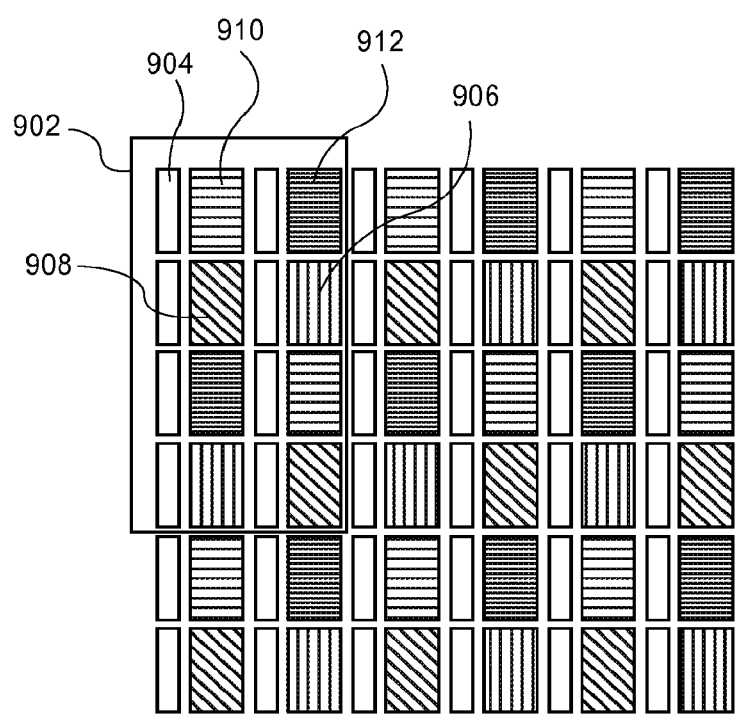
FIG. 9 shows a portion of a display panel that includes a sixteen subpixel repeating group using rectangular subpixels in five colors.

It is understood that the techniques disclosed for controlling the backlight of the display system as described below apply equally to display systems having different, fewer, or more colors than the RGBW subpixel repeating group of FIG. 3. For example, FIG. 7 illustrates portion 700 of a six-color display panel having subpixel repeating group 701 comprising red subpixels 706, green subpixels 708, large blue subpixels 710, cyan subpixels 707 (shown in finer horizontal hatching lines than the blue subpixels in these figures), magenta subpixels 709, and yellow subpixels 711. FIG. 9 illustrates a portion of a five-color subpixelated display panel substantially comprising subpixel repeating group 902 having sixteen (16) subpixels of red subpixels 906, green subpixels 908, blue subpixels 910, and cyan subpixels 912 with white subpixels interspersed.

Figure 8:
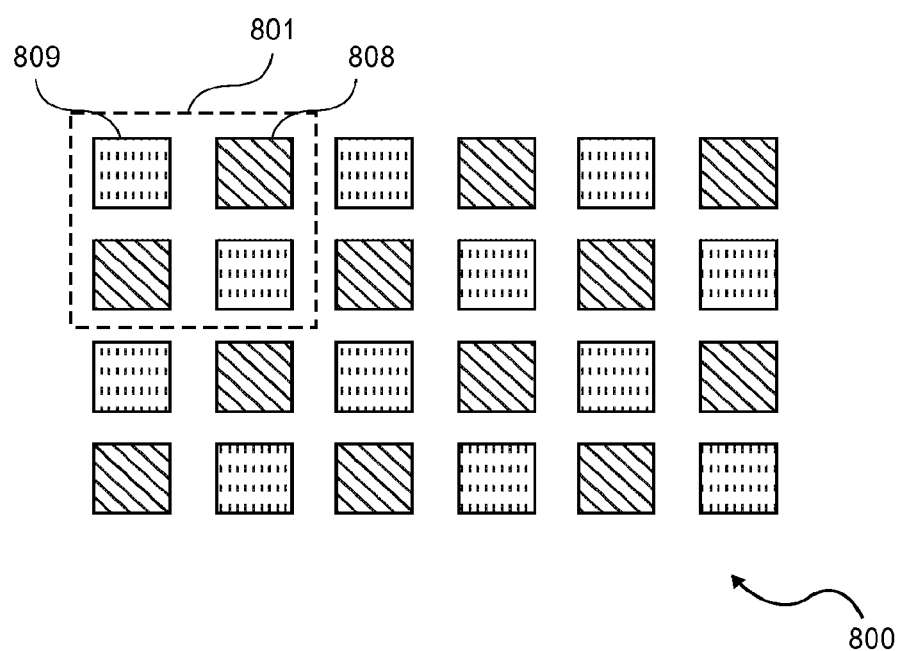
FIG. 8 shows a portion of a display panel that includes a two subpixel repeating group using square subpixels in two colors.

It is also to be understood that the techniques disclosed for utilizing the backlight of the display system as described below apply equally to display systems having as few as two primary colors. For example, FIG. 8 illustrates portion 800 of a two-color display panel having subpixel repeating group 801 comprising magenta subpixels 809, and green subpixels 808. Display panel 160 of FIG. 1A may substantially comprise subpixel repeating group 801.

With reference again to FIG. 1A, exemplary display system 100 further includes an array 120 of light emitting sources 122 used as a backlight for panel 160. Array 120 may be comprised of light emitters 122 in different colors, each of the emitters being independently addressable under electronic control such that the control of each individual color may be completely separated from control of each of the other colors in array 120. The array 120 of light emitting sources may comprise light emitting diodes (LEDs) or other types of light emitters that are capable of being independently addressable and controlled. For example, a color flat panel display of any type may be used, such as a second LCD, an Organic Light Emitting Display (OLED), Carbon NanoTube Field Emission Display (CNT), Plasma Display Panel (PDP), a Rear Projection Television (RPTV and the like), or even a Cathode Ray Tube (CRT).

Figure 4:
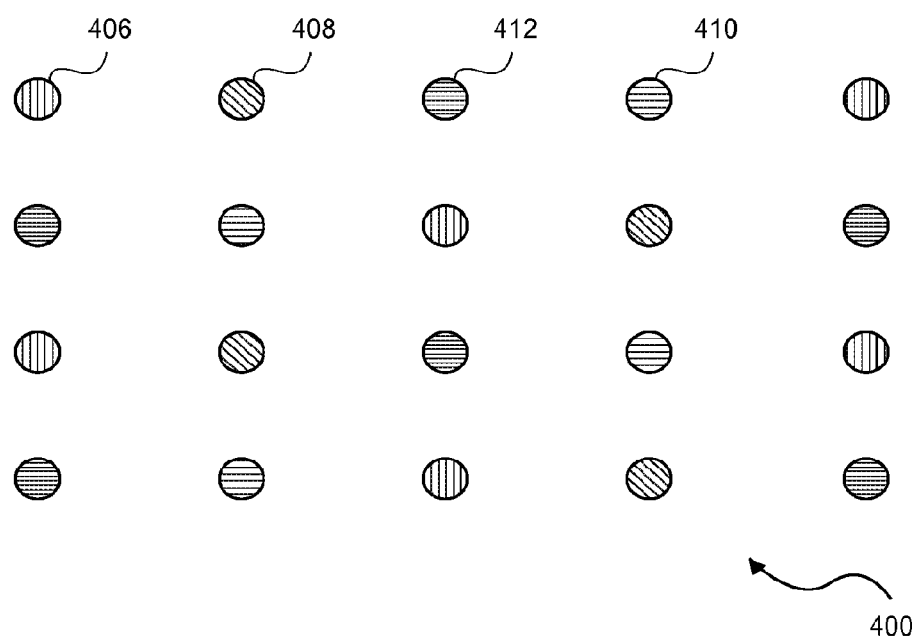
FIG. 4 shows a portion of a backlight array having light emitters in three colors.
Figure 5:
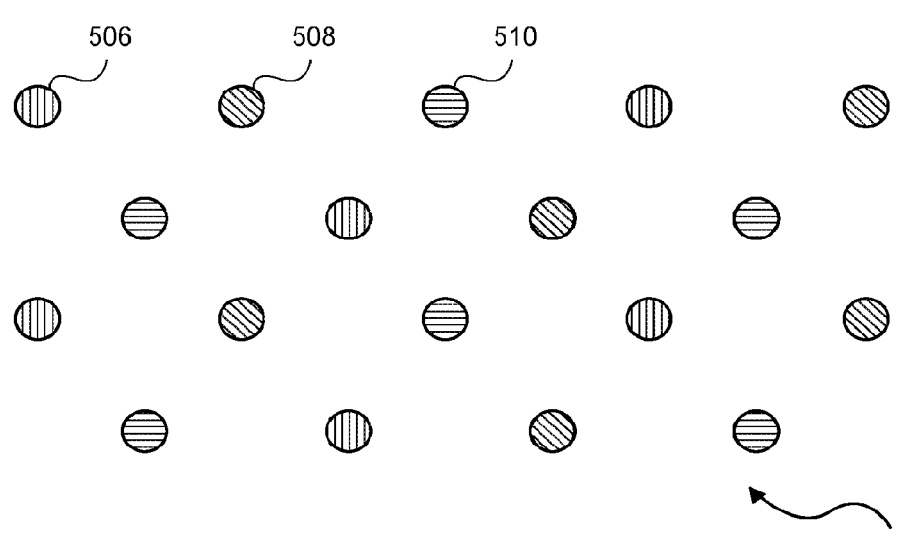
FIG. 5 shows a portion of a backlight array having light emitters in four colors.

FIGS. 4 and 5 illustrate portions of two layouts for array 120 of light emitters that may be useful as backlights. FIG. 5 shows a portion of an offset, or hexagonal, array 500 of red 506, green 508, and blue 510 (RGB) light emitters. Light emitter array 500 is suitable for use as a backlight for an RGB display panel, and is also suitable for use as a backlight for an RGBW panel having a subpixel arrangement of the type illustrated in FIG. 3 or 6, or according to any one of the various RGBW layouts illustrated and described in U.S. Pat. Nos. 7,876,341 and 7,583,279 referenced above.

FIG. 4 shows a portion of a rectangular array 400 of red 406, green 408, blue 410, and cyan 412 light emitters, referenced hereafter as RGBC light emitters. Cyan may also be referred to as the color emerald. Light emitter array 400 is suitable for use as a backlight for a display panel substantially comprised of an RGBC subpixel repeating group, or for a display panel substantially comprised of an RGBCW subpixel repeating group such as, for example, subpixel repeating group 902 of FIG. 9. Light emitter array 400 with four different colors of light emitters is also suitable for use as a backlight for a display panel substantially comprised of an RGBW subpixel repeating group; when so used, light emitter array 400 allows the substantially green subpixel to shift to being substantially cyan (or emerald) if the pass band of the green subpixel includes both the green and cyan emitter emission wavelengths.

While the portions of light emitter arrays 400 and 500 illustrated in FIGS. 4 and 5 by way of example have rectangular and hexagonal arrangements of light emitters, respectively, it is understood that other arrangements are possible and suitable for implementing the backlight control techniques described in more detail below. All such possible and suitable layouts are contemplated as being included in the implementation of the backlight control techniques discussed herein. Additional discussion follows below about the interactions among the light emitters, the colors in the image being displayed and the particular subpixel layout of the display panel. Information about the resolution of array 120 of light emitting sources (FIG. 1) is deferred to that discussion.

With reference again to FIG. 1A, display system 100 illustrates two data paths for input RGB image data 102. The first RGB image data path includes input gamma (linearization) module 105, gamut mapping (GMA) function 140, subpixel rendering (SPR) module 150, and output inverse gamma module 115, producing output image data for display on panel 160. In display systems described in various ones of the co-owned applications noted and incorporated by reference above, the GMA function transforms input color data specified in RGB primaries to a multi-primary target color space, such as, for example, RGBW. The output of the GMA function is a set of input image color values in RGBW color space, with a luminance, L, component identified. For information about the operation of gamut mapping functions in general, see, for example, U.S. Pat. No. 7,728,846 "Method and apparatus for converting from source color space to RGBW target color space", U.S. Pat. Nos. 7,893,944 "Gamut mapping and subpixel rendering systems and methods", and 7,864,188 "Systems and methods for selecting a white point for image displays".

In display system 100, GMA function 140 generates a requantized image for display on panel 160 using the output of the function designated "$X/X_L$" in box 136, which in turn receives the input RGB image values from input gamma operation 105 as well as input values labeled $R_L G_L B_L$ produced by Backlight Interpolation function 130. The Backlight Interpolation function 130 and $X/X_L$ function 136 are described in further detail below. GMA function 140 may utilize any of the gamut mapping processes disclosed in the above references or otherwise known in the art or yet to be discovered. In the case of a display system producing images on a display panel having an RGBW subpixel repeating group, GMA function 140 utilizes an RGB to RGBW process.

With continued reference to the first data path in FIG. 1A, the set of gamut-mapped input image color values (e.g., RGBWL) produced by GMA function 140 is then input to subpixel rendering function 150. For information about the operation of SPR function 150, see, for example, U.S. Pat. No. 7,920,154 "Subpixel rendering filters for high brightness subpixel layouts" and in U.S. Pat. No. 7,787,702 "Multiprimary color subpixel rendering with metameric filtering". Note that the downward arrow in box 150 of FIG. 1A signifies that the SPR function here is performing a down sampling function, there being fewer color subpixels in the display than the number of color samples from the GMA function. The output values (e.g., RGBW) of SPR function 150 are then input to output gamma function 115 which produces output image data values for display on panel 160.

Backlight Control Functions

With continued reference to FIG. 1A, RGB input data 102 in display system 100 also proceeds along a second data path that integrates the operation of backlight array 120 of light emitters into the ultimate display of the output image. The second data path includes Peak Function block 110, which computes values for individual light emitters in array 120. Backlight Interpolation Function 130 uses the values of the light emitters to compute the distribution of light of each color at each pixel overlying light emitter array 120. The output of Backlight Interpolation Function 130, designated as $R_L G_L B_L$ in FIG. 1A, is, in effect, a filtered version of the RGB input image data that approximates the distribution of light from light emitter array 120. Each of these functions 110 and 130 will now be described in more detail.

Peak Function block 110 determines the values for light emitters in array 120 using RGB input image data 102. An example of a simple implementation of Peak Function 110 may be Max($V_{PSF}$). This sets the value, V, of the light emitter of a given color to be equal to the maximum (peak) value of that color channel in the original input image (after any gamma pre-conditioning performed in input gamma module 105) in the local area of the light emitter's Point Spread Function (PSF) support. The method used in Peak Function block 110 may be a form of down sampling (indicated by the downward arrow in block 110 in FIG. 1A) whose output values for a given light emitter are the peak values of the input image data in an area bounded by the neighboring light emitters of the same color.

Figure 11:
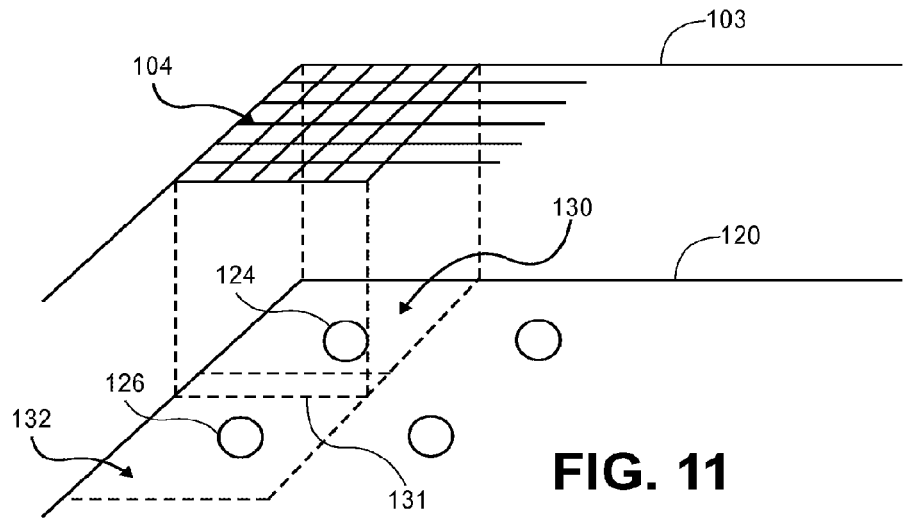
FIG. 11 is a diagrammatic representation illustrating the use of the input image data to determine the value of a light emitter in the backlight array.

FIG. 11 is a simplified diagram illustrating the interaction of the light emitters and the input image data in display system 100. FIG. 11 shows a portion of array 120 of light emitters, including light emitters 124 and 126. A diagrammatic representation 103 of RGB input image data 102 of FIG. 1A (after being processed by input gamma function 105) shows the input image data arranged in an array of input color values overlying array 120 of light emitters. The point spread function of light emitter 124 indicates a coverage area 130 of the light from light emitter 124, shown in dashed lines and bounded by line 131, which corresponds to an image portion 104 of the input image color data as represented in diagrammatic representation 103. Light from light emitter 124 has to have an illumination level sufficient to provide light for the brightest input color data value in image portion 104. The point spread function of light emitter 124 overlaps with the point spread function of light emitter 126, as shown by the dashed lines of the two areas 130 and 132, and thus some of the input image color values used to determine the value of light emitter 124 are also used to determine the value of light emitter 126.

Table 1 provides an example of a Peak Function, called "dopeak," in pseudo code that uses the maximum value of the input image region to determine the value for one light emitter. For simplicity of illustration, this peak function makes the assumptions that the output display panel has a resolution of 8 times that of the backlight array, that the backlight array includes red, green and blue light emitters disposed in a rectangular (or square) array, and that the red, green and blue light emitters are coincident.

TABLE 1

| Pseudo-Code for Peak Function, "dopeak" |
| --- |
| function dopeak (x,y)　　　　--build backlight image<br>　　local r,g,b<br>　　local Rp,Gp, Bp = 0,0,0<br>　　local i, j<br>　　for i=0, 15 do　　　　--find the peak value<br>　　　　for j=0,15 do<br>　　　　　　r,g,b = spr.fetch("ingam",x*8+1−4,y*8+j−4)<br>　　　　　　Rp = math.max(Rp,r)<br>　　　　　　Gp = math.max(Gp,g)<br>　　　　　　Bp = math.max(Bp,b)<br>　　　　end<br>　　end<br>　　spr.store("led",x,y,Rp,Gp,Bp)<br>end |

Those skilled in the art will appreciate that other, more sophisticated down sampling methods may also be employed, such as those based on a sync or windowed sync function, or other functions known in the art or yet to be discovered. All such possible down sampling functions are contemplated as being suitable for the backlight control techniques disclosed herein.

In Table 1, the spr.fetch function represents the fetching or arrival of data from the previous step, for example from input gamma module 105 of FIG. 1A. The spr.store function represents storing or passing data on to the next step, such as backlight array values 112 being stored in LED array 122. Note that the pseudo code in table 1 may fetch the input values in "random access" mode which may ultimately result in fetching each value several times while storing each output value in order. This may be an appropriate technique for implementations in software. In hardware, it may use fewer gates to process the inputs in order as they arrive, holding them in input line buffers until enough are available to calculate output values. Alternately, it may use fewer gates to process the inputs in the order they arrive while storing intermediate output results in output line buffers until they are complete.

The output of Peak Function 110 is a value for each light emitter in array 120 indicating the illumination level of the light emitter. These light emitter values are input to a backlight array controller (not shown) for subsequent illumination of backlight array 120 when the output image is displayed on panel 160.

Figure 12:
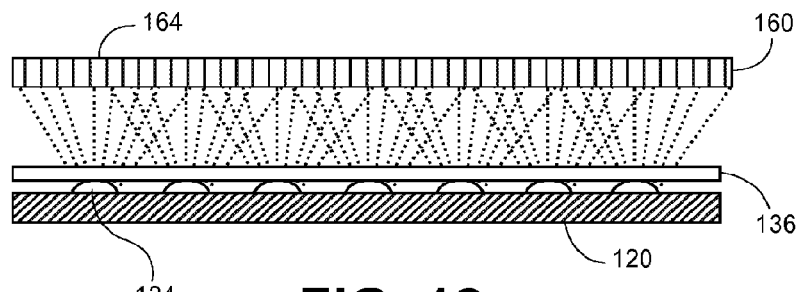
FIG. 12 is a diagrammatic representation illustrating the operation of the backlight interpolation function to produce a low resolution image from the light from the light emitters in the backlight array.
Figure 15:
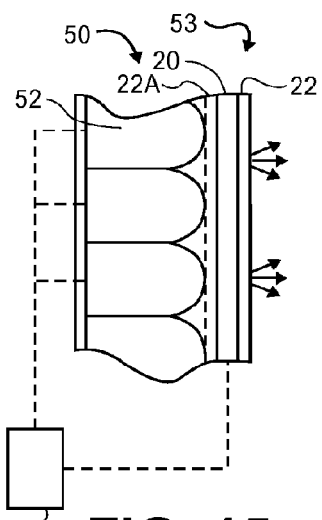
FIG. 15 is a schematic front view of a portion of the prior art display of FIG. 14 for a case where controllable elements (pixels) of the light modulator correspond to each LED.
Figure 14:
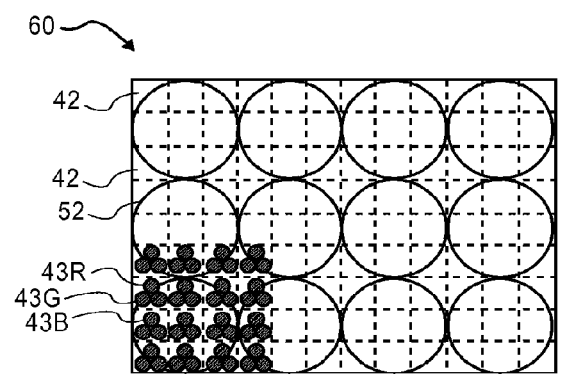
FIG. 14 is a portion of a prior art display in which a rear-projection screen comprising a diffusing layer is illuminated by an array of light emitting diodes (LEDs)

FIG. 12 is a simplified diagrammatic representation illustrating the interaction of the light emitters and the output image data in display system 100. Backlight Interpolation Function 130 uses the value of each light emitter 124 in backlight array 120, as established in Peak Function block 110, to calculate the distribution of light of each color at each output pixel 164 in display panel 160 overlying light emitter 124. This distribution is interpolated from the values of the light emitters established in Peak Function block 110, taking into account the point spread function (PSF) of each light emitter 124 in array 120 and the presence of diffusers 136 and other optical components. This operation is an "up sampling" function, as indicated by the up arrow, and many possible "up sampling" functions may be suitable. One such function is a summation of the point sample contribution of the PSFs of the local light emitters times their values computed by the down sampling Peak function 110.

Table 2 provides pseudo-code for a backlight interpolation function called "dointerp." This function fetches from a memory area called "ledbuf" (LED buffer) and writes to memory area for storing output color values called "fuzbuf." The function "dointerp" is called once for each input pixel and calculates the effect of all the surrounding backlight point spread functions to produce the color value that would be seen under the input (logical) pixel. The "dointerp" function uses a point spread function for each light emitter that assumes that each pixel can only be affected by the surrounding four light emitters.

Backlight Interpolation function 130 (i.e., the $R_L G_L B_L$ data values.) This modification is accomplished in $X/X_L$ function 136 by the ratio, $X/X_L$, where X is the incoming value of R, G, or B. and $X_L$ is the backlight brightness value at that pixel of $R_L$, $G_L$, or $B_L$. Thus, a given RGB to RGBW gamut mapping process may have the input value $R/R_L$, $G/G_L$, $B/B_L$. Those of skill in the art will appreciate that the use of $X/X_L$ function 136 allows for an "off-the-shelf" GMA function to be utilized (e.g., any of the gamut mapping functions disclosed in the above-referenced applications), without a modification needed to accommodate the light contributions of the light emitters in backlight array 120.

Note that backlight control methods and techniques described herein may also be combined with frame or field

TABLE 2

Pseudo-Code for Backlight Interpolation Function, "dointerp"

```
function dointerp(x,y)              --build the effective backlight image
   local xb,yb = math.floor(x/8),math.floor(y/8)     --position of a nearby
                                                    -- backlight
   local xd,yd = spr.band(x,7),spr.band(y,7)    --distance to a nearby LED center
   local r,g,b                      --color of the backlight centers
   local rs,gs,bs=0,0,0             --sum of the overlapping backlight point spread functions
   local psf                        --point spread function for current pixel and LED
   r,g,b = spr.fetch(ledbuf,xb-1,yb-1)       --get LED center color
   psf = math.floor(spread[xd]*spread[yd]/4096)     --calculate point spread
                                                   --function here
   rs = rs + r*psf                  --sum upper left LED
   gs = gs + g*psf
   bs = bs + b*psf
   r,g,b = spr.fetch(ledbuf,xb,yb-1)         --color of upper right LED
   psf = math.floor(spread[7-xd]*spread[yd]/4096) --PSF for this led and pixel
   rs = rs + r*psf                  --sum upper left LED
   gs = gs + g*psf
   bs = bs + b*psf
   r,g,b = spr.fetch(ledbuf,xb-1,yb)         --color of lower left LED
   psf = math.floor(spread[xd]*spread[7-yd]/4096) --PSF for this led and pixel
   rs = rs + r*psf                  --sum upper left LED
   gs = gs + g*psf
   bs = bs + b*psf
   r,g,b = spr.fetch(ledbuf,xb,yb)           --color of lower right LED
   psf = math.floor(spread[7-xd]*spread[7-yd]/4096) --PSF for this led and pixel
   rs = rs + r*psf                  --sum upper left LED
   gs = gs + g*psf
   bs = bs + b*psf
   rs = math.floor(rs/4096)         --sum was 12bit precision (+2 for
                                    -- 4 LEDs)
   gs = math.floor(gs/4096)         --colapse them back to 8bits
   bs = math.floor(bs/4096)
   spr.store(fuzbuf,x,y,rs,gs,bs);  --and save in output buffer
end
```

The combination of the two functions, the "down sampling" of the Peak Function 110 followed by the "up sampling" of the Backlight Interpolation Function 130 may retain the original resolution of the input image in terms of sample count (image size), but produce a set of output image values, designated as $R_L G_L B_L$ in FIG. 1A, with lower spatial frequencies, i.e., a filtered version of the RGB input image data that approximates the distribution of light from light emitter array 120. This data is then input to $X/X_L$ function 136 described below. Note that some images may have regions of uniform (i.e., the same) color values. Knowledge of the location of uniform color regions in the image may be used to reduce computational load in GMA function 140 by retaining/reusing values common to the region.

Prior to being input into GMA function 140, input image RGB data is first modified by the relationship between the brightness of each incoming RGB value after input gamma function 105 and the actual amount of RGB light available at that given pixel from backlight array 120, as provided by blanking, possibly with row scanning, as is known in the art, for some period so as to reduce or eliminate the motion artifact known as "jutter".

Handling Out-of-Gamut Colors with Expanded Peak Function

When Peak Function 110 uses a method whose output values for a given light emitter are local peak values of the input image data, (e.g., computed in an area bounded by the neighboring light emitters of the same color) setting the light emitters to these local peak values may cause bright (relative to the local peak) saturated image colors to be "out-of-gamut" (OOG). This, in turn, could require the backlight light emitters to be set at a higher brightness to allow these bright image colors to be reached.

Figure 1B:
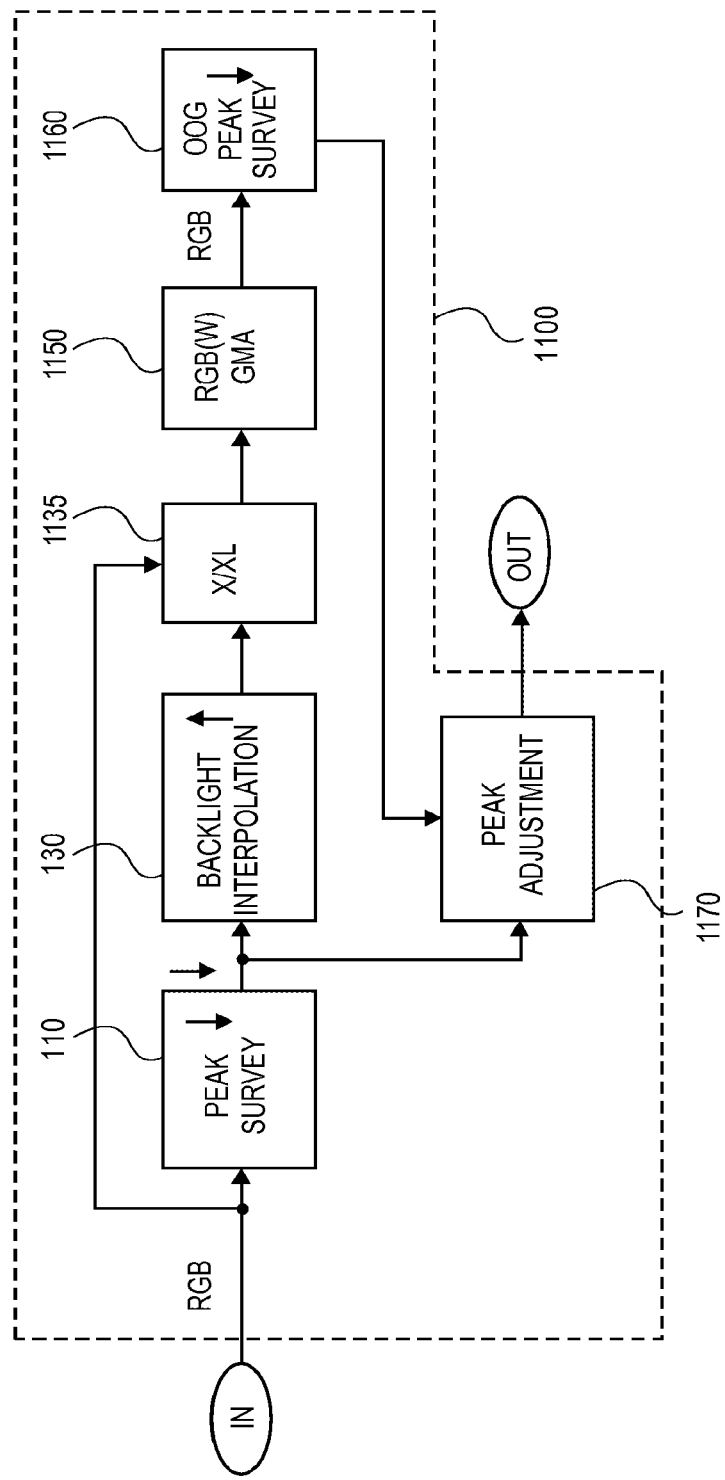
FIG. 1B is a block diagram of an example of a peak down sampling function block that may be used in the embodiment illustrated in FIG. 1A.

The Peak Function may be designed to account for setting light emitter values that are different from those found from a simple local peak function, and that accommodate what could otherwise be out-of-gamut image colors. The block diagram in FIG. 1B illustrates expanded Peak Function 1100, which could be implemented to substitute for Peak Function 110 of FIG. 1A. Peak Survey function 110 (which operates the same as Peak Function 110 in FIG. 1A) surveys the linear input image RGB values of each pixel to find the peak value for a light emitter within each of the light emitter Point Spread Function areas.

To determine if these light emitter values will cause some of the input image colors to be out-of-gamut, a gamut mapping function is performed with the output light emitter values produced by Peak Survey 110. Thus, expanded Peak Function 1100 includes additional functionality that is duplicative of other functions previously described in display system 100 to identify and accommodate input color values that would be out-of-gamut with light emitter settings determined using a local peak function.

With continued reference to FIG. 1B, the light emitter values output from Peak Survey 110 are input to Backlight Interpolation function 130 to produce the $R_L G_L B_L$ values, as described above. The normalization of the input image RGB values and the $R_L G_L B_L$ values, as previously described, is then performed in box 135. Then the normalized values are input to gamut mapping function RGB(W) GMA function 1150. However, the output W and L values that are otherwise generated in the standard RGBW GMA function are not needed in this case, since only the RGB values from RGB(W) GMA function 1150 are subject to being out-of-gamut. The output RGB values from RGB(W) GMA 1150 are then surveyed by the OOG Peak Survey 1160 to find the maximum out-of-gamut value within each light emitter's Point Spread Function area. The maximum out-of-gamut value is multiplied, possibly with a suitable scaling factor, with the original light emitter values produced by Peak Survey 1110, in Peak Adjustment function 1170, to increase the values of the light emitters such that fewer out-of-gamut colors occur.

Second Embodiment of a Display System

Multi-Primary Color Backlight Array with Multi-Primary Display

Figure 2A:
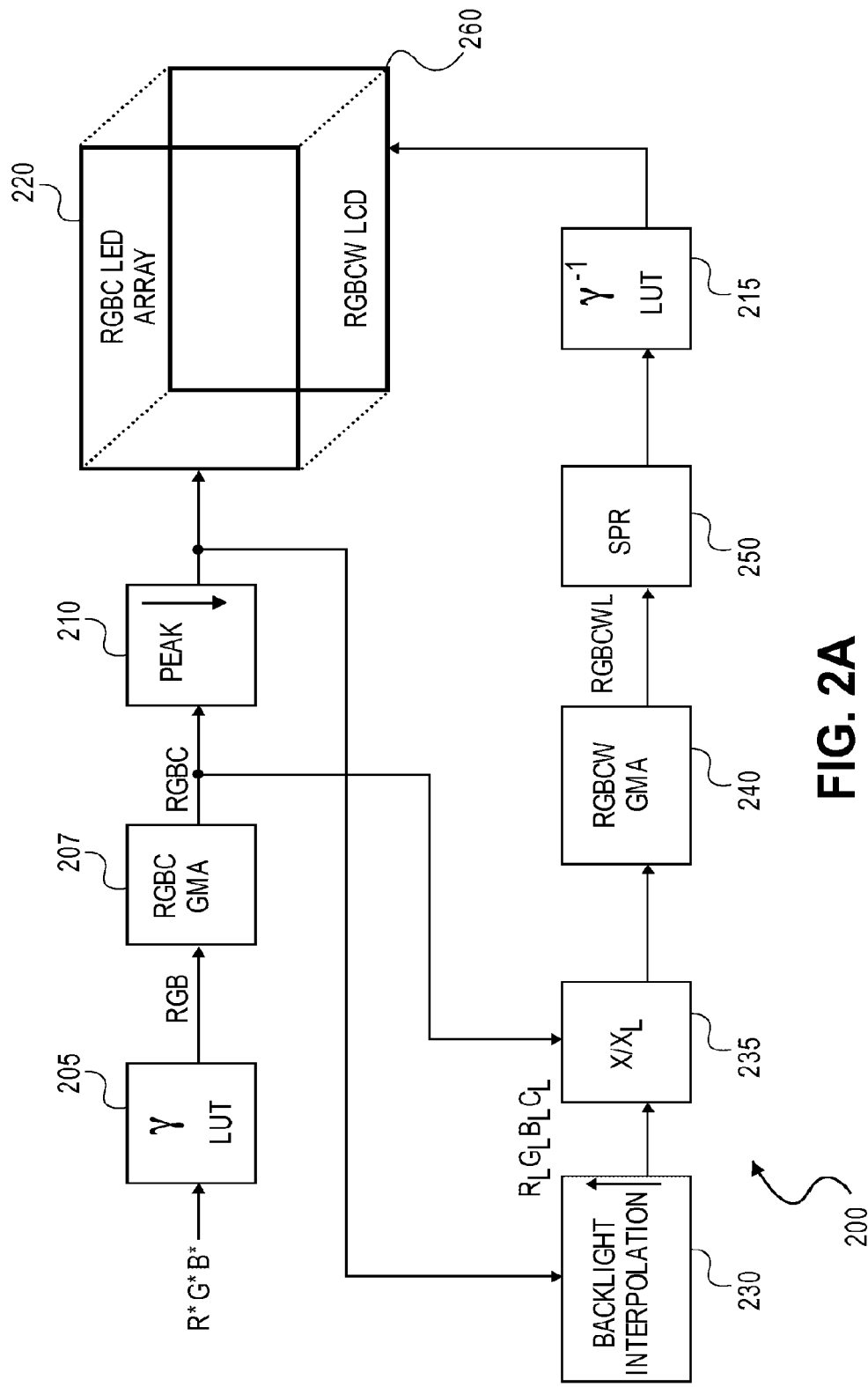
FIG. 2A is a block diagram of a selected components of a second multi-primary display system with a second backlight array of multi-color light emitters.

FIG. 2A is a block diagram of a second exemplary display system 200 having a spatial light modulator panel 260 for producing images, which is labeled as a liquid crystal display (LCD) panel in FIG. 2A. Panel 260 is a multi-primary subpixelated display panel and is shown in FIG. 2A as comprising five colors designated as red-green-blue-cyan-white (RGBCW). Subpixel repeating group 902 of FIG. 9 is an example of a subpixel repeating group suitable for use on panel 260. Exemplary display system 200 also includes an array of light emitting sources 220 used as a backlight for panel 260. Array 220 is comprised of light emitters in different colors, each of which is independently addressable under electronic control such that the control of each individual color may be completely separated from control of each of the other colors in array 220. FIG. 2A shows the array of light emitting sources 220 comprising LEDs but it is understood that other types of light emitters, such as those enumerated above with respect to the display system illustrated in FIG. 1A, that are capable of being independently addressable and controlled are also suitable for use in the embodiment of the display system illustrated in FIG. 2A.

In FIG. 2A, array 220 is labeled as having light emitters in four colors, RGBC, and in particular, in primary colors corresponding to the primary colors used in the subpixel repeating group of panel 260. Display system 200 illustrates a display system in which backlight array 220 has light emitters in N saturated primary colors (referred to as "s.primary") that match the N saturated primary colors of the subpixel repeating group used in display panel 260, where the W primary is considered to be a non-saturated primary. Note that, when the display does not include a W primary, the saturated primary colors of the display may be a one-for-one match with the saturated primary colors of the light emitters of array 220. However, as will be explained in more detail below, there may be significant benefits in image quality and in the dynamic range of the colors achieved in output images from using the backlight control techniques described herein in conjunction with a display system having a W primary.

Input Image Data Path

In display system 200, input image RGB data is subject to gamut mapping for both control of the N-s.primary backlight array and for subpixel rendering to produce the output color image in the gamut of N-primary display panel 260. To operate on linear data, the incoming R*G*B* data, which by common convention is non-linearly, or gamma quantized, is converted by the Gamma ($\gamma$) Look-Up-Table (LUT) 205 to higher bit depth linear RGB values.

The RGB data output from input gamma function 205 proceeds to N-s.primary GMA function 207 which maps the RGB input image data to the color gamut of the N saturated primaries of backlight array 220. GMA function 207 may be any of the gamut mapping methods that map input RGB to N saturated primary colors as disclosed in the above referenced commonly-owned patent applications, or otherwise known in the art or yet to be discovered. For example, PCT Application PCT/US 06/12766 (entitled "Systems and Methods for Implementing Low-Cost Gamut Mapping Algorithms, hereafter the "PCT '766 application") teaches how to convert three valued color input signals into four valued color signals. This method may be used in GMA function 207 for conversion of RGB input image data into a four primary color gamut of backlight array 220 (FIG. 2A) such as, for example, an RGBC backlight array.

GMA function 207 may also benefit from using metamer selection techniques as described in U.S. patent application Ser. No. 11/278,675, entitled "Systems and Methods for Implementing Improved Gamut Mapping Algorithms." When four or more non-coincident primary colors are used in a multi-primary display, there are often multiple combinations of values for the primaries that may give the same color value. A metamer on a subpixelated display is a combination (or a set) of at least two groups of colored subpixels such that there exist signals that, when applied to each such group, yields a desired color that is perceived by the human vision system. Substituting a metamer for a given color may reduce or equalize the peak values of the component colors in the output N saturated primary color space of the light emitters. This, in turn, may result in one or more of the light emitters being optimally dimmed to allow for optimal requantization of the output image values and reduction of backlight power.

The output color signals of GMA function 207 (specified in the color space of the N saturated primary colors of the light emitters in backlight array 220) is processed by Peak Function 210 to generate the values of the light emitters for array 220. In effect, as described above, Peak Function 210 generates a low resolution color image for array 220, specified in the N s.primary colors of backlight array 220.

The low resolution color image output from Peak Function 210 is also used by Backlight Interpolation module 230 to calculate the color and brightness of the backlight at each input location. Alternatively, module 230 may calculate the color and brightness at every subpixel location of panel 260. Then, prior to processing by gamut mapping operation 240, the input image RGB values, as mapped to the N s.primary colors of backlight array 220, and the low resolution image output by Backlight Interpolation module 230 are normalized, in module 235. In the context of a multi-primary display system having RGBCW primary colors with a backlight array having light emitters in RGBC primary colors, normalization function 235 computes the ratio of RGBC input colors to $R_L G_L B_L C_L$ values, effectively making the backlight bright white to gamut mapping function 240. As noted above, using normalization function 235 permits display system 200 to utilize an "off-the-shelf" gamut mapping function, without requiring any special or costly modifications.

Second gamut mapping function 240 converts the normalized input image data, as specified in the color space of the N s.primary colors of array 120 (e.g., RGBC color data) to the primary color system of display panel 260 (e.g., RGBCW.) GMA function 240 may also calculate luminance, L, as well as the primary color values, for use in SPR function 250, as described in U.S. Pat. No. 7,920,154 "Subpixel rendering filters for high brightness subpixel layouts" and in U.S. Pat. No. 7,787,702 "Multiprimary color subpixel rendering with metameric filtering" or for the RGBCW subpixel layout 902 in FIG. 9, the improved filters and code below may be used. The output image data from SPR 250 function is sent to output inverse gamma ($\gamma^{-1}$) Look-Up-Table (LUT) 215 to compensate for the non-linear response of the display.

The SPR 250 block may perform subpixel rendering in any manner. Some pixel layouts may present significant distances between same-color subpixels. Consider the following pixel layout:
R W G W C W B W
C W B W R W G W Here, a significant distance exists between, for example, R subpixels. This presents the possibility of performing both metamer sharpening as well as same-color sharpening. For example, neglecting the white subpixels, a repeating pattern of the above pixels would look like:
R G C B R
C B R G C
R G C B R If a square is drawn to encompass the middle three columns of this pattern and is taken as the area resample for subpixel rendering, the corresponding filter kernel is:
1 2 1
2 4 2
1 2 1

Where each coefficient is divided by (16*M), where M is a constant used to maintain the same overall color as greens/blues are exchanged for reds/cyans, or vice versa. The red/cyan to green/blue metamer sharpening filter (transferring energy from the blue/green colors to the cyan/red colors) would then take the form:
−1 +2 −1
−2 +4 −2
−1 +2 −1

Where, again, each coefficient is divided by 16. As the red subpixels R lie in the center and diagonals of the above repeating pattern, a same-color sharpening filter could take the form:
−2 0 0 0 −2
0 0 +8 0 0
−2 0 0 0 −2

Where, again, each coefficient is divided by 16. The area resample and same-color sharpening filters can be combined, resulting in the following filter:
−2 1 2 1 −2
0 2 12 2 0
−2 1 2 1 −2

Where, again, each value is divided by 16. Here, the area resample and same-color sharpening filters can be applied during subpixel rendering (i.e. in SPR block 250) to each color plane, and/or the above red/cyan to green/blue metamer sharpening filter can be applied to further adjust the subpixels using luma values. For simplicity, the constant M in the metamer sharpening filter can be set to 1, sacrificing some amount of color accuracy in exchange for better image sharpness and filter simplicity. Alternatively, M can be retained at its appropriate value, improving color accuracy but making for a slightly more complex filter that may not sharpen images as much.

By combining area resampling, self-color sharpening, and metamer sharpening driven by the luminance values of the pixels, to subpixel render the color filtered subpixels of the RGBCW layout 902 in FIG. 9, an improved subpixel rendered image may be obtained using the following pseudo-code:

```
. combo = --combined area resample and self-color sharpening
filter
{
    xsize=5,ysize=3,
    -32,  16,  32,  16, -32,
      0,  32,192,  32,   0,
    -32,  16,  32,  16, -32,
}
RCGBMS =  --RC <-> GB metamer sharpening filter
{
    xsize=3,ysize=3,
    -16,  32, -16,
    -32,  64, -32,
    -16,  32, -16,
}
    --routine to do the SPR filtering
    --reads from buffer in string variable gmabuf
    --writes to buffer named in string variable sprbuf
function dospr(x,y)
    local lft,rgt            --values during SPR
    local R,B,C,G,W,L = 0,1,2,3,4,5   --give names to the
locations in the GMA buffer
    local color = spr.bxor(spr.band(x,3),spr.band(y,1)*2)    --
color at this checkerboard position
    local lft,wht, prev, next
    local sharp    = spr.sample(gmabuf,x,y,L,RCGBMS)
    lft = spr.sample(gmabuf,x,y,color,combo)+sharp
    wht    =   spr.fetch(gmabuf,x,y,W) --the whites are just
completely sampled!
    lft = math.floor(lft/256)      --filters are times 256
    lft = math.max(0,lft)      --sharpening filters can cause
overflow or underflow
    wht = math.max(0,wht)     --we've got to clamp it to the
maximum range
    lft = math.min(MAXCOL,lft)
    wht = math.min(MAXCOL,wht)   --may not be necessary on
white...
    spr.store(sprbuf,x,y,lft,wht)
end    --function dospr
```

Operation of Gamut Mapping Functions

As noted above, GMA function 207, which maps the input RGB image data to the color space of the saturated primary colors of the backlight array, may use techniques disclosed in the PCT '766 application for conversion of RGB input image data into a four primary color gamut of backlight array 220 (FIG. 2A) such as, for example, an RGBC backlight array. GMA functions 240 (FIG. 2A) and 2160 (FIG. 2B) may use procedures similar to the techniques disclosed in the PCT '766 application, but expanded as shown below, to convert the four valued (RGBC) color signal produced by GMA function 207 to the RGBCW signal needed by display panel 260. For ease of reference, the discussion below will relate specifically to an RGBC backlight array and an RGBCW display panel, but it is understood that the methods and equations may be adapted to operate when the backlight array and display panel have the same number of saturated primaries (e.g., RGBC to RGBCW or RGBY (Y=yellow) to RGBYW, or other primary color combinations,) or when the display panel has one more primary than the n.saturated primaries of the backlight array.

In the process of developing GMA function 207, a 4×3 matrix is calculated from the luminosity and chromaticity of the RGBC backlight array. This matrix converts RGBC values to CIE XYZ and can be calculated using methods well known in the literature. This matrix is used in equations like the following:

$$\begin{pmatrix} X \\ Y \\ Z \end{pmatrix} = \begin{pmatrix} m00 & m01 & m02 & m03 \\ m10 & m11 & m12 & m13 \\ m20 & m21 & m22 & m23 \end{pmatrix} \cdot \begin{pmatrix} Rc \\ Gc \\ Bc \\ Cc \end{pmatrix} \quad \text{Equation 1}$$

Similarly, a 5×3 matrix can be calculated to convert RGBCW values to CIE XYZ using the same methods. This matrix is used in equations like the following:

$$\begin{pmatrix} X \\ Y \\ Z \end{pmatrix} = \begin{pmatrix} n00 & n01 & n02 & n03 & n04 \\ n10 & n11 & n12 & n13 & n14 \\ n20 & n21 & n22 & n23 & n24 \end{pmatrix} \cdot \begin{pmatrix} Rw \\ Gw \\ Bw \\ Cw \\ Ww \end{pmatrix} \quad \text{Equation 2}$$

For a single color, these two equations can be set equal to each other, giving:

$$\begin{pmatrix} m00 & m01 & m02 & m03 \\ m10 & m11 & m12 & m13 \\ m20 & m21 & m22 & m23 \end{pmatrix} \cdot \begin{pmatrix} Rc \\ Gc \\ Bc \\ Cc \end{pmatrix} = \quad \text{Equation 3}$$

$$\begin{pmatrix} n00 & n01 & n02 & n03 & n04 \\ n10 & n11 & n12 & n13 & n14 \\ n20 & n21 & n22 & n23 & n24 \end{pmatrix} \cdot \begin{pmatrix} Rw \\ Gw \\ Bw \\ Cw \\ Ww \end{pmatrix}$$

Equation 3 cannot be directly solved for [Rw,Gw,Bw,Cw,Ww] given a set of the [Rc,Gc,Bc,Cc] values because none of the matrices are square. However, the inability to solve the equation symbolically does not mean there is no solution. To the contrary, there are many solutions and only one may suffice to produce a reasonable display.

The above-referenced PCT '766 application teaches that equations with 4×3 matrices may be solved by setting one of the unknowns to a "reasonable" constant. This converts the matrix to a square matrix, which allows for solving for the remaining variables. In Equation 3, the cyan (Cw) and white (Ww) values can both be declared constants and then "factored" out of the matrix. For example, in displays with a white (clear) subpixel it has been found reasonable to set the Ww value to the luminosity of the input value. In a similar manner, the Cw value may be set to the input Cc value. With these two variables converted to constants, the equation can be changed to the following:

$$\begin{pmatrix} m00 & m01 & m02 & m03 \\ m10 & m11 & m12 & m13 \\ m20 & m21 & m22 & m23 \end{pmatrix} \cdot \begin{pmatrix} Rc \\ Gc \\ Bc \\ Cc \end{pmatrix} = \quad \text{Equation 4}$$

$$\begin{pmatrix} n00 & n01 & n02 \\ n10 & n11 & n12 \\ n20 & n21 & n22 \end{pmatrix} \cdot \begin{pmatrix} Rw \\ Gw \\ Bw \end{pmatrix} + \begin{pmatrix} n03 & n04 \\ n13 & n14 \\ n23 & n24 \end{pmatrix} \cdot \begin{pmatrix} Cw \\ Ww \end{pmatrix}$$

Equation 4 can now be solved for the remaining variables, producing the following:

$$\begin{pmatrix} Rw \\ Gw \\ Bw \end{pmatrix} = \begin{pmatrix} n00 & n01 & n02 \\ n10 & n11 & n12 \\ n20 & n21 & n22 \end{pmatrix}^{-1} \cdot \quad \text{Equation 5}$$

$$\left[ \begin{pmatrix} m00 & m01 & m02 & m03 \\ m10 & m11 & m12 & m13 \\ m20 & m21 & m22 & m23 \end{pmatrix} \cdot \begin{pmatrix} Rc \\ Gc \\ Bc \\ Cc \end{pmatrix} - \begin{pmatrix} n03 & n04 \\ n13 & n14 \\ n23 & n24 \end{pmatrix} \cdot \begin{pmatrix} Cw \\ Ww \end{pmatrix} \right]$$

Equation 5 can be simplified to the following:

$$\begin{pmatrix} Rw \\ Gw \\ Bw \end{pmatrix} = \begin{pmatrix} a00 & a01 & b02 \\ a10 & a11 & b12 \\ a20 & a22 & b23 \end{pmatrix} \cdot \begin{pmatrix} Cw \\ Ww \\ 1 \end{pmatrix} \quad \text{Equation 6}$$

where the "a" coefficients are calculated using Equation 2 (the 5×3 conversion matrix), which can be pre-calculated once in advance. The "b" coefficients are calculated using both matrices and the input [Rc,Gc,Bc,Cc] values, which change on every input pixel. Note that careful selection of the primary colors in the backlight and the overlying LCD display can greatly reduce the complexity of these calculations. Now the remaining [Rw,Gw,Bw] values can be calculated.

The resulting color may still be out-of-gamut in the RGBCW color space. Out-of-gamut colors can be resolved using any one or more of several techniques. Some colors may be brought back into gamut by using the metamer selection techniques as described in U.S. patent application Ser. No. 11/278,675, entitled "Systems and Methods for Implementing Improved Gamut Mapping Algorithms." Depending on the shapes of the gamut representing the backlight array primary colors and the gamut of the display, there may still be some colors that can never fit into the final gamut. These colors must be clamped or scaled using techniques such as those disclosed in U.S. Pat. No. 7,893,944 "Gamut mapping and subpixel rendering systems and methods" or using other gamut clamping techniques from the literature.

The backlight control methods and techniques discussed herein may also be implemented in display systems in which the display panel has fewer saturated primary colors than saturated primaries of the backlight, or in which the display panel does not share primary colors with the backlight. In these case, some other combination of GMA methods may be preferred over using the two stage GMA functions illustrated in FIG. 2A. For example, GMA function 240 may do its conversion directly from the RGB input color image data values produced by input gamma LUT 205. The GMA function may use processes based on techniques disclosed in several ones of the above-referenced patents, or based on other gamut mapping approaches available in the literature.

Handling Out-of-Gamut Colors with Expanded Peak Function

When Peak Function 210 uses a process whose output values for a given light emitter are local peak values of the input image data, (e.g., computed in an area bounded by the neighboring light emitters of the same color) setting the light emitters to these local peak values may cause bright (relative to the local peak) saturated image colors to be "out-of-gamut" (OOG). This, in turn, could require the backlight light emitters to be set at a higher brightness to allow these bright image colors to be reached.

Figure 2B:
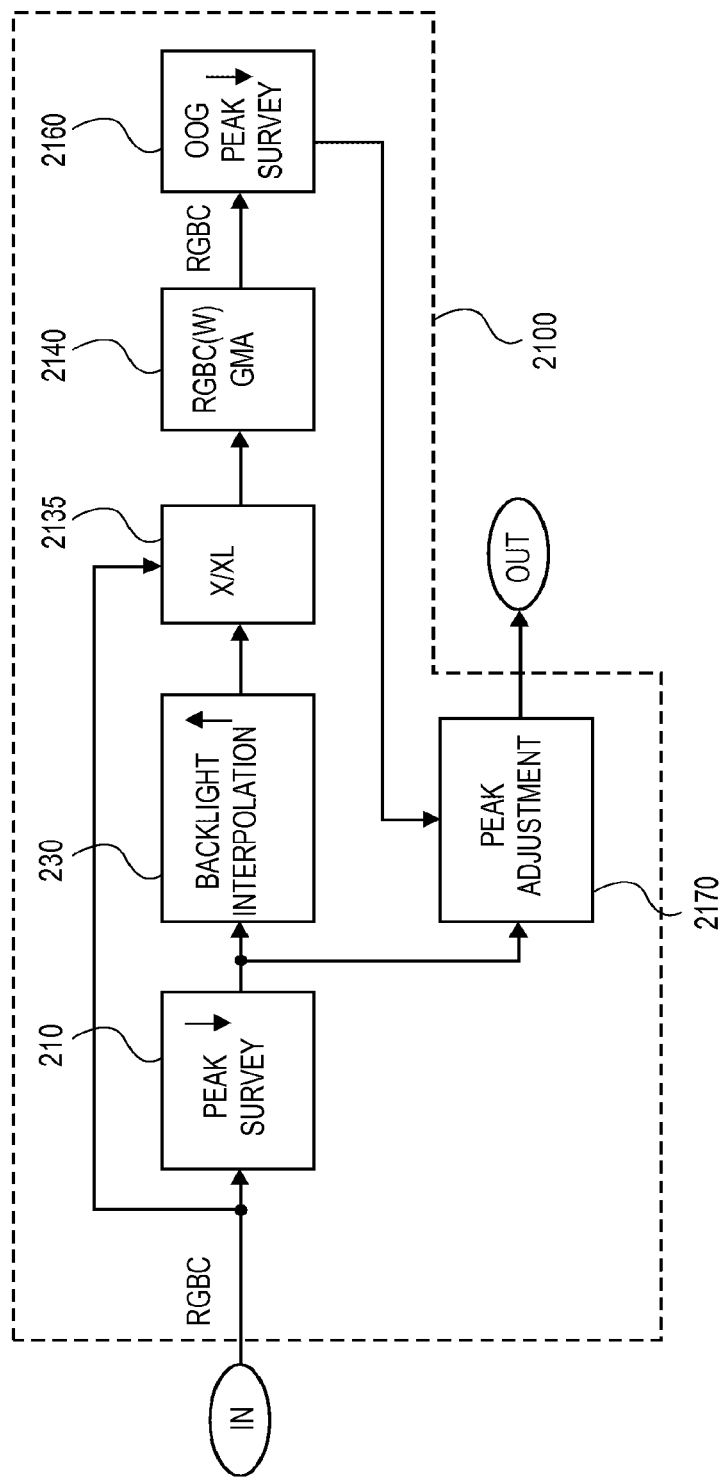
FIG. 2B is a block diagram of an example of a peak down sampling function block that may be used in the embodiment illustrated in FIG. 2A.

The Peak Function may be designed to account for setting light emitter values that are different from those found from a simple local peak function, and that accommodate what could otherwise be out-of-gamut image colors. The block diagram in FIG. 2B illustrates expanded Peak Function 2100, which could be implemented to substitute for Peak Function 210 of FIG. 2A. Peak Function 2100 will be described in terms of a display system having RGBCW primary colors and a backlight array having RGBC colored light emitters, but it is understood that the operation of Peak Function 2100 may be modified to accommodate other multi-primary display systems having a different set of N primary colors.

Peak Survey function 210, which operates the same as Peak Function 210 of FIG. 2A, surveys the linear input image RGBC values of each pixel to find the peak value for a light emitter within each of the light emitter Point Spread Function areas. To determine if these light emitter values will cause some of the input image colors to be out-of-gamut, a gamut mapping function is performed with the output light emitter values produced by Peak Survey 2110 to identify and accommodate input color values that would be out-of-gamut with light emitter settings determined using a local peak function.

With continued reference to FIG. 2B, the light emitter values output from Peak Survey 2110 are input to Backlight Interpolation function 2130 to produce the $R_L G_L B_L C_L$ values. The normalized input image RGBC values and the $R_L G_L B_L C_L$ values produced in box 2135 are input to gamut mapping function RGBC(W) GMA function 2140. However, the output W values that are otherwise generated in the standard RGBCW GMA function are not needed in this case, since only the RGBC values from RGBC(W) GMA function 2140 are subject to being out-of-gamut. The output RGBC values from RGBC(W) GMA function 2140 are then surveyed by the OOG Peak Survey 2160 to find the maximum out-of-gamut value within each light emitter's Point Spread Function area. The maximum out-of-gamut value is multiplied, possibly with a suitable scaling factor, with the original light emitter values produced by Peak Survey 2110, in Peak Adjustment function 2170, to increase the values of the light emitters such that fewer out-of-gamut colors occur.

Operation of the Backlight to Improve Quality of Displayed Images

In one embodiment of the operation of the backlight according to the techniques described above, the chromaticity of the backlighting of the display panel is dynamically controlled as a function of one or more characteristics of the colors in the image to be displayed on the panel.

Adjusting Light from Backlight to Image Color Temperature

One such characteristic of the colors in an image is referred to as the color temperature of the image, which may be defined as an average image color and luminance. Using the backlight control techniques described above, the backlight array of the display may be controlled to emit light as a function of the color temperature of the image being displayed. For example, an image showing a sunset may include high numbers of red and blue colors, but a low number of green colors. In contrast, an image showing a moonlit scene may be predominantly silvery white in color, having predominantly blue colors, but with few or no other colors. Using the backlight control techniques described above, the color temperature of the image may be determined by the display controller, which in turn may control the color temperature of the backlight array so that each scene may be rendered using its respective average color and luminance. Dynamically rendering an image in this manner will also allow the limited dynamic range and quantization of the display panel to be used to its fullest extent within the average luminance and color of the image, which in turn reduces quantization error. Note that the aforementioned examples of images may occur as part of a sequence of images, or scenes, that are to be rapidly displayed, such as those that occur in the frames of a video or movie. The display systems described above that are implemented with the backlight control techniques described herein may control the backlight color temperature from frame to frame, as the image temperature changes from scene to scene.

In addition, when the backlight is an array of multicolor light emitters having a lower resolution than the resolution of the display panel, such as an LED display, color temperature adjustments may be made across different regions of the panel, allowing specific parts of an image to be illuminated by different color temperatures from the backlight array, and thus providing for high simultaneous dynamic range in both luminance and chrominance within a single scene.

Controlling Light from Backlight to Alter the W Display Primary

Related to, but distinct from, using the color temperature of an image to control the light emitting from the backlight is to use the backlight control techniques described above to cause the backlight array to emit light as a function of the predominant color in an image, in order to produce a displayed image having higher luminance or higher color purity than would otherwise be achieved using a uniform white backlight for the subpixel repeating group used by the display panel.

First, a specific example will describe the problem. An image showing a scene in a photo-development dark room is typically lit only in red. With a conventional white backlight, only the red subpixels in the subpixel repeating group of the display panel would be called upon by the subpixel rendering (SPR) operation to render the luminance information of the scene. In a standard RGB stripe display, only one of the three subpixels in the RGB subpixel repeating group will provide the luminance information for the image. Similarly, with reference to RGBW subpixel repeating group 620 of FIG. 6, only one in three subpixels will provide the luminance information for the image, and when a display panel utilizes RGBW subpixel repeating group 320 of FIG. 3, only one in four subpixels will provide the luminance information. In multi-primary displays such as those using the subpixel repeating groups shown in FIG. 7, 9, or 24, the luminance information in the red image would only use one in six subpixels in subpixel repeating group 701 (FIG. 7), one of six subpixel in subpixel repeat group 2402 (FIG. 24), and only one of eight subpixels in subpixel repeating group 902 (FIG. 9).

In a display system such as display system 100 of FIG. 1A and display system 200 of FIG. 2A that implements the backlight control techniques discussed above, the light emitted from the backlight array may be controlled to be pure red light, allowing the normally white (clear) subpixels 304 of an RGBW display layout 320 (FIG. 3) to contribute to the scene rendering, for a total of four of the eight subpixels (or two out of four) providing the luminance information for the predominantly red dark room image. A similar improvement is achieved with multiprimary subpixel repeating group 902 of FIG. 9, which, without the use of the backlight control techniques discussed herein, as noted above, provides for only one of eight subpixels in subpixel repeating group 902 to provide the luminance information for a predominantly red image. With the use of the backlight control techniques discussed herein, pure red images would also use the more numerous white (clear) subpixels 904, adding four subpixels in addition to red subpixel 906, for a total of five subpixels out of eight in a display panel utilizing subpixel repeating group 902. Moreover, the increased utilization of the clear subpixels for highly saturated colors increases the brightness range of those colors. In addition, the red color would be truly red, since there would be no color bleed from the other colors, thus increasing the color purity and gamut of the display.

Figure 13:
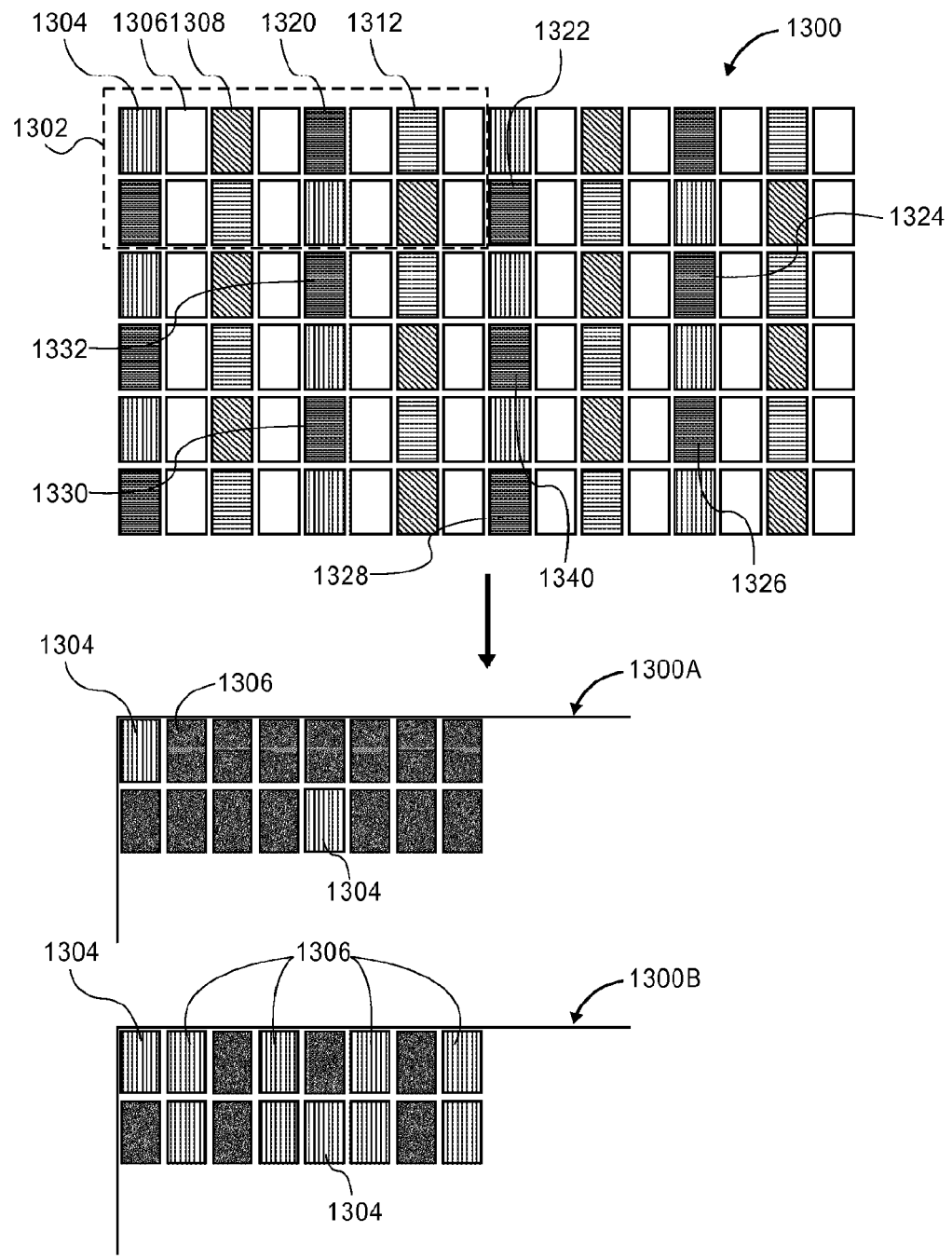
FIG. 13 shows an exemplary display panel having a multi-primary subpixel repeating group with a white (clear) subpixel and illustrating how the white subpixel is used as a primary color that is determined by the backlight control techniques illustrated and described herein.

FIG. 13 further illustrates the use of a backlight-controlled primary color in multi-primary display panel 1300A substantially comprising subpixel repeating group 1302. Subpixel repeating group 1302, which is a variation of subpixel repeating group 902 of FIG. 9, substantially comprises red 1304, green 1308, cyan 1320 and blue 1312 subpixels with majority white subpixels 1306 interspersed. The minority saturated subpixels are each placed on a hexagonal grid. See, for example, cyan subpixels 1322, 1324, 1326, 1328, 1330 and 1332 surrounding cyan subpixel 1340.

Note that the backlight color temperature may be adjusted to have more magenta (i.e., red and blue) energy than that for the typical RGB stripe display to give a balanced white. The backlight control techniques discussed herein, however, may actually control the color of the light emitters in the backlight so as to provide additional primary color subpixels. In the red image example described above, only one (the red) of the eight subpixels provides the luminance information for a predominantly red image when display panel 1300A is lit by a conventional white backlight. The other pixels, including the majority white 1306 subpixels are shown in black, indicating that they are "off."

With continued reference to FIG. 13, display panel 1300B illustrates how the backlight control methods and techniques discussed above affect the display of an exemplary predominantly red image by facilitating the use of a white (clear) subpixel in a display having a multi-primary subpixel repeating group to function as an instance of a primary color, referred to herein as backlight-controlled (BC) primary color. Pure red images are displayed using the more numerous white (clear) subpixels 1306, adding four subpixels in addition to red subpixel 1304, for a total of five subpixels out of eight in display panel 1300B utilizing subpixel repeating group 1302. The majority white subpixels 1306 in panel 1300B now transmit the red color (as indicated by their vertical hatching) from the underlying light emitter(s), as determined using peak function 110 or 1100 in FIGS. 1A, 1B, or peak function 210 or 2100 in FIG. 2A or 2B, respectively, and backlight interpolation function 130 (FIG. 1A) or 230 (FIG. 2A), and from the remaining display functions (i.e., the GMA, SPR and output gamma functions) in the data path of the display.

Figure 24:
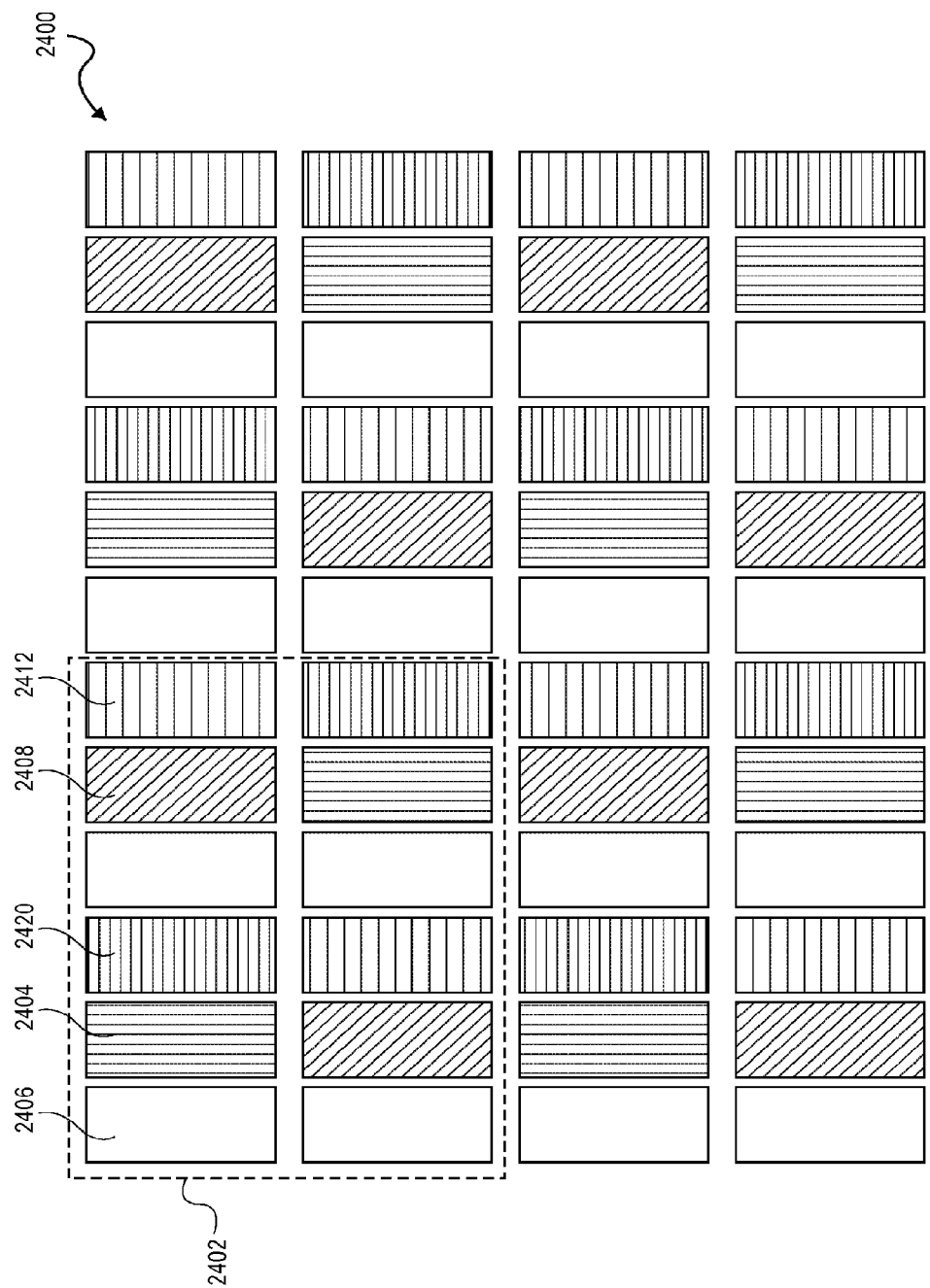
FIG. 24 shows a portion of a display panel that includes a twelve subpixel repeating group using rectangular subpixels in five colors.

The arrangement of subpixels 2400 of FIG. 24 shares the property found in FIG. 9, of having a white (clear) subpixels 2406 on a square grid and four saturated primaries, red 2404, green 2408, blue 2412, and cyan (or emerald green) 2420. As with other layouts disclosed herein, this arrangement may use the commercially commonly available one-to-three (1:3) aspect ratio subpixel structure usually associated with the conventional RGB Stripe subpixel arrangement well known in the art. Of course, other aspect ratios are possible with this subpixel repeating group. It also may be able to use the "diamond" (and other shaped filters) subpixel rendering filters disclosed in U.S. Pat. No. 7,916,156 "Conversion of a sub-pixel format data to another sub-pixel data format". It also may also use the metamer filtering techniques described in the Metamer Filtering application.

Controlling Light from the Backlight Array to Alter Other Primary Colors of the Display The backlight control techniques described above may also be used to affect how other ones of the primary colors of the display, in addition to, or in place of, the white subpixel, participate in increasing the subpixel rendered image quality. For example, certain ones of the colored light emitters in the backlight array that are disposed behind certain ones of the colored subpixels of a particular subpixel repeating group in a region of the display panel may be turned off to affect the color ultimately produced by the subpixel repeating group in that region. Consider, for example, a multi-primary display system having a display panel with subpixel repeating group 701 of FIG. 7, which has six primary colors. If a bright saturated yellow region of an image is to be displayed using a conventional uncontrolled backlight, only three of the six subpixels, the red 706, green 708, and yellow 711 subpixels would be turned on to produce the yellow image region. When a backlight array controlled according to the techniques and methods discussed herein is used, the blue light emitters disposed behind the yellow image region are turned off. This would allow the addition of two more of the six subpixels to be turned on: the magenta subpixel 709, which passes both red and blue light, and wide passband cyan subpixel 707, which passes both blue and green portions of the backlight spectrum, for a total of five out of six subpixels. Turning off the blue light emitters in the yellow image region effectively causes additional reconstruction points to be added for the subpixel rendering of the highly saturated color.

In effect, the backlight controller dims the light emitter of a given color so that the overlying display panel subpixel of that same color may be set to maximum transmission for the highest pixel value in the area of the Point Spread Function (PSF) of the light emitter. This allows surrounding subpixels of that same color that may be of lower brightness to be adjusted with more grey levels available on the display panel, in turn decreasing the quantization error. Dimming certain ones of the light emitters in an image region also may increase the color gamut slightly because these dimmed light emitters will not be producing light that may potentially leak through nearby color filters, and may also increase the contrast of the displayed image because these dimmed light emitters will not be producing light that may potentially leak through the same filtered subpixel in the off state. Dimming the light emitters in the backlight to achieve the improved image quality also reduces power drain and extends battery life, a substantial benefit for battery powered devices.

The ability to turn off selected ones of the light emitters in the backlight array in order to improve the display of highly saturated colors may be used in conjunction with a multi-primary subpixel repeating group having a white (clear) subpixel, in which the backlight control is used to enable the white subpixel to become a backlight-controlled primary color. In the example of the predominantly red darkroom image described above, the example presumed that the entire image was predominantly red. Consider an image (e.g., an imagined movie scene) in which the illumination is pure red in a restricted region of the image, such as in a photographic darkroom viewed through an open door, or a ship's bridge under red emergency battle lighting viewed through a window, where the illumination in remainder of the image may be considerably brighter, and the colors in the remainder of the image are consequently less saturated. When this type of image is displayed on a multi-primary display using a conventional backlight, only the red subpixels would be available to reconstruct the red illuminated image region. This reduces the Modulation Transfer Function Limit (MTFL) to be the Nyquist Limit of the red subpixel which, in turn, may severely limit image resolution in this image region.

Several of the above-referenced patent applications discuss allowing cross-luminance modulation of the other colored subpixels to solve this image resolution problem. That solution could cause some desaturation in areas of high spatial frequency detail. Further, for very high brightness, highly saturated color image regions such as in the imagined movie scene, a bright, highly saturated color either must be clipped, clamped, or compressed to black, or must be clipped, clamped, or compressed to luminance, in order to darken or desaturate all of the out-of-gamut colors. Each of these options is less than ideal since they may lead to problems caused by simultaneous luminance contrast of darker saturated color regions compared to a brighter desaturated image region.

The ability to individually control the light emitters in different image regions permits the backlight or display controller to turn off all but the desired light emitters in the bright saturated image region while adjusting the light emitters in the other image regions as needed, thereby permitting the white (clear) subpixels join with the subpixels of the given bright saturated color to keep both the resolution and the brightness high without desaturating or clamping the colors of the image. The white subpixel allows more of the saturated color to pass through the LCD increasing the overall brightness and color gamut hull volume.

Resolution and Colors of Light Emitters in the Backlight Array

As noted above, in some embodiments of the display systems described herein, it may be advantageous to require that the multi-primary color filters of the display panel match, or map, on a one-to-one basis to light emitters in the backlight array. However, this is not a requirement in all display system embodiments encompassed by the scope of the appended claims. That is to say, the light emitters for N saturated primary colors in the backlight need not be mapped to N saturated primary colors in the color filters of the display panel.

In fact, the controllable backlight array may include light emitters in any N colors, including those colors that are not typically found in backlight arrays, such as deep-red, cyan (emerald), and violet. For example, in display systems having a backlight array that is itself a color display having a lower resolution than the display panel the backlight is illuminating, it may be desirable to use light emitters in the backlight emitting colored light in more colors than, or different colors from, the primary colors that occur in the display panel illuminated by the backlight. For example, a "green" light emitter may have a peak wavelength of 530 nm, while a "cyan" light emitter may have a peak at 500-505 nm. It may be possible to pass both of these wavelengths through a single color filter that spans both wavelengths. When a saturated, green to red color is needed in an image region, the green light emitter disposed in the backlight array behind that image region is turned on; when a saturated cyan to blue color is needed in the image region, the cyan light emitter is turned on. When a white color is needed in an image region, one or both of the cyan and green light emitters may be turned on. Using the controlled backlight array in this manner permits the display panel to be configured with a subpixel repeating group having fewer different primary colors.

Other ranges of colors may be treated similarly. For example, in the blue region, the eye is most sensitive to 450 nm. This is good for high efficiency but light emitters in the deep violet range may also be used. The deeper violet light emitter near 400 nm has low visual efficiency, but provides for a greater color gamut in the line-of-purples where the human eye has greater color differentiation ability. When displaying an image region with deep violent colors, the 450 nm blue light emitter may be turned off and the 400 nm deeper violet light emitter may be turned on in that image region.

In the range of red colors, the human eye is less and less sensitive to the light as the wavelength increases. To produce an image region having a reasonably deep red with reasonable visual efficiency using the controlled backlight array, a 610 nm light emitter may be used. However, the 610 nm light emitter would not necessarily improve deeper red color perception out to 700 nm. To improve color perception in this red range, the controlled backlight array may include a light emitter in the 700 nm range, This longer wavelength light emitter may be turned on when required, perhaps when along the deep line-of-purples, in concert with the deeper violet light emitter described above, while turning off the 610 nm light emitter. When the image region requires less saturated colors, the less saturated light emitters at 610 nm and 450 nm may be used to increase the backlight efficiency.

The choice of colors for the light emitters included in the backlight array is not necessarily determined by the primary colors of the subpixel repeating group comprising the display panel. Nor do the primary colors of the subpixel repeating group comprising the display panel determine the choice of colors for the light emitters included in the backlight array. Those of skill in the art will appreciate that the flexibility permitted by the backlight control techniques described above allow for configuring the colors and arrangement of the light emitters in the backlight array to accommodate display systems having display panels of any one of the subpixel repeating groups illustrated in the Figures herein, or those subpixel repeating groups described in the above-referenced patent applications, as well as the conventional RGB stripe subpixel repeating group. Those of skill in the art will further appreciate that the configuration of the colors and arrangement of the light emitters in the backlight array may be designed to complement or match a particular subpixel repeating group. Various examples described herein show how design choices may be made.

A Display System Embodiment Having a Single White (Clear) Primary with a Controlled Backlight Array The above discussion describes various choices that can be made for the colors of the light emitters in display systems having a backlight array that is itself a color display having a lower resolution than the display panel the backlight array is illuminating. However, in some display system embodiments, the resolution of the backlight array may be high enough so that it is unlikely that one would need to show both green to red colors and cyan to blue colors in the same small image area. That is, the backlight array of light emitters is of high enough resolution that it is not likely or perhaps even possible to perceive, due to the limits of the human eye, a color juxtaposition that requires higher color resolution than the resolution of the backlight display. In this particular case of providing a wider color gamut by choosing certain light emitters for the backlight array, it may be possible to provide a display panel that has only one color subpixel; that is, the display panel has as its "subpixel repeating group" a pure transparent, unfiltered white (clear) subpixel. In that case, an array of only transparent subpixels would then provide all of the high resolution luminance modulation for the displayed image while the backlight array (display) of N primary color light emitters provides all of the lower resolution color.

Embodiment of Liquid Crystal Display System

Figure 10:
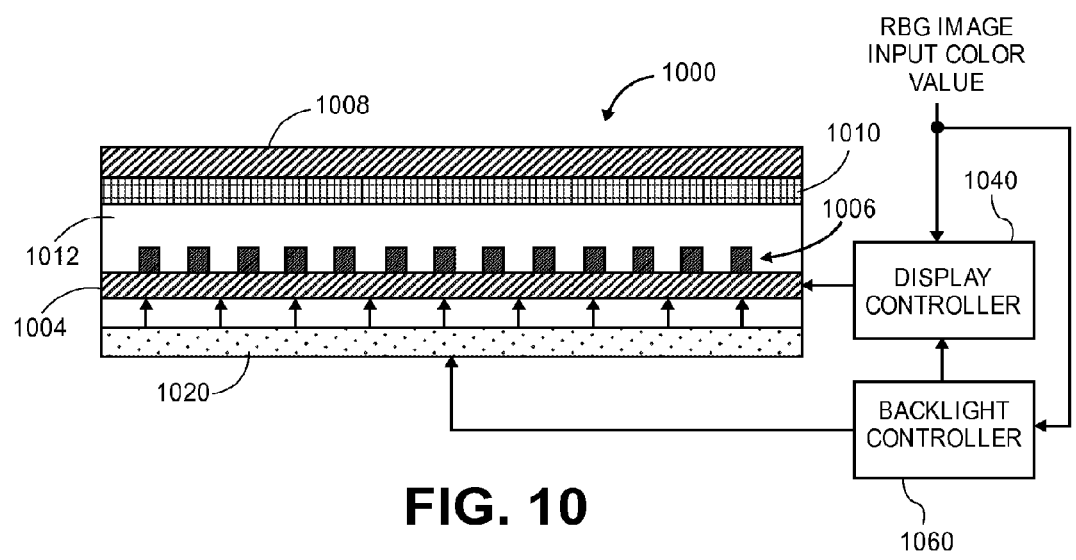
FIG. 10 is a block diagram of a liquid crystal display system in which the backlight control techniques and methods disclosed herein may be implemented.

FIG. 10 is a simplified (and not to scale) block diagram of a liquid crystal display (LCD) system 1000 in which any one of the embodiments disclosed herein may be implemented. LCD 1000 includes liquid crystal material 1012 disposed between glass substrates 1004 and 1008. Substrate 1004 includes TFT array 1006 for addressing the individual pixel elements of LCD 1000. Substrate 1008 includes color filter 1010 on which any one of the subpixel repeating groups illustrated in the figures herein, and in the various ones of the co-owned patent applications, may be disposed. LCD 1000 also includes backlight 1020 which includes an array of light emitters as illustrated in FIGS. 4 and 5, including variations as described herein in the discussion accompanying those figures. Display controller 1040 processes the RGB image input color values according to the functions described in FIG. 1A or 2A. The RGB input image values are also input to backlight controller 1060 for use in setting the values of the light emitters in backlight 1020, according to the operation of the Peak Functions described in the various embodiments of FIGS. 1A, 1B, 2A and 2B. Backlight controller 1060 communicates with display controller 1040 in order to provide the values of the light emitters for use by Backlight Interpolation function 130 or 230 in order to compute the low resolution image $R_L G_L B_L$.

Alternative Out-of-Gamut Processing on Low Resolution Backlit Display Systems

With any display system comprising a low resolution, colored backlighting as described above in all of its variants (e.g. LED backlight, a 2-LCD configuration, or the like), there are opportunities to process image data in novel fashions that leverage the unique combination of such a system.

For one example, as noted above, after some process of adjusting the colored backlight—for example, by adjusting the LED array values—there still might be colors that are out of gamut. This might happen, for example, at very high brightness when colors change hue within the point spread function of the LEDs (or other low resolution backlighting systems).

It may be possible to process the image data—to include possibly both the backlight and the LCD subsystems—in a temporal or spatial-temporal fashion to bring the colors that are out of gamut back into a target gamut space. Such a temporal/spatial-temporal processing may either take place on a global (e.g. on the entire image rendered upon the display) or local (e.g. within a subset region of the image rendered upon the screen). As such, it may be possible to modulate the low resolution backlight over time at only a certain time and within a certain region where such out of gamut conditions might exist within an image.

For example, one embodiment might proceed as follows: for any region (including the entire image) where there exists an out of gamut condition in, for example, a first color (e.g. red), subtract the opposite colors from the first color (in the example, cyan or green and blue) color from the peak value of the backlight color until such out of gamut color is back in gamut.

It is possible to group colors either by the primaries of the backlight or, alternatively, by their peak OOG conditions without regard to the backlight primaries. In the second alternative, color fields would not necessarily be pure colors. One example of such processing is now given to illustrate one embodiment and it will be appreciated that other embodiments and variants thereof are contemplated under the scope of the present invention.

Assume an RGB LED backlight with a RGBW LCD layout. The RGBW LCD subpixel repeating group may be any such group imagined, including ones disclosed herein and any others (e.g. RGBW quad). For this embodiment, it suffices only that there be a white or clear subpixel or similar wide bandpass filtered subpixel used within the subpixel layout of the LCD. The RGB LED backlight may be arrayed in any suitable fashion—e.g. in a square, displaced or some other arrangement. In addition, it suffices that that the backlight meets some assumptions for its design. For example, one such assumption might be that, at any given point on the display, it is possible to illuminate that point with a certain level of white (or alternatively, any given color) light illumination, according to the point spread function of the individual LEDs and the geometric arrangement of the LEDs upon the backlight display. It will be appreciated that the techniques described herein for OOG methods and systems as described in reference with RGB backlight with RGBW LCD may be suitably generalized to N-primary colored backlight and M-colored multiprimary LCD displays—where N and M may or may not be equal to each other and where even if N=M, then colored primaries are different in the backlight and the LCD.

In this example, three fields (corresponding to the virtual primaries P1, P2, P3, as discussed below) may be used for those LEDs that might be out of gamut: $P_1$, $P_2$ and $P_3$. The values of the LEDs in each field may be found by a survey of the incoming RGB data (or other suitable data format) in reference to each LEDs point spread function. It should be noted that the final values of the LED brightness may also be adjusted for field light integration. Thus, the total amount of light over the three fields sums substantially to the total desired, and the average equal substantially the Max desired. Stated otherwise:

| $P_1$ field | | $P_2$ field | | $P_3$ field | Sum | Equation 8 |
|---|---|---|---|---|---|---|
| $(R_1$ | + | $R_2$ | + | $R_3)/3$ = | $Max(R_{in})$ | |
| $(G_1$ | + | $G_2$ | + | $G_3)/3$ = | $Max(G_{in})$ | |
| $(B_1$ | + | $B_2$ | + | $B_3)/3$ = | $Max(B_{in})$ | |

If a given pure color is to be created using only one field, and it is desired to be proportionally as bright as the color made with three fields, then that single field may be three times as bright. If the LEDs are flashed, the heat build-up is approximately proportional to the brightness of each flash and the flash rate, as is the power and the brightness. Thus, flashing the LED at three times the brightness but one third the rate provides approximately the same brightness but one third the rate provides the same brightness and power requirements.

It will be appreciated by those skilled in the art that the prior art Field Sequential Color (FSC) system may be used, in which the fields are pure color primaries defined by the colors of the LED primaries. An improvement may be to set the maximum brightness of a given color LED in the backlight to the brightest value required by the image data to be displayed on the LCD and adjust the LCD value by $X/X_L$ to allow all of this light to pass through the LCD.

Dynamic Virtual Primaries

Another improvement however, may be to use "virtual primaries" that may cover less than the full color gamut of the backlight within a given region of the LCD display in order to reduce the visibility of FSC artifacts known to occur with prior art FSC systems.

Figure 16:
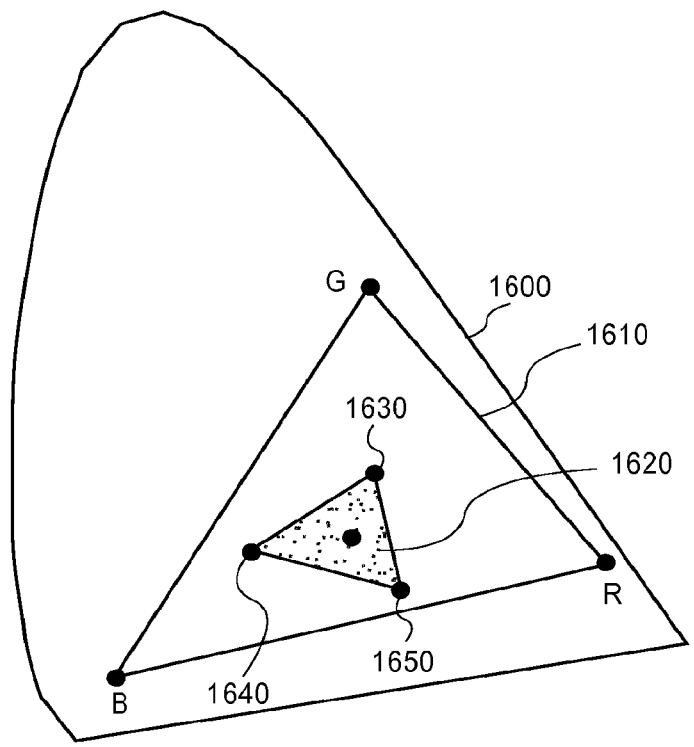
FIG. 16 is a CIE 1931 color chart showing a backlight LED gamut and an individual image gamut map smaller than the backlight LED gamut.

FIG. 16 shows a color gamut map 1600 (e.g. CIE '31) that bounds one possible original input gamut map (1610)—in this example, a RGB gamut. This original gamut may be defined by the color points R, G and B of the constituent RGB LEDs. Within RGB gamut 1610, a new gamut 1620 may be defined and/or created that may be a subset of the input gamut map 1610. This new gamut 1620 is bounded by "virtual primaries" (e.g. 1630, 1640 and 1650)—wherein the term "virtual primaries" describes the fact that the primary points 1630, 1640 and 1650 are not necessarily the exact physical primaries defined by the LEDs (or other suitable light emitters, e.g. OLED) themselves. Of course, some or all of the virtual primaries optionally could be some or all of the primary points for some period of time. Instead, for example, each virtual primary point could be created by a mixture of illumination values of the R, G and B LEDs (or any set of colored light emitters in the backlight). Each of these virtual primary points exists for some unique space and time coordinates. For example, virtual primary point 1630 could exist for one frame of image data in time and may exist only for a limited number of subpixels within spatial portion of the display. To continue the example, it may be possible for the display system to operate over three fields with virtual primaries 1630, 1640 and 1650 illuminating all or some portion of the display image.

Alternatively, the virtual primary could exist over the entire image frame or any spatial region in between the entire image frame or at one or a few subpixels. Such granularity of space partitioning or regions may be possible because the backlight may be comprised of a low resolution array of colored LEDs. Additionally, virtual primaries may exist in time for an indefinite period of time, several or one frames, or even a portion of a frame—all depending upon the operating criteria of the system.

As the present system may create virtual primaries for a wide variety of space and time conditions, it is worth mentioning some degenerate cases that are possible given the flexibility of the present system. One degenerate case of the present system might be to assign the virtual primaries to be precisely the actual (e.g. R, G and B LEDs or any other set of actual light emitters) and have each such LED illumination lasting for a frame and over the entire image. In such a case, the display system could operate in a conventional "field sequential" fashion. Another degenerate case would be to assign only one virtual primary point—white—by illuminating all three LEDs simultaneously over all fields. In such a case, the display system could operated in a manner described in the '737 publication noted above. These degenerate cases could be operated for any length of time desired by the system or the user. However, given the dynamic nature of the present system, maximum flexibility is allowed the system and any assignment of virtual primaries may be selected to optimize any number of operating criteria—as discussed further below.

It will be appreciated that any number (i.e. other than three) virtual primaries may be selected and that the time slice in which they illuminate any portion of the display is possible and possibly desirable, depending on the operating criteria.

Selection and Choice of Virtual Primaries

Of the possible operating criteria which may be factored into the selection of virtual primaries, one listing might include: reducing flicker, reducing color breakup, maximizing power savings, increasing dynamic range, and reducing quantization error. Regardless of the criteria sought to optimize, one embodiment might involve finding a suitable (and possibly the smallest, in one embodiment) chromaticity triangle (or region other than triangular for more than three, or less than three, virtual primaries) that contains substantially all of the color values within the point spread function of a given LED or cluster of LEDs; identifying a new set of virtual primaries and then generating FSC color values of each of these virtual primaries. This has the effect of creating a new GMA for each set of virtual primaries, possibly on the fly. Of course, these steps may be re-ordered in a fashion. In another embodiment, the virtual primaries could be selected—and on the basis of that selection—the chromaticity area may be found. The discussion below will described various embodiments of the present system that might be useful in helping to optimize the systems performance under the set of operating criteria above.

For example, the following description is one embodiment of the present system that may have as a goal to minimize flicker. Merely to aid in the exposition of the system, it will be assumed that the system is seeking to render a particular subset or area of an input image upon the display. This area could be as large as the entire image frame itself or as small as a single subpixel within the point spread function of a few backlight LEDs—or any area or subset of the image in between the entire image frame and a subpixel thereof. The choice of the image subset may be selected by the user or the system itself.

To achieve this goal of reducing flicker, the system could seek the values for the LEDs in the image subset to have substantially the minimum luminance modulation—as the system operates as a dynamic FSC system. Flicker primarily occurs during the rendering of an image over a number of fields when a low luminance field of color (i.e. blue) is preceded or followed by a field of high luminance color (e.g. green). Many previous attempts to reduce flicker in FSC, projectors having color wheels and like have been well documented in the literature. The present system provides a different approach to reducing flicker.

Figure 17:
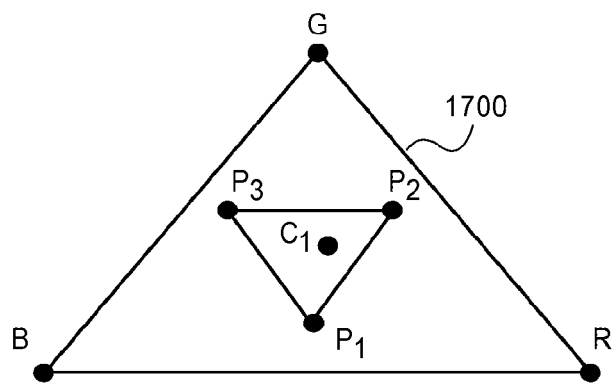
FIG. 17 shows the backlight LED gamut of FIG. 16 with three virtual primaries and a given color within the virtual primary gamut.

Shown in FIG. 17, simplified for explanatory purposes only, an equilateral triangle 1700 is the original input color gamut (e.g. RGB in our example) and three virtual primaries, $P_1$, $P_2$ and $P_3$, are shown. It will be appreciated that the particular number of primaries of the input gamut and number of virtual primaries might change with the actual number of backlight and LCD primaries and suitable changes to the present discussion could be effected to accommodate such different systems.

In one embodiment of the present system, the system may comprise: a spatial light modulator for displaying an output color image formed from an input signal comprising a set of color input values; the spatial light modulator substantially comprising a set of individually controllable transmissive elements; a plurality of individually addressable colored light emitters disposed as a backlight to provide light for forming a color image on the spatial light modulator; each light emitter producing light in one of a plurality of primary colors; for a plurality of regions, said regions comprising a set of point spread functions of a set of said light emitter, a first mapping operation for selecting a set of virtual primaries that bound each color input value within each said region, said virtual primaries comprising a plurality of intensities of said plurality of said light emitters within said set of point spread functions; field sequential control circuitry for controlling the duration and illumination of said virtual primaries over a set of fields comprising an intermediate color signal formed by said light emitters within each said region to produce an intermediate color image onto said spatial light modulator; and circuitry for controlling said set of transmissive elements within each said region to modulate said intermediate color image to produce said output color image. Each of these elements and subsystems will now be described with great detail below.

Finding Virtual Primaries

For any given color, $C_1$, inside the virtual primary gamut, there is a value $\chi_1 P_1$, $\chi_2 P_2$ and $\chi_3 P_3$ that substantially equals the input RGB value in appearance to the human vision system. As each virtual primary may be decomposed into the original primary values, we have:

$$\chi_1(R1,G1,B1)+\chi_2(R2,G2,B2)+\chi_3(R3,G3,B3)=RGB \text{ value for } C_1 \quad \text{Equation 10}$$

Restated as a matrix:

$$\begin{pmatrix} R \\ G \\ B \end{pmatrix} = \begin{pmatrix} R1 & R2 & R3 \\ G1 & G2 & G3 \\ B1 & B2 & B3 \end{pmatrix} \cdot \begin{pmatrix} x1 \\ x2 \\ x3 \end{pmatrix}$$

Then inverted to find the $\chi$ values:

$$\begin{pmatrix} x1 \\ x2 \\ x3 \end{pmatrix} = \begin{pmatrix} R1 & R2 & R3 \\ G1 & G2 & G3 \\ B1 & B2 & B3 \end{pmatrix}^{-1} \cdot \begin{pmatrix} R \\ G \\ B \end{pmatrix}$$

Expanded:

$$\begin{pmatrix} x1 \\ x2 \\ x3 \end{pmatrix} = \frac{\begin{pmatrix} R \cdot G2 \cdot B3 - R \cdot G3 \cdot B2 - G \cdot R2 \cdot B3 + G \cdot R3 \cdot B2 + B \cdot R2 \cdot G3 - B \cdot R3 \cdot G2 \\ -R \cdot G1 \cdot B3 + R \cdot B1 \cdot G3 + G \cdot R1 \cdot B3 - G \cdot R3 \cdot B1 - B \cdot R1 \cdot G3 + B \cdot R3 \cdot G1 \\ R \cdot G1 \cdot B2 - R \cdot B1 \cdot G2 - G \cdot R1 \cdot B2 + G \cdot R2 \cdot B1 + B \cdot R1 \cdot G2 - B \cdot R2 \cdot G1 \end{pmatrix}}{(R1 \cdot G2 \cdot B3 - R1 \cdot B2 \cdot G3 - R2 \cdot G1 \cdot B3 + R2 \cdot B1 \cdot G3 + R3 \cdot G1 \cdot B2 - R3 \cdot B1 \cdot G2)}$$

Figure 18:
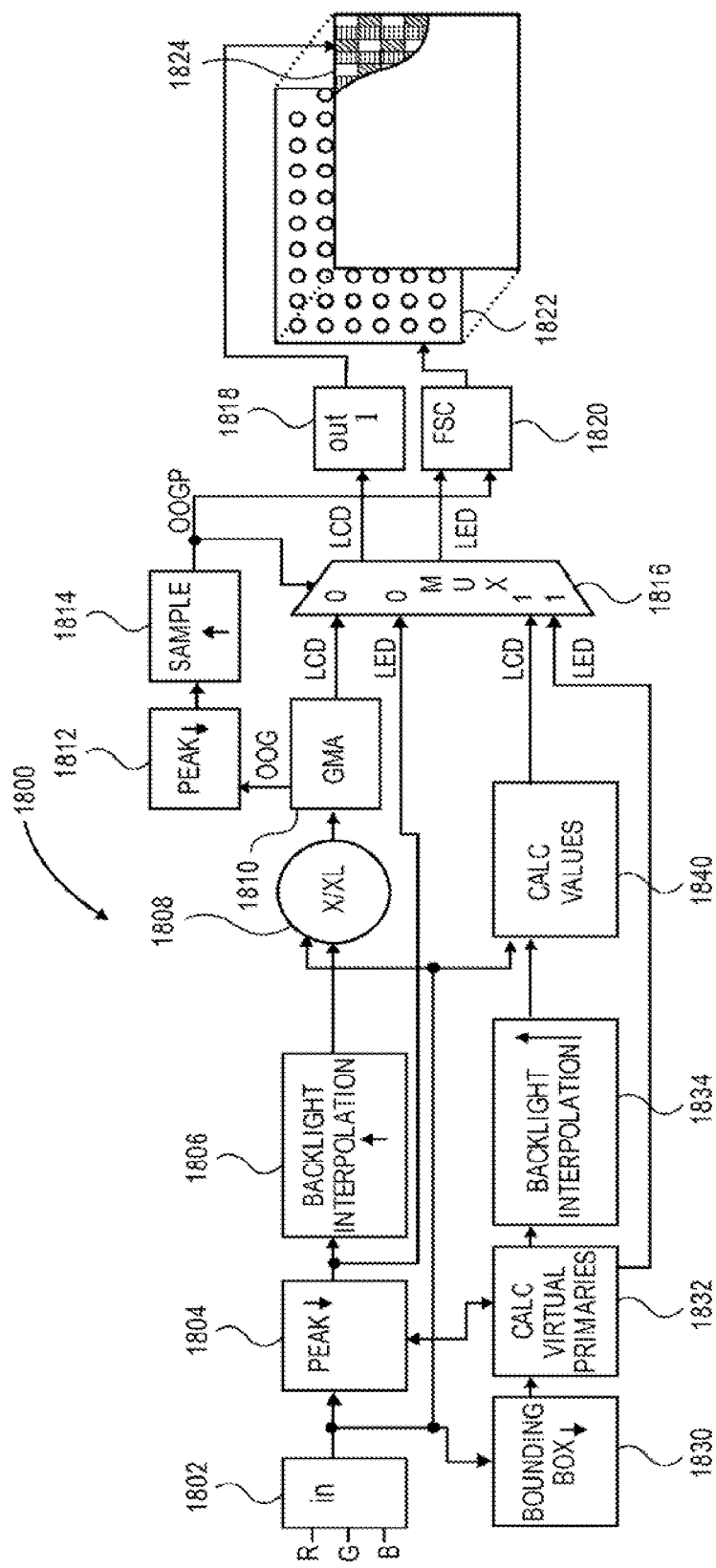
FIG. 18 is a block diagram of a hybrid system with both spatial and virtual primary means of adjusting the LED backlight and LCD values.

From Equation 10, it is possible to find expressions for $\chi_1$, $\chi_2$, and $\chi_3$. Of course, there are many ways in which these values may be determined—including straight-forward matrix algebra manipulations as shown above. It will now be presented merely one possible embodiment for determining virtual primaries and a system (1800) utilizing it, as shown in FIG. 18.

System 1800 inputs image data into input gamma unit 1802. From there, image data may precede along either one or multiple data paths. FIG. 18 depicts a system with two data paths. In a first path, image data may proceed somewhat as described above—along peak unit 1804, interpolation unit 1806, X/$X_L$ unit 1808, GMA 1810, OOG peak unit 1812 to a up-sample unit 1814. From there, depending on the signal OOGP supplied to Mux 1816, one of two data paths could be selected to drive backlight 1822 and LCD 1824 via output gamma unit 1818 and a Field Sequential Color control unit 1820. OOGP is a signal that indicates whether or not there were any OOG color values in the point spread function of an LED. If there were no such OOG color values, then the first data path is selected by Mux 1816. If there are, however, some OOG color values, the second data path is selected, employing some technique to prevent the colors from going out of gamut. One such technique is the use of these virtual primaries.

Figure 22:
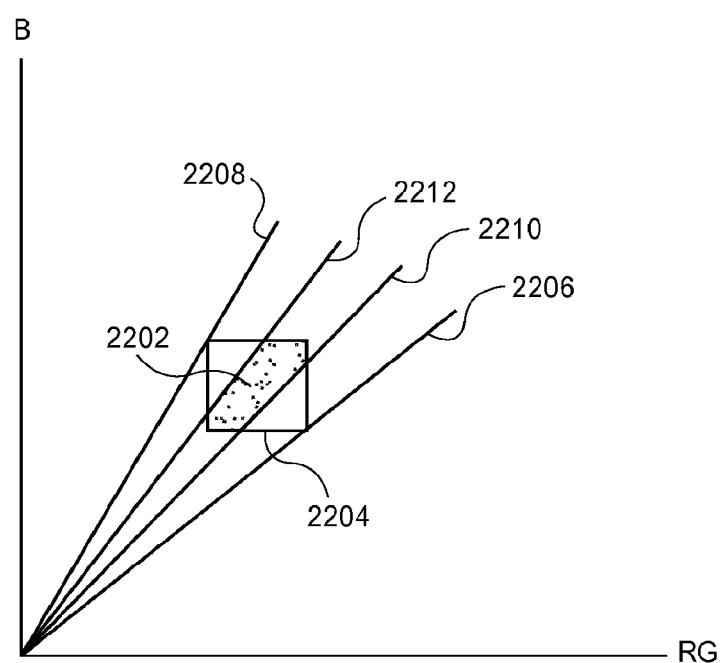
FIG. 22 is a diagram showing two embodiments of the bounding box module of FIG. 21A

A first step in calculating the virtual primaries could be to identify all of the input sample colors that will lie inside the point spread function of a single LED or cluster of LEDs if, for example, the LED colors are not coincident. The second data path could accomplish this by inputting data from input gamma unit 1802 to a bounding box unit 1830. Bounding box unit 1830 could find the these values and calculate a maximum and minimum value on each axis, for example max(R), min(R), max(B), min(B), max(G), min (G), etc. These limits describe a bounding box that encloses all the colors inside the point spread function for a single LED. FIG. 22 shows a diagram of this process. Points 2202 represent all the input pixels that lie within the point spread function of a single LED. The box 2204 shows two of the axes of the bounding box that result.

Next a formula for three planes may be found that enclose all the colors inside the bounding box. These planes may be created by anchoring them at the origin at one point, at a corner of the bounding box at a second point, and passing through the origin at 45 degrees to two of the axes. It may be visualized by considering each of the color planes for RG, GB and BR rotating towards the opposite axis (RG plane to B axis, GB to R and BR to G) until they just touch one corner of the bounding box. Line 2206 shows a representation of the RG plane, viewed on edge, rotated towards the blue axis until it touches the closest corner of bounding box 2204.

Equation 11

| | |
|---|---|
| $\left\| \begin{pmatrix} r & g & b & 1 \\ 0 & 0 & 0 & 1 \\ 0 & 1 & -1 & 1 \\ \min(R) & \max(G) & \max(B) & 1 \end{pmatrix} \right\| = C$ | Determinant formula of a plane passing through the origin, a point on a 45 degree line on the *GB* plane, and an outer corner of the bounding box. |
| $\left\| \begin{pmatrix} r & g & b & 1 \\ 0 & 0 & 0 & 1 \\ -1 & 0 & 1 & 1 \\ \max(R) & \min(G) & \max(B) & 1 \end{pmatrix} \right\| = C$ | Determinant formula of a plane passing through the origin, a point on a 45 degree line on the *BR* plane, and an outer corner of the bounding box. |
| $\left\| \begin{pmatrix} r & g & b & 1 \\ 0 & 0 & 0 & 1 \\ 1 & -1 & 0 & 1 \\ \max(R) & \max(G) & \min(B) & 1 \end{pmatrix} \right\| = C$ | Determinant formula of a plane passing through the origin, a point on a 45 degree line on the *RG* plane, and an outer corner of the bounding box. |

Each of these formulas in Equation 11 above describes a plane in color space that looks like a line in CIE xy space. If calculated as above, the lines in CIE xy space will be substantially parallel to the chromaticity triangle of the input data when close to the edges. This may be desirable if the bounding box lies near one of the input primaries. If the opposite corner of the bounding box is used to define the three planes, the resulting triangle appears rotated about 60 degrees to the triangle calculated by the method above. Line 2208 shows a representation of rotating the RG plane to the opposite corner of bounding box 2204. This orientation may produce better results when the bounding box is closer to the center of the chromaticity triangle. To calculate the planes this way, it may be possible to use the following formula:

Equation 12

$$\left|\begin{pmatrix} r & g & b & 1 \\ 0 & 0 & 0 & 1 \\ 0 & 1 & -1 & 1 \\ \max(R) & \min(G) & \min(B) & 1 \end{pmatrix}\right| = 0$$

Determinant formula of a plane passing through the origin, a point on a 45 degree line on the GB plane, and an inner corner of the bounding box.

$$\left|\begin{pmatrix} r & g & b & 1 \\ 0 & 0 & 0 & 1 \\ -1 & 0 & 1 & 1 \\ \min(R) & \max(G) & \min(B) & 1 \end{pmatrix}\right| = 0$$

Determinant formula of a plane passing through the origin, a point on a 45 degree line on the BR plane, and an inner corner of the bounding box.

$$\left|\begin{pmatrix} r & g & b & 1 \\ 0 & 0 & 0 & 1 \\ 1 & -1 & 0 & 1 \\ \min(R) & \min(G) & \max(B) & 1 \end{pmatrix}\right| = 0$$

Determinant formula of a plane passing through the origin, a point on a 45 degree line on the RG plane, and an inner corner of the bounding box.

Alternatively, the bounding box unit could perform the above plane intersection calculations by surveying all of the input sample colors that will lie inside the point spread function of a single LED. The angle to every input color in the point spread function may be calculated. The minimum (or alternatively, maximum) of these angles is used instead of the angle to the corner of the bounding box. Lines 2210 and 2212 show how surveying all the points 2202 may result in a better fit to the input colors 2202 than using the bounding box 2204. This in turn may select a smaller triangle and virtual primaries that are closer together than a bounding box because a bounding box may enclose a larger volume of the gamut than is necessary. Virtual primaries that are closer together may result in lower power consumption and decreased flicker in the display—for example, two other operating characteristics for which the system could be optimized.

It may be desirable in some circumstances to increase the spread of the virtual primaries beyond even the locations chosen by the bounding box method. This may be accomplished by decreasing (or increasing) the angles after calculating them using the bounding box or survey method.

However the three planes are chosen, the three lines in CIE xy space describe a triangle (or other suitable enclosed region) and the intersection points of the lines are three colors. These three colors can be used as virtual primaries that can display any color that lies inside the triangle and thus inside the bounding box. These intersection points can be found many different ways, one way is by converting the lines to CIE xy space and using line intersection formula. This may require conversion to floating point so a method that leaves the planes in the linear RGB co-ordinate space may be desired. One such method that may not require floating point is to intersect each pair of the above three equations with a fourth plane that is perpendicular to the line of grays:

$$\left|\begin{pmatrix} r & g & b & 1 \\ 1 & 0 & 0 & 1 \\ 0 & 1 & 0 & 1 \\ 0 & 0 & 1 & 1 \end{pmatrix}\right| = 0$$

Equation 13

The intersection of two of the rotated planes above may describe a line radiating from the origin. Every point on the line may have substantially the same chromaticity. Any line that comes out of the origin through the color cube should intersect the perpendicular plane of Equation 13 without integer overflow or divide by zero problems. The resulting point should be one of the virtual primaries. It may be advisable to scale all resulting virtual primaries until they touch the edge of the gamut. This allows that the LEDs may be bright enough to illuminate pixels between areas calculated with normal FSC colors and areas calculated with virtual primaries. Alternatively, it may be desirable to scale the virtual primary colors down to the same luminosity as the brightest color in the bounding box to reduce power consumption in the LED backlight and decrease the quantization error imposed on the overlying LCD.

In another embodiment, the component colors of the virtual primaries may be limited to the maximum duty cycle of each LED. For example, the red LED can be "on" fully in the first field of a frame and "off" in the following two. Alternatively, the red LED can be on one third in all three fields of a frame. In both these examples, the total power to the red LED is the same over time. This limit can be enforced by summing the red across all the virtual primaries and scaling it down until the total matches the duty cycle of the red LED. The same calculation may be done with green, blue and any other LED primaries in the backlight. The result of these calculations are three colors—$P_1$, $P_2$ and $P_3$—that describe a set of primary colors that in combination can produce any of the colors in the bounding box. This step may be accomplished by the "Calc virtual primaries" module 1832. These primaries may be later loaded into the LED sequentially.

The point spread function of the LEDs may be used to interpolate the color of the virtual primaries in the LED backlight into an image with the same resolution as the input sample points. This may be accomplished by the "BackLight Interpolation" module 1834.

These results may be combined with the original RGB colors in "Calc. $\chi$ Values" 1840 to produce values to be run through output gamma module 1818 to convert them to the output quantization values available on the display. The $\chi$ output values may be put in the LCD display 1824 while the virtual primaries are displayed sequentially in the LED backlight by the FSC module 1820.

For displays systems that have the general form as the block diagram 1800 that have point spread functions of the LEDs that overlap each other, it is possible that there will be an overlap between steady backlight LED point spread functions and dynamic virtual primary LED point spread functions. In these cases, the resulting backlight illumination may be a mixture of steady and field sequential color illumination. Each field may have a different color and brightness, but not necessarily spread out enough to contain all of the colors using χ values. This may mean that the χ values may not be able to reconstruct all of the colors in this overlapping point spread function. In these cases, it may be possible to find $X/X_L$ and GMA values for each field that are in gamut, especially for those pixels that are either darker than the average of the surrounding pixels or those that are nearer to the LEDs that are steady and thus may exhibit lower spread caused by contribution from the overlapping field sequentially modulated virtual primary driving LEDs.

Using the $X/X_L$ and GMA derived value for each field may have the advantage of reducing the potential visibility of color break-up and/or flicker. Some colors may be in gamut, that is, they may be OOG for one or more of the fields when using the $X/X_L$ and GMA derived values and yet also be OOG for the value system. In such cases, the average value of the illumination of the several virtual primary fields may be useful in calculating and $X/X_L$ and GMA derived value that will reconstruct the desired color. Stated another way, the sum of the overlapping steady state and dynamic virtual primary fields over time may be used as if it was a steady state illumination to calculate the $X/X_L$ and GMA value for overlying pixels.

The above two methods of using the $X/X_L$ normalized GMA values instead of χ values may also be used in the areas that are illuminated by only the virtual primaries controlled LEDs. This allows a display system to use only virtual primaries, eliminating overlap between virtual primary and steady, peak function 1804, derived LED point spread areas. In such a system, it may be advantageous to attempt to reconstruct the desired color in the following order, $X/X_L$ normalized GMA derived values for each virtual primary field to reduce the potential for color break-up and flicker, followed by either the $X/X_L$ normalized GMA derived values for the average color (sum) of the virtual primary fields or the χ derived values for each virtual primary field.

Another method or mode of operation is to use "interim virtual primaries". Interim virtual primaries are a color set formed by the $X/X_L$ and GMA that bound the desired color. This color set may then be passed to the Calc χ Values block. The final values for the LCD may then be found by multiplying the $X/X_L$ and χ values together. This method or mode of operation may reduce the potential visibility of color break-up and flicker.

In order to "stitch" the modes together, it is desirable to blend the modes together. Mathematically, since each mode is reproducing the same color, even if not physically realizable due to "Out of Gamut" (OOG) values, a linear blending of the modes, provided that the blended values are not OOG, will provide the same color. The present disclosure describes methods of such linear blending and methods for deciding how much of each to blend, so as to produce a better image with the various modes invisibly "stitched" together.

The various color reproduction methods can be mathematically explicated in the following form (for ease of explication, a subscript of x will denote a field number):

$$\chi_1 P_1 + \chi_2 P_2 + \chi_3 P_3 = C$$

Where $P_x$ are the colors of the backlight for that field, and C is the resulting reproduced color. The $\chi_x$ values are the values to place on the pixels of a "monochrome" (no color filter) LCD system (before subpixel rendering, if used). The Virtual Primary FSC system uses a single value of χ for each of the color filters (i.e. RGBW or RGBCW systems), pretending at that point that the combined color subpixels are the same as a monochrome pixel.

When blending between the Virtual Primary FSC system (which uses a single value of χ for each of the color filters) and another mode, the FSC system takes the form:

$$\chi_1 P_1(RGBCW) + \chi_2 P_2(RGBCW) + \chi_3 P_3(RGBCW) = C$$

Where (RGBCW) indicates R=G=B=C=W and each is set at its maximum value, MAXCOL. Here, each of the R, G, B, C, and W values are evaluated separately, as indicated in the distributive property of the multiplication. The RGBCW terms (variables) are grouped together for convenience and do not indicate that they are multiplied or added together.

An "over average" backlight value (i.e. time averaged/time integrated over three fields backlight color to make a Variable Primary through the W subpixel) takes the form:

$$P_1(RGBCW)_A + P_2(RGBCW)_A + P_3(RGBCW)_A = C$$

Where $(RGBCW)_A$ is the value applied to the color subpixels by the $X/X_L$ normalized GMA.

In contrast, an "over each" backlight value (i.e. where the desired color is achieved for each color field independently) takes the form:

$$P_1(RGBCW)_1 + P_2(RGBCW)_2 + P_3(RGBCW)_3 = C$$

Where:

$$P_1(RGBCW)_1 = P_2(RGBCW)_2 = P_3(RGBCW)_3 = C/3$$

Thus, we may blend the values of RGBCW of each field by the same amount from each system and get the same color, for example for blending the FSC with the "over average" values:

$$\chi_1 P_1(RGBCW)(1-\alpha) + \chi_2 P_2(RGBCW)(1-\alpha) + \chi_3 P_3(RGBCW)(1-\alpha) + \alpha P_1(RGBCW)_A + \alpha P_2(RGBCW)_A + \alpha P_3(RGBCW)_A = C$$

Thus, each of the field values for $RGBCW_x$ may be found as:

$$RGBCW_{xb} = \chi_x(RGBCW)(1-\alpha) + \alpha(RGBCW)_x$$

And for each of the fields for the "over each" system:

$$RGBCW_{xb} = \chi_x(RGBCW)(1-\alpha) + \alpha(RGBCW)_x$$

Where α is the blending value between zero and one, and where $RGBCW_{xb}$ is the blended value for each color channel before Subpixel Rendering.

To determine α, one embodiment is to use the maximum of the "over average" value allowable, as that will provide values for the LCD which remain the same for all three fields when α is equal to one and in the case where a is less than one, the LCD values change the least from one field to the next. This is desirable because the liquid crystal does not respond to new values instantaneously, leading to color reproduction errors in FSC color systems, as is well known in the art. The closer the values of the LCD from one field to the next, the lower the error from this lack of response speed (this color error in FSC systems is also reduced using the Virtual Primary backlight system, as the virtual primaries may be closer together, reducing the magnitude of the error when it occurs). The maximum allowable a is a function of highest $\chi_x$ and highest value of $(RGBCW)_x$.

$$\alpha MAX(RGBCW)_x + \chi_x(1-\alpha) = MAXCOL$$

Which when solved for α:

$$\alpha = MAXCOL - \chi_x / MAX(RGBCW)_x - \chi_x$$

The value of α is clamped between zero and one, inclusive, to ensure valid results during blending. Several modifications of the basic idea here may be used, for example if the blending function α above is replaced with a slightly expanded function of the form:

$$(\alpha - \alpha\beta)$$

Where β is an arbitrary constant, or a function, whose value is between zero and one. This new function will start blending the "over average" static mode into the χ value FSC mode as deep as is allowed before, while also allowing the FSC mode to be blending into areas where a pure "over average" mode would be technically in gamut, but might cause excessively rough "texture" from color bright subpixels being widely spaced. The β value may even be made a function of local color, for green subpixels are more visible than blue subpixels:

$$RGBCW_{xb} = \chi_x(RGBCW)_A(1-(\alpha-\alpha\beta))+(\alpha-\alpha\beta)(RGBCW)_x$$

Another method of deciding the amount of blending may be to spatially use a filtered mode image as detailed in the following pseudocode:

```
        --calculate the alpha values
    xhimu=math.max(xhi1,xhi2,xhi3)
    alpha = math.max(R,B,G,C,W)-xhimu
    if alpha~=0 then
        alpha = (MAXCOL-xhimu)/alpha
    else
        alpha =1.0           --clamp infinity at 1.0
    end
    alpha = math.min(1,math.max(0,alpha))
    rx = (alpha-alpha*beta)
    xx = (1-(alpha-alpha*beta))
    R1o = rx*R+xx*xr1
    B1o = rx*B+xx*xb1
    C1o = rx*C+xx*xc1
    G1o = rx*G+xx*xg1
    W1o = rx*W+xx*xw1
    R2o = rx*R+xx*xr2
    B2o = rx*B+xx*xb2
    C2o = rx*C+xx*xc2
    G2o = rx*G+xx*xg2
    W2o = rx*W+xx*xw2
    R3o = rx*R+xx*xr3
    B3o = rx*B+xx*xb3
    C3o = rx*C+xx*xc3
    G3o = rx*G+xx*xg3
    W3o = rx*W+xx*xw3
    local MX=math.max(R1o,B1o,C1o,G1o,W1o)
    if MX>MAXCOL then
        R1o = math.floor(MAXCOL*R1o/MX)
        B1o = math.floor(MAXCOL*B1o/MX)
        C1o = math.floor(MAXCOL*C1o/MX)
        G1o = math.floor(MAXCOL*G1o/MX)
        W1o = math.floor(MAXCOL*W1o/MX)
    end
    local MX=math.max(R2o,B2o,C2o,G2o,W2o)
    if MX>MAXCOL then
        R2o = math.floor(MAXCOL*R2o/MX)
        B2o = math.floor(MAXCOL*B2o/MX)
        C2o = math.floor(MAXCOL*C2o/MX)
        G2o = math.floor(MAXCOL*G2o/MX)
        W2o = math.floor(MAXCOL*W2o/MX)
    end
    local MX=math.max(R3o,B3o,C3o,G3o,W3o)
    if MX>MAXCOL then
        R3o = math.floor(MAXCOL*R3o/MX)
        B3o = math.floor(MAXCOL*B3o/MX)
        C3o = math.floor(MAXCOL*C3o/MX)
        G3o = math.floor(MAXCOL*G3o/MX)
        W3o = math.floor(MAXCOL*W3o/MX)
    end
```

Many of the dark saturated colors found in natural images are often reproducible using the color filters of the Hybrid FSC display. It is not necessary for the virtual primaries to enclose them. Thus, in this embodiment, the bounding box survey may ignore colors that are reproducible by the color filters, by surveying only those colors that are Out-Of-Gamut (OOG) to the $X/X_L$ normalized RGB to RGBW or RGBCW color conversion and Gamut Mapping block (GMA). In other words, this process determines virtual primaries according to those colors that are out-of-gamut to the color filters (the pixels of the display), but not according to other colors, i.e. those colors that are in-gamut to the color filters. This process is recursive, in that it must have a first estimate of the effective average backlight for the GMA to determine which colors are OOG.

The recursive process naturally fits the nature of displaying video, in that the display is sent a new frame many times a second. Each frame will be displayed using the results of the current backlight values, each zone of the local color dimming backlight having its own local virtual primary and average backlight values based on the history of the recursive process.

The GMA uses the current backlight, outputting both the current color filter values to be used in the blending, and sets a flag that a given pixel is OOG. The bounding box survey only evaluates those pixels that are OOG. From this, a new set of virtual primaries is selected and sent to the backlight controller. The backlight controller has a temporal filter, a decay that averages, smooth and slows down the changes from one frame to another. This simplest filter is to use a weighted average, a blend, of the last backlight values and the newly calculated values. This serves two purposes. First, by slowing down the changes in the backlight, temporal artifacts are reduced, and second, it allows the recursive process to slowly approach a best fit choice for the backlight, reducing the chances of oscillations, given that the number of OOG colors changes with both brightness and area of the Virtual Primaries, which can generate a non-point, or even a strange, attractor for the dynamic backlight decision process.

An additional improvement is to survey N future frames in addition to the current frame to be displayed. This allows the temporal filtered response of the backlight values, both brightness and area of coverage of the Virtual Primaries to change in anticipation of sudden changes in scene content or object motion from zone to zone. This survey of future frames can be accomplished in any suitable manner, such as by using the highest values from among the N frames. In hardware, this may necessitate additional frame buffers, so that the current frame is time delayed by N frames. Care must be taken to delay the audio track by the same number N frames to maintain audio/video synchronization.

Figure 34:
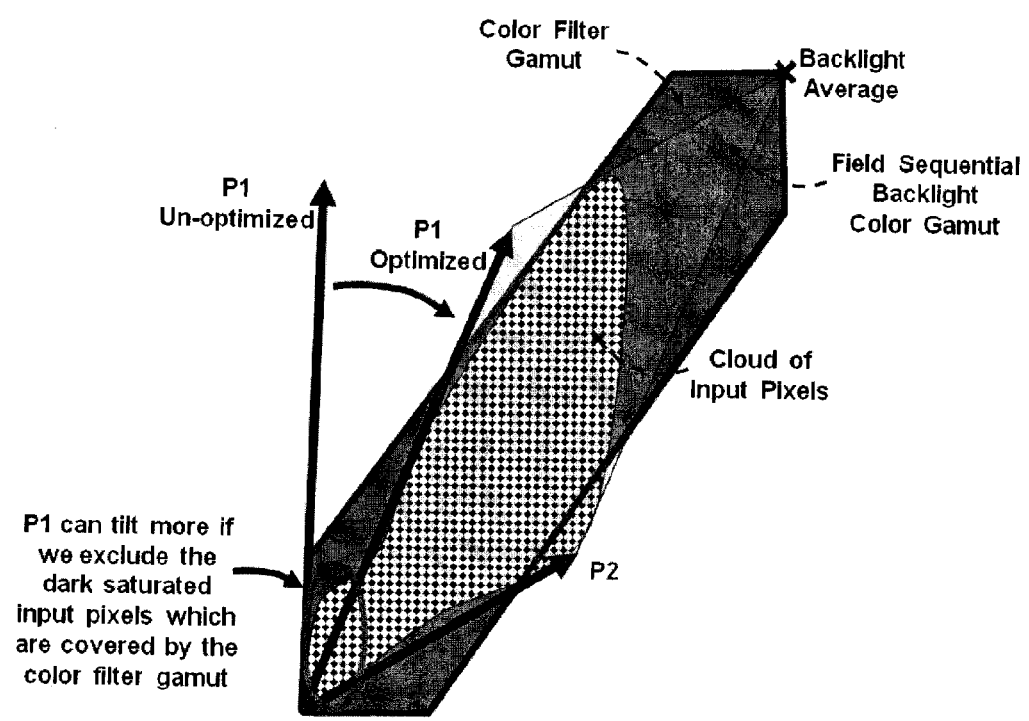
FIG. 34 depicts a simplified 2-dimensional representation of input pixels bounded by virtual primaries.

The above described method of selectively ignoring certain colors, or certain pixels, in the bounding box survey can also be modified. Indeed, the invention contemplates the selective ignoring of any suitable colors or pixels for improving bounding box selection. FIG. 34 shows a simplified 2-dimensional diagram of an attempt to bound a cloud of input pixels with a pair of virtual primaries P1 and P2. Note P1 and P2 are scaled by one half and shown as field concurrent primaries. These vectors form the basis for the field sequential backlight color gamut as shown, and the vector sum of P1 and P2 is used to form the center axis of the color filter gamut (a vector P3 would typically also exist, but is omitted for simplicity).

However, the above described approach of disregarding all or substantially all (the dark as well as the bright) input pixels that lie within the color filter gamut may lead to occasional inaccuracies in backlight decision, since the small subset of pixels being surveyed might represent only the edge of the pixel cloud. Moreover, in recursive systems occasional oscillatory behavior in backlight decision may result.

Accordingly, the invention contemplates alternative approaches, such as a simpler causal method that excludes dark saturated input pixels from the survey which determines the chromaticity of the virtual primaries in a hybrid FSC system.

Figure 35:
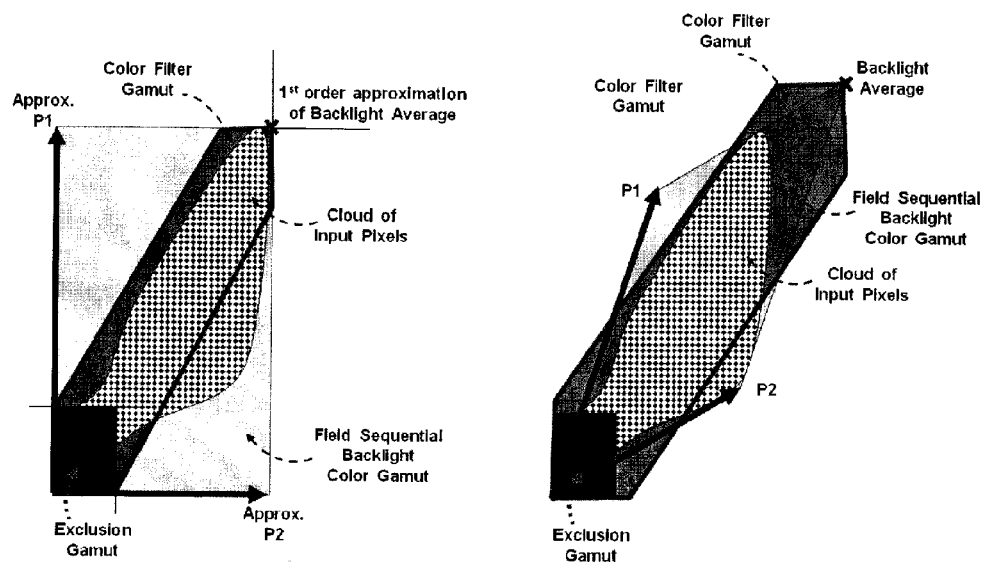
FIGS. 35-36 depict simplified 2-dimensional representations of exemplary exclusion gamuts for improved bounding by virtual primaries.

As shown in FIG. 35, a causal first order approximation of the final average backlight is performed. Here the virtual primaries are first assumed to be pure red, green, and blue orthogonal vectors that are scaled to the maximum red, maximum green, and maximum blue data values of the input image. The approximated average backlight is the vector defined by the sum of these three primaries and simply equates to the vector [max input Red, max input Green, max input Blue].

Based on the approximated average backlight, a color filter gamut, and subsequently a small exclusion gamut, can be defined which covers only the dark end of the color filter gamut, as shown. The bounding box survey is then performed using only those pixels or colors that are outside the exclusion gamut. That is, virtual primaries are determined according to colors of those pixels that are out-of-gamut to the exclusion gamut (including colors from those pixels that are in-gamut to the color filters but outside the exclusion gamut, as well as those colors that are outside the color filter gamut), and not according to colors of pixels within the exclusion gamut.

This exclusion gamut can be determined by reducing the peak data values by a constant scale factor to form a relatively small rectangular (in this embodiment) area. Any scale factor, and any shape of exclusion area, is contemplated. However, one desirable scale factor that creates a rectangular area comparable in size to the low end of the approximated color filter gamut is calculated roughly by 1/(1+(Lw/Lrgb)), where Lw represents the transmissivity of the white (broadband) sub-pixels and Lrgb represents the transmissivity of the color filtered subpixels.

Figure 36:
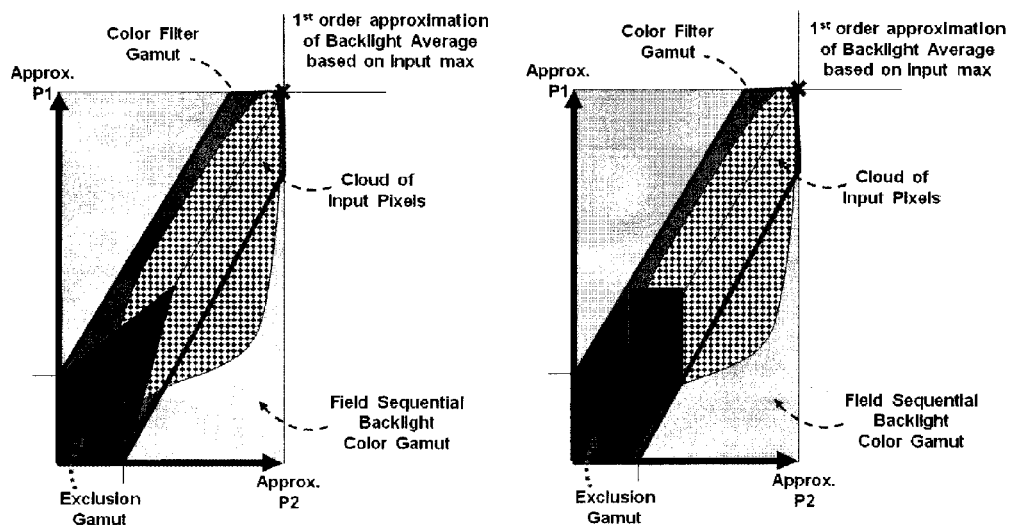

Other exclusion gamuts can be formulated, two examples of which are shown in FIG. 36 in order to exclude more pixels and potentially yield a more optimized backlight decision with reduced color breakup. The leftmost graph of FIG. 36 illustrates one such exemplary exclusion gamut. Here, the exclusion gamut can be defined by two points at the intersections of P1 and P2 with the color filter gamut hull, and by a third point that is a scaled multiple (perhaps, although not necessarily, using the same scale factor as above) of the maximum color value of the color filter gamut or, as an approximation, the maximum color value of each of the pixels. The rightmost graph of FIG. 36 illustrates another such exemplary exclusion gamut. Here, the exclusion gamut can be defined by two sides of the color filter gamut hull, and by a point that is a scaled multiple (perhaps, although not necessarily, using the same scale factor as above) of the maximum color value of the color filter gamut or, as an approximation, the maximum color value of each of the pixels. Embodiments of the invention contemplate any exclusion gamut sized in any manner so as to exclude sufficient input pixels and result in virtual primaries that more accurately or closely bound the input pixels.

However, increasingly large exclusion gamuts run the risk of excluding key parts of the input pixel cloud. Hence, care must be taken to limit the extent of these exclusion gamuts to, for example, below the average of the data values of each input channel [avg input Red, avg input Green, avg input Blue].

Furthermore, creating the exclusion gamut and ultimately the backlight chromaticity decision from causal calculations based on input image statistics alone enables a subsequent recursive brightness decision to achieve steady state more quickly than if the backlight chromaticity decision was recursive as well.

The following pseudocode implements a simple exclusion rectangle. Note that if a frame buffer is not included in the implementation, then the input survey for the virtual primary backlights will preferably use the results of the input peak channel survey from the previous frame.

```
r_excl = rin_max[i]*(1/5)    --input peak channel survey results
    scaled by 1/(1+Lw/Lrgb) = 1/(1+4) = 1/5
g_excl = gin_max[i]*(1/5)
b_excl = bin_max[i]*(1/5)
ooeg = 0
if r > r_excl or g > g_excl or b > b_excl then   -- if input is
    outside the exclusion gamut
        ooeg = 1   --out of exclusion gamut flag
end
if (ooeg==1) then       --if this pixel is outside the exclusion gamut
        survey(r,g,b)   --survey the input pixel for virtual primary
        chromaticity decision
        end
```

The α blending processes described above can be modified such that if a color is in-gamut from the GMA, the value of α is forced to one (1), such that all in-gamut colors are represented by the color filter over the average backlight. If the β blend value is to be used, the code includes a test to see that the χ values are valid. That is to say, that the color is inside of the virtual primary triangle.

There are occasions when the image may change from one frame to the next in such a manner that the recursive process cannot respond fast enough to shift or widen the virtual primaries to contain the new colors. When this happens, colors may be OOG for both the color filter GMA and the χ value FSC system. When that happens, the χ values may be negative in one or more of the fields for a given pixel. At the same time, the non-negative χ value will be high, as the negative χ value means that a given vector sign should be reversed such that that color vector should be subtracted from the other positive χ valued vectors. This creates a color that is both too bright and not sufficiently saturated compared to the desired color. This may at first seem to present a problem, since one cannot physically realize "negative light". However, one of ordinary skill in the art will observe that, with a blending, the negative values of χ may be partially, or completely, offset. Further, the blended GMA value will have low, or even zero values for the very colors that are negative χ valued, such that the overly high values of positive χ value will be reduced when blended. The final result may be that the reproduced color may be close to, or even at the originally desired value. Accordingly, blending of the above-described modes can occur with at least some negative values of χ, as these negative values may be offset, resulting in color values that are reproducible by a real system.

```
                        Implementation function surveypix(x,y)   --how to survey a single pixel, x and
y are LCD co-ords
    local i=math.floor(x/ledXsep)+xbak*math.floor(y/ledYsep)
    --co-ord of BLU zone
    local r,g,b = spr.fetch(pipeline,x,y)         --fetch input RGB
values
    if  (r+g+b)~=0 then     --ignore black
        black[i]=0                      --flag will be 1 if all black
    local angle            --psuedo angle
            --calculate 'angle' of RG plane rotating
    towards the B axis to each point
        local angle = r*MAXCOL/(r+g+b)
        rmin[i] = math.min(angle,rmin[i])
        rmax[i] = math.max(angle,rmax[i])
        angle = g*MAXCOL/(r+g+b)
        gmin[i] = math.min(angle,gmin[i])
        gmax[i] = math.max(angle,gmax[i])
                --the angle of the BR plane rotating
```

| Implementation |
| --- |
| towards the G axis |
|       angle = b*MAXCOL/(r+g+b) |
|       bmin[i] = math.min(angle,bmin[i]) |
|       bmax[i] = math.max(angle,bmax[i]) |
|     end -- ignore black |
|           --survey the xhi values for power reducrion |
|     local xhi1=spr.fetch("xhi1",x,y)    --fetch the xhi value |
|     local xhi2=spr.fetch("xhi2",x,y)    --from all three |
|     local xhi3=spr.fetch("xhi3",x,y)    --fields |
|     peak1[i]=math.max(peak1[i],xhi1) |
|     peak2[i]=math.max(peak2[i],xhi2) |
|     peak3[i]=math.max(peak3[i],xhi3) |
| end |
|           --how to analyze the survey results in one zone |
| function surveyzone(x,y)   --x,y are LED zone co-ords |
|     local i=x+xbak*y           --index into statistic tables |
|     if black[i]==1 then |
|         Rp1,Gp1,Bp1=1,1,1         --set them to a very dim non-zero number if the lcd above the zone is black |
|         Rp2,Gp2,Bp2=1,1,1 |
|         Rp3,Gp3,Bp3=1,1,1 |
|     else |
|               --calculate the reddish-greenish-bluish primaries |
|         Rp1 = MAXCOL-bmin[i]-gmin[i]       --reddish |
|         Gp1 = gmin[i] |
|         Bp1 = bmin[i] |
|         Rp2 = rmin[i]                          --greenish |
|         Gp2 = MAXCOL-rmin[i]-bmin[i] |
|         Bp2 = bmin[i] |
|         Rp3 = rmin[i]                          --blueish |
|         Gp3 = gmin[i] |
|         Bp3 = MAXCOL-rmin[i]-gmin[i] |
|               --scale them until they bump up against the edge of the Gamut first |
|         Dp = math.max(Rp1,Gp1,Bp1)         --The intersection formula I used can never get zero! |
|         Rp1 = Rp1*MAXCOL/Dp |
|         Gp1 = Gp1*MAXCOL/Dp |
|         Bp1 = Bp1*MAXCOL/Dp |
|         Dp = math.max(Rp2,Gp2,Bp2) |
|         Rp2 = Rp2*MAXCOL/Dp |
|         Gp2 = Gp2*MAXCOL/Dp |
|         Bp2 = Bp2*MAXCOL/Dp |
|         Dp = math.max(Rp3,Gp3,Bp3) |
|         Rp3 = Rp3*MAXCOL/Dp |
|         Gp3 = Gp3*MAXCOL/Dp |
|         Bp3 = Bp3*MAXCOL/Dp |
|               --then reduce power according to the xhi survey |
|         peakv=math.min(peak1[i]+HEADROOM,MAXCOL) |
|         Rp1=Rp1*peakv/MAXCOL       --scale it down so max xhi value will be on nearly full |
|         Gp1=Gp1*peakv/MAXCOL |
|         Bp1=Bp1*peakv/MAXCOL |
|         peakv=math.min(peak2[i]+HEADROOM,MAXCOL) |
|         Rp2=Rp2*peakv/MAXCOL       --scale it down so max xhi value will be on nearly full |
|         Gp2=Gp2*peakv/MAXCOL |
|         Bp2=Bp2*peakv/MAXCOL |
|         peakv=math.min(peak3[i]+HEADROOM,MAXCOL) |
|         Rp3=Rp3*peakv/MAXCOL       --scale it down so max xhi value will be on nearly full |
|         Gp3=Gp3*peakv/MAXCOL |
|         Bp3=Bp3*peakv/MAXCOL |
|     end |
|     return Rp1,Gp1,Bp1,Rp2,Gp2,Bp2,Rp3,Gp3,Bp3 |
| end       --in a later step, these are decayed with the previous LED decision |

Another improvement may be to modify the color subpixel values, even for pixels which will not be blended. For example, if we are attempting to reproduce a color along the "line of yellows", the colors from the maximally saturated red to green primaries in the color gamut of the display, we would like to shut off the B and C subpixels as they pass the undesired blue and possibly emerald (if present and used) illumination from the nominally zero valued field may "leak" due to insufficient LCD speed. In FSC systems using Liquid Crystal material as the principle optical switching media, the lack of instantaneous response causes leakage of undesired backlight illumination from the lower valued fields. When the lower valued field is not zero, this can be compensated for by overshooting the target value by some estimated amount, as is known in the art. However, when the desired color is saturated, the lower valued field is zero. In such cases, there is no lower value available to which one may overshoot.

In a Hybrid FSC system, where color filtered subpixels are also available, it may be possible to improve the reproduced color by turning off the color subpixels which match the color of the illumination of the zero field. However, having a spatially sudden change in the values of subpixels is inadvisable. Thus, we need a method that smoothly introduces the amount of shutting off of the B and C subpixels. Similarly, if we are along the line of purples, we want to smoothly shut off the G subpixel, and if along the line of blues, we want to shut off the R subpixel.

One method to achieve this is to use the following pseudo-code:

```
R = G = B = C = W
If B_in < MAX(R_in, G_in)
    Then B = C = B_in / MAX(R_in, G_in)
If G_in < MAX(R_in, B_in)
    Then G = G_in / MAX(R_in, B_in)
If G < C
    Then C = G
If R_in < MAX(B_in, G_in)
    Then R = R_in / MAX(B_in, G_in)
```

Where $R_{in}$, $G_{in}$, and $B_{in}$ are the linearized brightness values of the input values of RGB to the system, representing the desired color for the panel to reproduce.

More specifically, for each pixel, a check is first made to determine whether the input brightness value of the blue sub-pixel is less than that of either the red or green sub-pixel. If so, then the blue and cyan pixels are set to the input value of the blue sub-pixel divided by the larger of the input values of the red and green sub-pixels. Another check is then performed to determine whether the input value of the green sub-pixel is less than that of either the red or blue sub-pixel. If so, then the green sub-pixel is set to the input value of the green sub-pixel divided by the larger of the input values of the red and blue sub-pixels. Next, a check is made to determine whether the value of the green sub-pixel is less than that of the cyan sub-pixel, and if so, the cyan sub-pixel's value is set to that of the green sub-pixel, whether the green sub-pixel has already been reduced in value or not. Finally, if the input value of the red sub-pixel is less than that of either the blue or green sub-pixels, then the red sub-pixel is set to the input value of the red sub-pixel divided by the greater of the input values of the blue and green sub-pixels.

The above procedure tests to see if a color is on a given side of the color space, between white (grey) toward a given line of the color space. The procedure sets the undesired color to a value that is generally inversely proportional to the saturation of the desired color. These operations may be done before Mode Stitching or blending. The inverse proportionality need not be exact, and embodiments of the invention include any amount of reduction in these "undesired" colors.

For an RGBW system such as the PenTile RGBW, the code may be thus:

```
R = G = B = W
If B_in < MAX(R_in, G_in)
    Then B = = B_in / MAX(R_in, G_in)
If G_in < MAX(R_in, B_in)
    Then G = G_in / MAX(R_in, B_in)
If R_in < MAX(B_in, G_in)
    Then R = R_in / MAX(B_in, G_in)
```

Thus, for each pixel, a check is first made to determine whether the input value of the blue sub-pixel is less than that of either the red or green sub-pixel. If so, then the blue sub-pixel is set to the input value of the blue sub-pixel divided by the greater of the input values of the red and green sub-pixels. Another check is then performed to determine whether the input value of the green sub-pixel is less than that of either the red or blue sub-pixel. If so, then the green sub-pixel is set to the input value of the green sub-pixel divided by the larger of the input values of the red and blue sub-pixels. Finally, a check is made to determine whether the input value of the red sub-pixel is less than that of either the blue or green sub-pixels. If so, then the red sub-pixel is set to the input value of the red sub-pixel divided by the greater of the input values of the blue and green sub-pixels.

Implementation

```
--get xhi values early, we need them in several places
local xhi1,og1=spr.fetch("xhi1",x,y)
local xhi2,og2=spr.fetch("xhi2",x,y)
local xhi3,og3=spr.fetch("xhi3",x,y)
--these will contain the results, however calculated
local R1o,B1o,C1o,G1o,W1o,L1o
local R2o,B2o,C2o,G2o,W2o,L2o
local R3o,B3o,C3o,G3o,W3o,L3o
    local R,B,C,G,W,L,Og=spr.fetch("gmaA",x,y)    --the GMA
results        ri,gi,bi=spr.fetch(ingam,x,y)  --the RGB values
after ingamma
                --separate storage for xhi for each
primary
        local xr1,xb1,xc1,xg1,xw1=xhi1,xhi1,xhi1,xhi1,xhi1
        local xr2,xb2,xc2,xg2,xw2=xhi2,xhi2,xhi2,xhi2,xhi2
        local xr3,xb3,xc3,xg3,xw3=xhi3,xhi3,xhi3,xhi3,xhi3
        if CYANNESS==1 then
            if ri<math.max(bi,gi) then
                local cnes=ri/math.max(bi,gi)
                xr1=math.floor(xhi1*cnes)
                xr2=math.floor(xhi2*cnes)
                xr3=math.floor(xhi3*cnes)
            end
        end
        if MAGENTNESS==1 then
            if gi<math.max(ri,bi) then
                local mnes=gi/math.max(ri,bi)
                xg1=math.floor(xhi1*mnes)
                xc1=math.floor(xhi1*mnes)
                xg2=math.floor(xhi2*mnes)
                xc2=math.floor(xhi2*mnes)
                xg3=math.floor(xhi3*mnes)
                xc3=math.floor(xhi3*mnes)
            end
        end
        if YELLOWNESS==1 then
            if bi<math.max(ri,gi) then
                local ynes=bi/math.max(ri,gi)
                xb1=math.floor(xhi1*ynes)
                xc1=math.floor(xhi1*ynes)
                xb2=math.floor(xhi2*ynes)
                xc2=math.floor(xhi2*ynes)
                xb3=math.floor(xhi3*ynes)
                xc3=math.floor(xhi3*ynes)
            end
        end
```

Yet another method or mode of operation is to concentrate the brightness of the steady backlight into one of four time slots to effectively become a fourth field of a virtual primary field sequential color system. With four virtual primaries, there may exist the possibility of metamers for desired colors and thus of metamer selection. One possible metamer may be to minimize the virtual primary this is furthest from the desired color. If this minimum is zero, then the color may effectively be reconstructed by only three virtual primaries and may be calculated using the three virtual primary $\chi$ value calculation method described above.

It will be appreciated that this system is one of many possible systems to handle OOG conditions. Other variations of this system are possible and contemplated in the present application. For example, SPR could be implemented/combined in this system as similar to the above. Additionally, many blocks (e.g. GMA, X/X_L) are repeated in FIG. 18; but other embodiments could reuse the same hardware to avoid duplication. Other methodologies of handling OOG conditions are possible as well.

Figure 23:
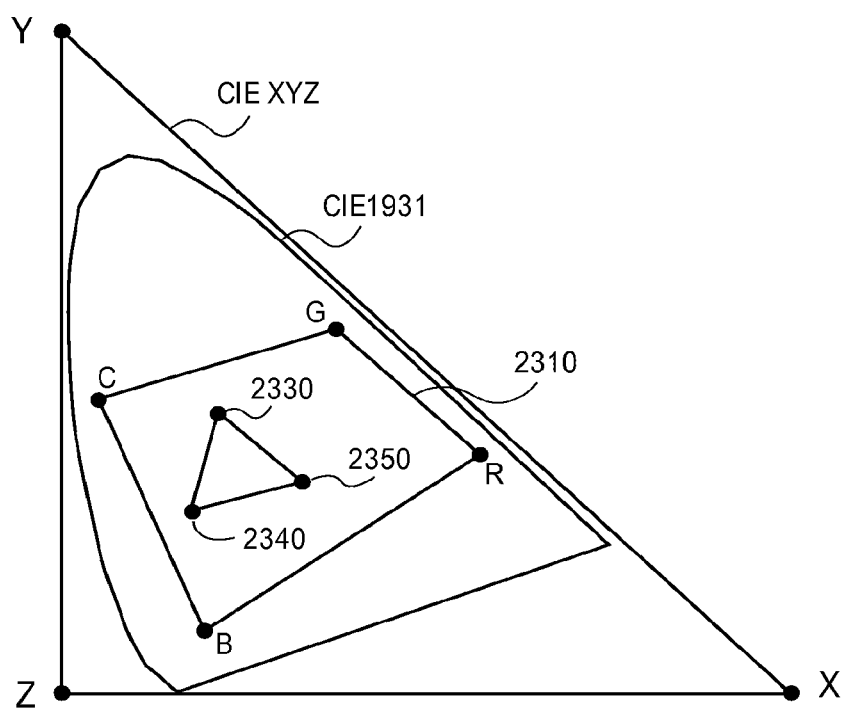
FIG. 23 is a CIE 1931 color chart with superimposed XYZ primaries showing a multiprimary backlight LED gamut and an individual image gamut map smaller than the multiprimary backlight LED gamut.

It will be similarly appreciated that other systems might employ different number of multiprimary backlights—e.g. R,G,B,C LEDs (where C is cyan). The techniques of the above methods could be extended similarly to calculate other chromaticity areas as is needed (e.g. quadrilaterals, triangles or other regions). In FIG. 23, the gamut of allowable colors is expanded using a fourth color LED light emitter. This additional emitter may be substantially cyan colored as discussed earlier. Any set of virtual primaries 2330, 2340, 2350 may be created, for merely one example, with any allowable metameric combination of the color LED emitters. Since the color space that the virtual primaries may take is larger than the traditional RGB primaries, one may use any suitable primaries that will enclose the larger multiprimary color gamut. In another embodiment, this set of primaries may be imaginary. That is to say, that they may be mathematically useful, but physically unrealizable. One such set of primaries is the CIE XYZ primaries. Since any realizable virtual primary may be described as a linear combination of XYZ primaries, the RGB notation in the above calculations may be replaced with XYZ notation with suitable transforms between the color spaces, as is known in the art.

In an embodiment employing FSC techniques, it may be desirable to reduce FSC artifacts, such as color break-up and flicker. One approach may be to have the chromaticity areas not tightly bound to the distribution of colors found within each LED point spread function. Tight binding may give rise to greater disparity in $\chi$ values—possibly causing a greater chance of visible flickering.

Instead, it is possible to select virtual primaries that create a virtual gamut proportionally larger than the distributions of colors found in each LED point spread function. One method may be to move the primaries by some fixed distance or proportional distance toward the original RGB (or RGBC) primaries. Another method may be to find the centroid of the virtual primaries, then move the virtual primaries away from the centroid by some factor of the original distance. Another method may be to find the average value of the colors found in the image within the point spread function. The virtual primaries may be moved away by some factor of the original distance, or they may be moved by some function wherein they are proportionally moved further away when they are originally closer. A further refinement may be to weight brighter colors more than dark colors, as bright colors that have large interfield $\chi$ value modulation will be more likely to cause visible flicker.

As a solid color spanning an entire region of several LED point spread functions has zero distribution, the virtual primaries collapse to the same value. The desirability of using less primaries when possible may be accomplished by setting two or even three of the primaries to the same values. Additional logic may then combine the primaries and their $\chi$ values should remain the same. This combining of primaries where possible increases the temporal frequencies, and thereby reduces artifacts. The smaller the spread of (or distribution of) the desired pixel colors, the more likely this collapsing of virtual primaries.

Another embodiment may be to calculate the $\chi$ value error that is likely to occur as the slow responding liquid crystal display from one state to another to achieve the desired FSC modulation and adjust the virtual primaries to compensate. In such a case, the bright primaries may be made brighter and the dark primaries may be made darker.

Other FSC techniques

It is possible for a FSC backlight system to employ Pulse Width Modulation (PWM) scheme to drive the backlights comprising, for example, LEDs. FIGS. 19A and 19B shows one embodiment of a single Pulse Width Modulation (PWM) cycle for a FSC system to handle OOG conditions. In the example of FIG. 19A, suppose it is desired to exhibit a substantially red color which is slightly desaturated—so the green and blue LEDs are on slightly. Further in this example, suppose the red color to be exhibited is OOG (e.g. by about 2× in this example, as depicted as area A1 in FIG. 19A). The red LED cannot come on bright enough to display it. FIG. 19B shows the virtual primary system at work—instead of displaying R G and B in the three time slots of the PWM cycle, it is displaying primaries P1 (Red), P2 (red-orange) and P3 (dark magenta). It should be noted that the additional areas—A2 and A3—approximately equal the amount of OOG red area A1. So, the red curve in FIG. 19B now includes all the energy of the red input value of FIG. 19A and the color is no longer OOG.

In yet another embodiment, FIG. 20A shows a FSC waveform that produces substantially a white area in an LED backlight with the red, green and blue LEDs coming on sequentially to the roughly same amount. FIG. 20B shows how the same white value can be produced by turning the LED's on at one third the brightness for three times as long in each cycle. This is as if the three virtual primaries P1, P2 and P3 were all set to the same shade of grey. It is quite common for images to be black and white, grey scaled or to have large areas that have no color. It would be advantageous to detect these areas and use monochrome virtual primaries like FIG. 20B because this waveform would have no visible flicker while the waveform of FIG. 20A may have visible flicker. It may not be desirable, however, to generate the waveforms of FIG. 20B. Instead the waveform of FIG. 20C may be used, with the LEDs on proportional to the PWM scheme to produce the desired average brightness in a single FSC cycle. FIG. 20C may tend to have substantially reduced flicker because the flicker frequency is three times that of FIG. 20A and is beyond the range that the human visual system can detect it.

Dynamic Virtual Primary System Having Unfiltered LCD Display

Figure 21A:
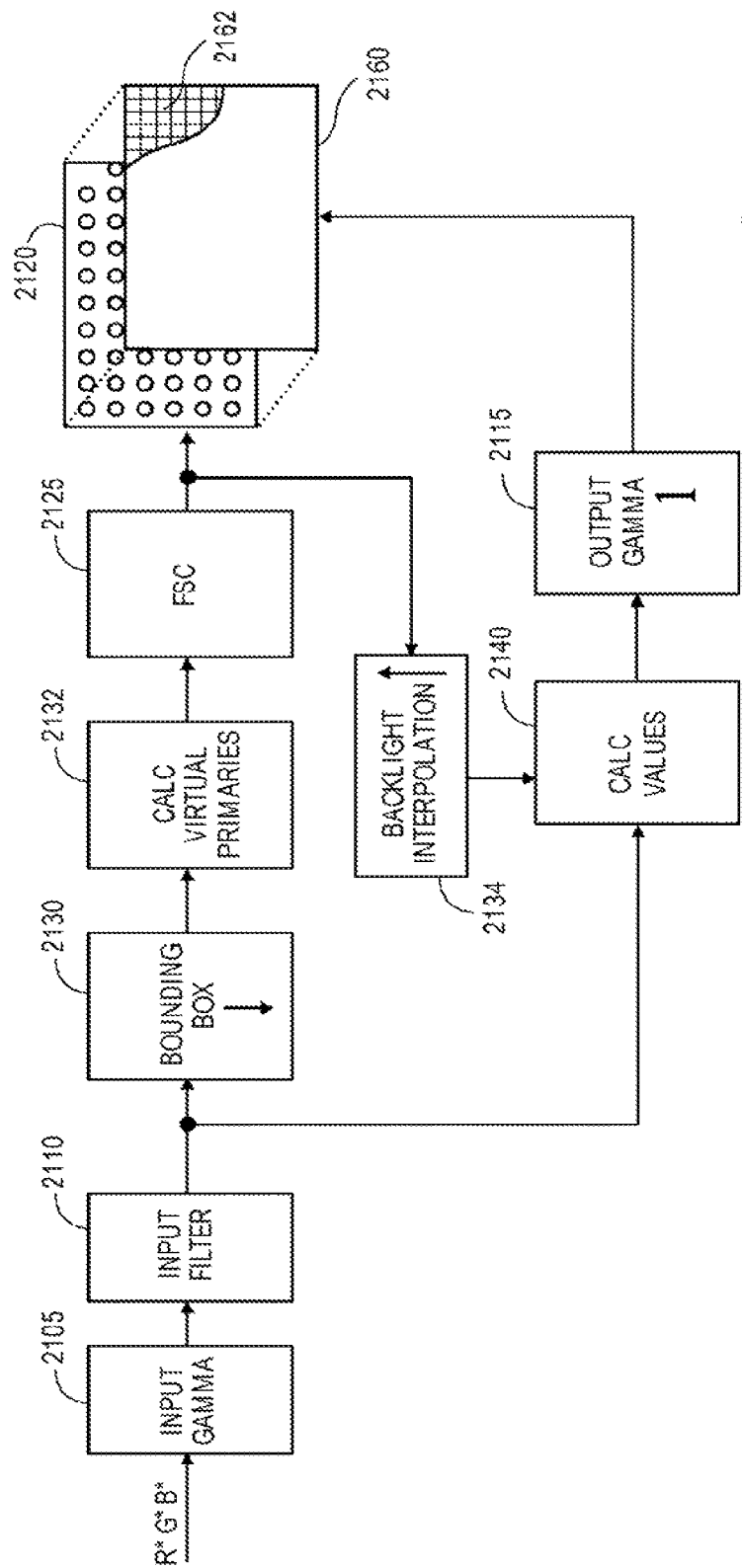
FIG. 21A is a block diagram of a virtual primary field sequential color system.

Another embodiment of the present invention is shown in FIG. 21A, in which there are no color filters in the pixel pattern 2162 in the overlying LCD 2160. This system operates with only "virtual primary field sequential color", as described above. In operation, the R*G*B* perceptually encoded data is linearized by the "Input Gamma" module 2105. An optional Input Filter 2110 may remove noise from the image. The "Bounding Box" module 2130 determines the color gamut map of the colors to be displayed in the point spread function of each of the LEDs. This data is used to calculate the virtual primaries in the "Calc Virtual Primaries" module 2132. These virtual primaries are displayed on the LED backlight array 2120 by the "FSC" module 2125. The "BackLight Interpolation" module 2134 determines the actual color available behind each pixel (i.e. unfiltered subpixel) of the LED 2160 by suitable interpolation and the known point spread function of the LEDs. These values are combined with the RGB image data to calculate the $\chi$ values by the "Calculate $\chi$ Values" module 2140. The $\chi$ values are gamma quantized by the "Output Gamma" module 2115 to those levels available on the LCD 2160.

Figure 21B:
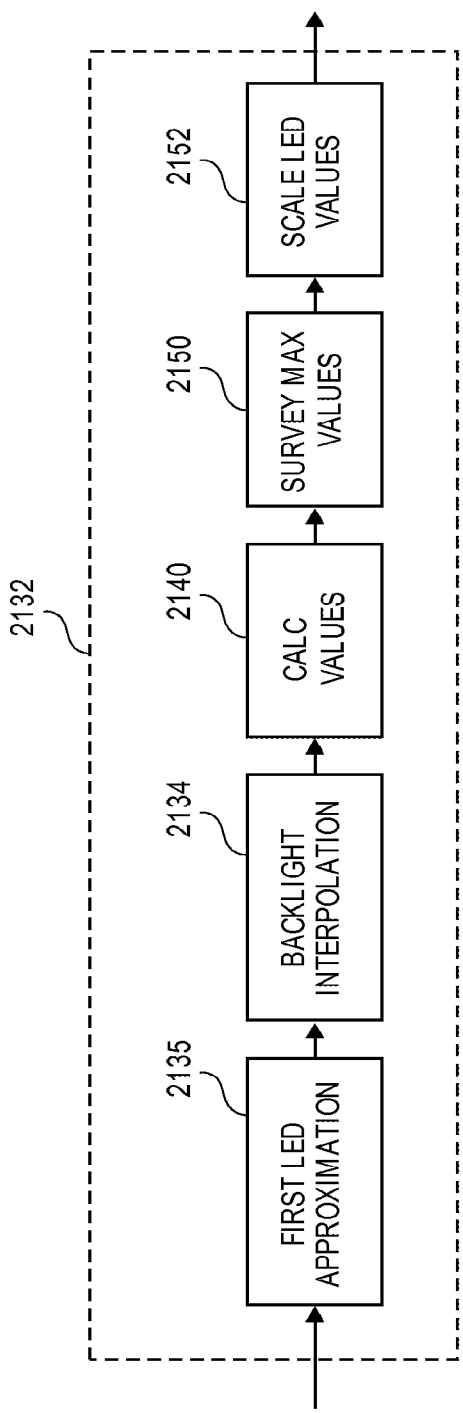
FIG. 21B is an alternative embodiment of the Calc Virtual Primaries module of FIG. 21A

With continued reference to FIGS. 21A and 21B, some example processes are described for the each module. The following discussion assumes some simplifying features of the backlight to simplify the description. For example, the LED backlight 2120 may be constructed to have triplets of red, green and blue LEDs in a rectangular layout with each triplet close enough together to be considered located at a single point. Each LED is assumed to have a rectangular point spread function. For the purpose of merely exposition of a single embodiment, it is assumed that the embodiment is constructed such that 8 LCD pixels are between each LED and that there is an "extra" row of LED's at the edge of the LCD matrix. It will be appreciated that these assumptions will vary for other systems constructed that fall within the scope of the present application.

Noise in the input image, such as speckle, can cause the following steps to decrease the dynamic range of the display or increase the power consumption in the LED backlight. For this reason it may be advantageous to add an optional Input Filter 2110 after Input Gamma module 2105 to remove this noise. Many image noise reduction filters are described in the literature. One embodiment may be to filter the chromatic components in a suitable color space such as YCrCb or CIELAB. This will tend to reduce chromatic noise. Real images often contain information that is not perceptible to the Human Vision System. Such information may cause the virtual primaries to be further apart than strictly needed if that information is found in high spatio-chromatic frequencies. Such chromatic noise is often found in the low light (dark) areas of an image. Filtering out such chromatic noise may allow a tighter, smaller virtual primary gamut with less variation in $\chi$ values, reducing the potential for visible artifacts.

Because Equations 11 and 13 above have many zeros and ones in the matrices, the formula for the intersections of these planes can be greatly simplified. Calculating the actual angle between one of the color planes and an input color point may be computationally difficult, but there are other metrics that are easier to calculate and sort in the same order as angles. The following three equations take an input color (r,g,b) and calculate one such metric:

$$rangle=2*r*MAXCOL/(2*r+g+b)$$

$$gangle=2*g*MAXCOL/(r+2*g+b)$$

$$bangle=2*b*MAXCOL/(r+g+2*b)$$

Where MAXCOL is the maximum integer value of an input color after input gamma conversion in Module 2105. These formulas are simple enough that they may make surveying all the input points inside the point spread function of an LED practical. In Bounding Box module 2130, all the input pixels within the point spread function of an LED are converted to pseudo-angles like this and the minimum (or the maximum) of the pseudo-angle to each axis may be found. With 8 LCD pixels between each LED 2*8*2*8 or 256 input pixels may be surveyed to find the minimum angles for one backlight LED. Substantial savings in computation may be possible by storing intermediate results in line buffers or frame buffers.

Once the minimum angles are found, these may be used in Calc Virtual Primaries module 2132. As described above, the intersection of two of the planes in Equations 11 with the diagonal plane of Equation 13 may result in one of the virtual primaries. When the plane intersection formula are expanded out into algebraic notation, a relatively simple calculation results. Below is the calculation for the virtual primary that is substantially close to the green axis:

$Rp1 = MAXCOL*rmin/(2*MAXCOL-rmin)$ $Gp1 = MAXCOL*gmin/(2*MAXCOL-gmin)$ $Bp1 = MAXCOL*(4*MAXCOL^2-4*MAXCOL*gmin-4*rmin*MAXCOL+3*gmin*rmin)/(rmin*gmin-2*rmin*MAXCOL-2*MAXCOL*gmin+4*MAXCOL^2)$ Where rmin, gmin and bmin are the minimum values from surveying the surrounding input color values with the pseudo-angle formula above. The result of this is the RGB co-ordinate of the virtual primary P1. A similar equation calculates the RGB co-ordinates of virtual primary P2:

$Rp2 = MAXCOL*(4*MAXCOL^2-4*MAXCOL*bmin-4*MAXCOL*gmin+3*gmin*bmin)/(4*MAXCOL^2-2*MAXCOL*bmin-2*MAXCOL*gmin+gmin*bmin)$ $Gp2 = MAXCOL*gmin/(2*MAXCOL-gmin)$ $Bp2 = MAXCOL*bmin/(2*MAXCOL-bmin)$ And third, another set of similar equations calculates the RGB co-ordinates of virtual primary P3:

$Rp3 = MAXCOL*rmin/(2*MAXCOL-rmin)$ $Gp3 = MAXCOL*(4*MAXCOL^2-4*MAXCOL*bmin-4*MAXCOL*rmin+3*rmin*bmin)/(4*MAXCOL^2-2*MAXCOL*bmin-2*MAXCOL*rmin+rmin*bmin)$ $Bp3 = MAXCOL*bmin/(2*MAXCOL-bmin)$ As described above, these virtual primaries may be scaled until they touch the edge of the gamut for a maximum brightness display. Alternatively, they can be scaled to the maximum brightness of the input colors inside the point spread function of the LED. If Bounding Box down-sample module 2130 calculated the maximum brightness while surveying the minimum angles and stored it in variable Lmax, the equations for doing the scaling might take the form:

$Rp1 = Rp1*Lmax/\max(Rp1,Gp1,Bp1)$ $Gp1 = Gp1*Lmax/\max(Rp1,Gp1,Bp1)$ $Bp1 = Bp1*Lmax/\max(Rp1,Gp1,Bp1)$ $Rp2 = Rp2*Lmax/\max(Rp2,Gp2,Bp2)$ $Gp2 = Gp2*Lmax/\max(Rp2,Gp2,Bp2)$ $Bp2 = Bp2*Lmax/\max(Rp2,Gp2,Bp2)$ $Rp3 = Rp3*Lmax/\max(Rp3,Gp3,Bp3)$ $Gp3 = Gp3*Lmax/\max(Rp3,Gp3,Bp3)$ $Bp3 = Bp3*Lmax/\max(Rp3,Gp3,Bp3)$ Also as described above, it may be desirable to limit the total power of each LED. In this example with three virtual primaries, limiting the sum of the red in all three to the maximum color value allowed may result in a duty cycle of ⅓. The same is true for green and blue LEDs. This calculation may not be needed if the sum of the red values in all three virtual primaries is already less than MAXCO. Thus the pseudo-code may take the following form:

```
Div = math.max(Rp1+Rp2+Rp3,Gp1+Gp2+Gp3,Bp1+Bp2+Bp3)
if Div > MAXCOL then
    Rp1 = Rp1*MAXCOL/Div
    Gp1 = Gp1*MAXCOL/Div
    Bp1 = Bp1*MAXCOL/Div
    Rp2 = Rp2*MAXCOL/Div
    Gp2 = Gp2*MAXCOL/Div
    Bp2 = Bp2*MAXCOL/Div
    Rp3 = Rp3*MAXCOL/Div
    Gp3 = Gp3*MAXCOL/Div
    Bp3 = Bp3*MAXCOL/Div
end
```

When an area of the display is substantially monochrome, the virtual primaries may lie close together on a chromaticity diagram and may have substantially identical values. The calculations above may result in the three virtual primaries having values near ⅓ their maximum in each field, but adding up to 100% in a whole frame. However, when an area of the image has high chromatic spatial frequencies, the virtual primaries may be very far apart. In that case, the equations above may allow each virtual primary to have most of its power in one field, since in this case it will be off or low power in the other fields of the same frame.

The power reduction calculations above may work well when the pixels inside the point spread function of an LED are substantially monochrome, but may not find the lowest power in areas with high chromatic spatial frequencies. Another embodiment to decrease the power in the LED backbuffer might be to survey the largest $\chi$ values inside the point spread function of each LED. This maximum $\chi$ value can then be used to scale the LEDs down to the lowest possible values. However, the $\chi$ values may not be calculated until later in Calc $\chi$ Values module 2140. One embodiment may be to have a duplicate Backlight Module 2134 and duplicate Calculate $\chi$ Values module 2140 inside Calc Virtual Primaries module 2132. This is shown in FIG. 21B. First LED Approximation module 2135 would perform the calculations described above for Calc Virtual Primaries Module 2132. The duplicate modules 2134 and 2140 would calculate a first approximation of the $\chi$ values. Then these $\chi$ values may be analyzed by Survey Max $\chi$ Values to find the largest value in the point spread function of each LED. Then the final value of each LED may be calculated by Scale LED Values module 2152. These last two steps could be implemented using the following pseudo-code:

```
for j=0,15 do              --survey the max xhi value in the point
                             spread function (PSF)
   for i=0,15 do           --loop for all pixels in PSF
      local xhi=spr.fetch("LCD",x*8+i-8,y*8+j-8,xbuf)   --fetch the xhi
                                                         value
      maxhi=math.max(maxhi,xhi)                       --find the
                                                         maximum one
   end -- pixels in PSF
end -- lines in PSF
local r,g,b=spr.fetch(ledbuf,x,y)    --read in LED buffer values
maxhi=math.max(MAXCOL,maxhi+floor)   --prevent zero valued
                                        χ determinants D
```

```
r=r*maxhi/MAXCOL           --Scale LED Values
g=g*maxhi/MAXCOL
b=b*maxhi/MAXCOL
spr.store(ledbuf,x,y,r,g,b)   --store them back in LED buffer
```

This process may be repeated for each LED triplet in each of the three fields. This second approximation of the LED values may have substantially reduced values and reduced power consumption.

The embodiment above produces the calculation of the virtual primaries for a single LED in all three fields of a frame. In FIG. 21A these LED values above are passed to FSC module 2125, which may include a small LED frame buffer for storing them.

Backlight Interpolation module 2134 may use the values from the LED frame buffer to calculate the effective backlight color under each pixel 2162 in LCD matrix 2160. It may be possible to do this calculation on the fly as pixels are displayed, or it may be desirable to pre-calculate all the effective backlight colors and store them in another frame buffer. If so, three frame buffers may be used to store the effective backlight colors for all three fields of a single frame. Each location in each of these buffers may be calculated from at most 4 surrounding LEDs in this example configuration. The equations below may use a point-spread function stored in a look-up table named spread. In this example, the values in this table are eight 12 bit integers with 4096 being the encoding for the brightness directly over the LED. The following equations calculates one effective backlight color (rs,gs,bs) for one location (x,y) in one field:

```
xb = x/8
yb = y/8                   --position of a nearby LED
xd = mod(x,7)
yd = mod(y,7)              --distance to a nearby LED center
Rp,Gp,Bp = fetch(xb,yb)    --get upper left LED color
psf = spread[xd]*spread[yd]/4096  --look up point spread function
rs = Rp*psf                --sum upper left LED
gs = Gp*psf
bs = b*psf
Rp,Gp,Bp = fetch(xb+1,yb)  --color of upper right LED
psf = spread[7-xd]*spread[yd]/4096 --PSF for this led and pixel
rs = rs + Rp*psf           --sum upper left LED
gs = gs + Gp*psf
bs = bs + Bp*psf
Rp,Gp,Bp = spr.fetch(ledbuf,xb,yb+1)  --color of lower left LED
psf spread[xd]*spread[7-yd]/4096 --PSF for this led and pixel
rs = rs + Rp*psf           --sum upper left LED
gs = gs + Gp*psf
bs = bs + Bp*psf
Rp,Gp,Bp = fetch(xb+1,yb+1)  --color of lower right LED
psf = spread[7-xd]*spread[7-yd]/4096 --PSF for this led and pixel
rs = rs + Rp*psf           --sum upper left LED
gs = gs + Gp*psf
bs = bs + Bp*psf
rs = rs/4096               --sum was 12-bit precision
gs = gs/4096               --collapse them back to pixel precision
bs = bs/4096
```

A calculation like the pseudo-code above may be performed for each pixel in each field of the frame. The resulting values may be used by the Calc $\chi$ Values module 2140. This module may use the expanded Equation 10 from above to calculate the $\chi$ values for each LCD pixel in all three fields. This equation involves a matrix inversion, however, and not every matrix can be inverted. So first the determinant of the matrix may be calculated and tested to make sure it is not zero. If it is not, then Equation 10 can be used almost exactly as is. In actual use, the pixel values are integers between 0 and the maximum possible value MAXCOL, so an additional factor of MAXCOL is required in each calculation. In the following pseudo-code, the values (R1,G1,B1) is the effective backlight color from the first field at a single location, (R2,G2,B2) and (R3,G2,B3) are the effective backlight colors from the second and third field of a frame. And (R,G,B) is the input color at that location in the display after Input Gamma module 2105.

```
D = R1*G2*B3-R1*B2*G3-R2*G1*B3+R2*B1*G3+R3*G1*
    B2-R3*B1*G2
if D!=0 then
    x1 = ((G2*B3-B2*G3)*R+(R3*B2-R2*B3)*G+
         (G3*R2-R3*G2)*B)*MAXCOL/D
    x2 = ((B1*G3-G1*B3)*R+(R1*B3-B1*R3)*G+
         (R3*G1-R1*G3)*B)*MAXCOL/D
    x3 = ((G1*B2-B1*G2)*R+(B1*R2-R1*B2)*G+
         (R1*G2-G1*R2)*B)*MAXCOL/D
end
```

These calculations may allow a region of the display that is substantially monochrome to display the same value in all three fields of a frame, reducing flicker. This may work with black and white images or areas of an image that are monochromatic in any color. For one examples of this, consider a ramp of red, or a picture taken under red light in a darkroom. Images that have some colored areas and others monochrome may tend to switch to this low-flicker mode inside monochrome areas that are sufficiently far away from colored areas (beyond the point spread function of the LEDs). The calculations above may be done for each input pixel value and passed on to Output Gamma module 2115 and then to LED matrix 2160, the $\chi_1$, $\chi_2$ and $\chi_3$ values each in their own field of the frame.

The system in FIG. 21A allows the backlight array 2120 to be individually controlled. In some embodiments, the LEDs, or other colored light sources, may not be individually spatially controlled, only its overall intensity. In such a case, the point spread function becomes a globally uniform function. The BackLight Interpolation function 2134 becomes redundant. Such a system still shows reduced field sequential color artifacts since most images to be displayed are likely to have a gamut map smaller than the full gamut range of the color primaries of the backlight array 2120. This embodiment may be useful in color projectors in which colored light from controllable sources such as LEDs or laser pumped frequency converters (non-linear optical devices) are intensity modulated in sequential fields.

In the discussion within this present application, a dynamic field sequential display device is described that may suffice if it comprises a backlight, wherein the backlight is capable of illuminating a plurality of colors and a plurality of intensities of said colors, wherein said colors and intensities of said colors may be independently reproducible across a set of regions forming the backlight; and if it further comprises control circuitry for dynamically selecting the color and intensity of the backlight at a given region. This selection may be further dependent upon the input color values at a given region. As may be appreciated, conventional field sequential display devices tend not to have independent controls over both the intensity and color of a region of the image at any given point in time and further such controls are not dependent upon the input color values at a point in time and to optimize for certain operating criteria.

Reduction in Simultaneous Contrast Error

The above described field sequential display device can provide numerous advantages over conventional displays. As one example, field sequential display devices can be operated in ways that reduce various undesirable visual effects, such as simultaneous contrast error. Simultaneous contrast error is a known phenomenon that can occur in many conventional displays. In an image having a region of bright white near another region of a fully saturated color, the saturated color is perceived by the human eye as being darker than it actually is. This is particularly true when the color is a yellow (i.e. a saturated or near-fully saturated yellow).

While in theory it is possible to reduce or eliminate this problem by reducing the area of each W sub-pixel. While this would in principle help reduce the problem of simultaneous contrast error, actual implementation carries with it a number of difficulties. For example, the overall white luminance of the panel would be reduced, requiring compensation by some other approach which may in turn have negative effects. Also, it is in practice difficult and undesirable to manufacture a panel with W sub-pixels that are smaller than other-colored sub-pixels. Also, smaller W sub-pixels would have different capacitive loading than the other sub-pixels, which would make driving difficult.

Accordingly, the display of embodiments of the invention can be programmed to detect a region of a bright (i.e. saturated or near-saturated) color, such as yellow, that is near a region of bright white and, upon detection, the global LED backlight can be rebalanced to favor the bright color. To compensate, the nonclear sub-pixels can also be rebalanced to reduce transmission of the bright color, so as to preserve the desired color temperatures and colors of the panel. For example, if the bright color is a yellow, the brightness values for the backlight are adjusted so that those for the R and G LEDs are increased (producing more yellow), while the gray scale or color values of the nonclear (or non-white) sub-pixels are reduced so as to reduce the transmission of R and G by roughly the same amount. Thus, this method involves tilting the backlight more towards yellow, and adjusting the R and G sub-pixels to compensate. This directs more yellow color through the W sub-pixels and less through the colored sub-pixels, reducing the visual effect of simultaneous contrast error.

This increase in a particular LED color coupled with a corresponding decrease in that color for the sub-pixels can be performed on a global basis, i.e. applied to all LEDs and all colored sub-pixels of the display, or it can be performed on only those areas detected as being susceptible to simultaneous contrast error, i.e. only those areas of bright white and adjacent saturated/near-saturated color. Additionally, the invention contemplates any amount of reduction in backlight brightness, as well as any amount of corresponding increase in transmissivity of nonclear sub-pixels. The amount of reduction in backlight brightness can be exactly equal to the corresponding amount by which nonclear sub-pixels allow light to pass, but these amounts can also be unequal. Finally, the above-described method can be applied not only to yellow colors, but also to any other color, and in particular to any other saturated or near-saturated color. That is, the method(s) can be applied to increase the amount of that color emitted by the backlight given that the backlight is designed to allow for that saturate color deficiency, and to reduce the amount of that same color transmitted by the sub-pixels of the display panel.

Segmented Backlight

Having now discussed various embodiments for display systems having novel backlighting arrangements and methods for operating the same, it will now be described display systems having novel backlights, e.g. segmented, that extend the above described system and methods of operation. These novel backlights may also tend to lower the cost of the backlight for such novel displays as such systems may employ a reduced number of light elements to achieve substantially similar improvements in dynamic contrast and other benefits associated with the array version of such display systems.

Display System Comprising Multiple Segmented Backlight

Figure 25:
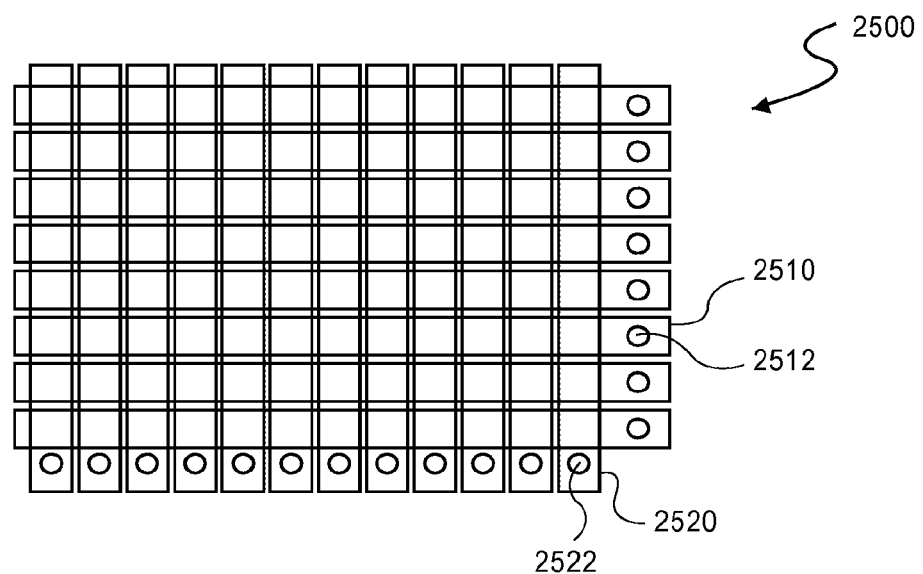
FIG. 25 depicts one embodiment of a novel segmented backlight for use in a display.

As discussed above, the backlight of many embodiments may comprise an array of emitters (e.g. backlight 120 of FIG. 1A) operated as a low resolution imaging device that is convolved with a higher resolution LCD overlying it. To achieve a given N×M backlight resolution, N×M number of emitters 122 (or cluster of emitters for color or added brightness) is needed in array-type configurations. In contrast, referring to FIG. 25 which shows one embodiment of the present invention, novel backlight 2500 may achieve approximately N×M resolution by using approximately N+M number of emitters 2512 & 2522. The manner in which this may be achieved and the methods by which this novel backlight 2500 may be operated will be explained below.

Figure 26:
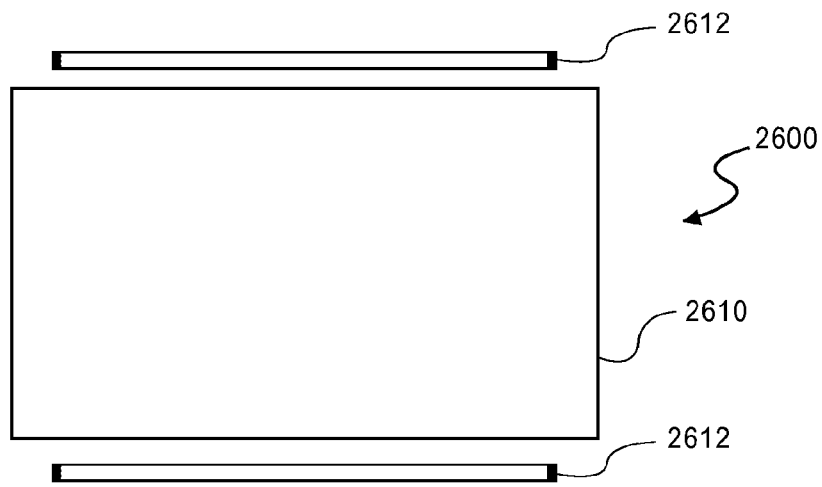
FIG. 26 depicts a conventional backlight comprising a light guide and two emitters.

Consider the prior art backlight 2600 shown in FIG. 26. It is comprised of a flat light guide 2610 and two light emitters 2612. The flat light guide 2610 includes features on at least one surface features to frustrate the total internal reflection, redirecting light toward an overlying spatial light modulator. The light emitters 2612 may be cold cathode fluorescent lamps (CCFL) as is commonly used in the art or other suitable light emitters such as Light Emitting Diodes (LED).

As taught in U.S. Pat. No. 5,717,422 to Fergason entitled "Variable Intensity High Contrast Passive Display" (and included herein by reference), the brightness of the light emitters 2612 may be controlled so as to dim the backlight 2600 in response to an image with less than full brightness while the overlying spatial light modulator, such as an LCD, is adjusted to allow more light to pass. The convolution of the reduced backlight 2600 brightness and increased transmittance of the spatial light modulator may maintain the desired image brightness while reducing light emitter 2612 power requirements and concomitantly increasing contrast of the spatial light modulator. However, if even a single pixel in the input image is at full brightness, the backlight emitter 2612 brightness must be also at full brightness if the image is to be reproduced with full fidelity.

Figure 27:
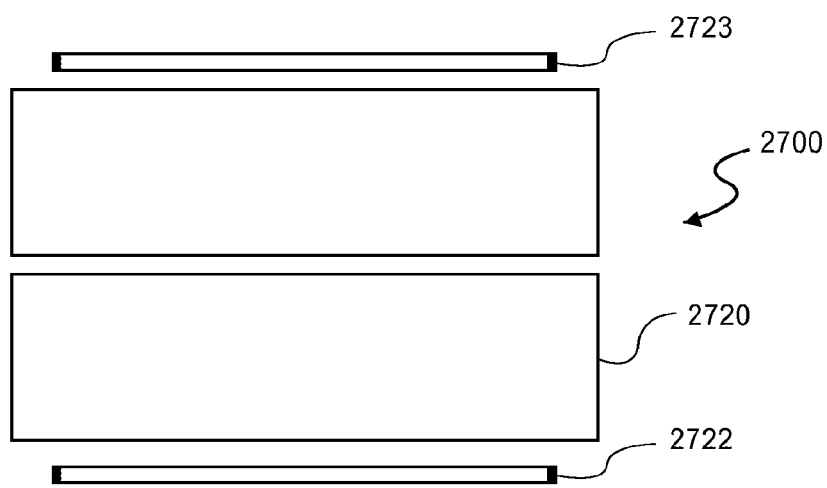
FIG. 27 depicts one embodiment of an improved backlight over the convention backlight of FIG. 26.

One embodiment of an improved backlight is depicted in FIG. 27. As may be noted, backlight 2700 is divided in two (or possibly more) optically separate light guides 2720 and 2721 that are coupled to light emitters 2722 and 2723 respectively. This may allow the light emitters 2722 and 2723 to have different brightness levels at a same time. Thus, if one pixel in half of the image is at full brightness, but the other half of the image is at a lower brightness, at least that half of the image may allow for a lower light emitter brightness. Statistically, this arrangement may allow for lower overall average light emitter brightness and power drain with potential concomitant image improvement.

Figure 28:
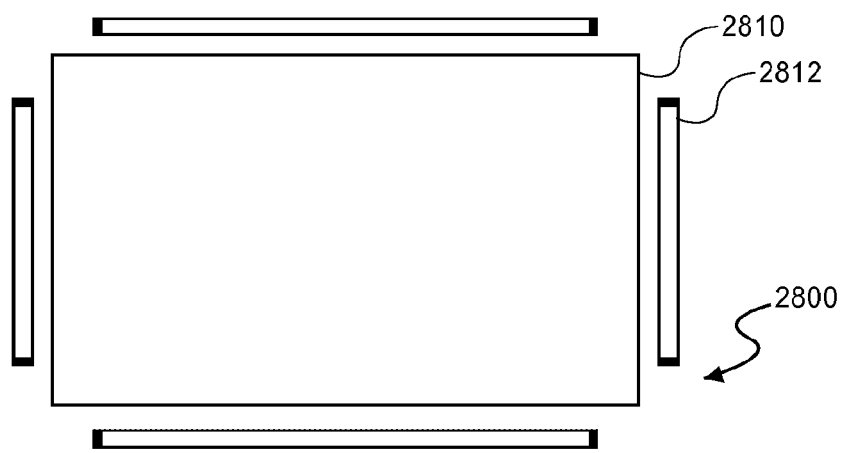
FIG. 28 depicts a conventional backlight comprising a light guide and four emitters.
Figure 29:
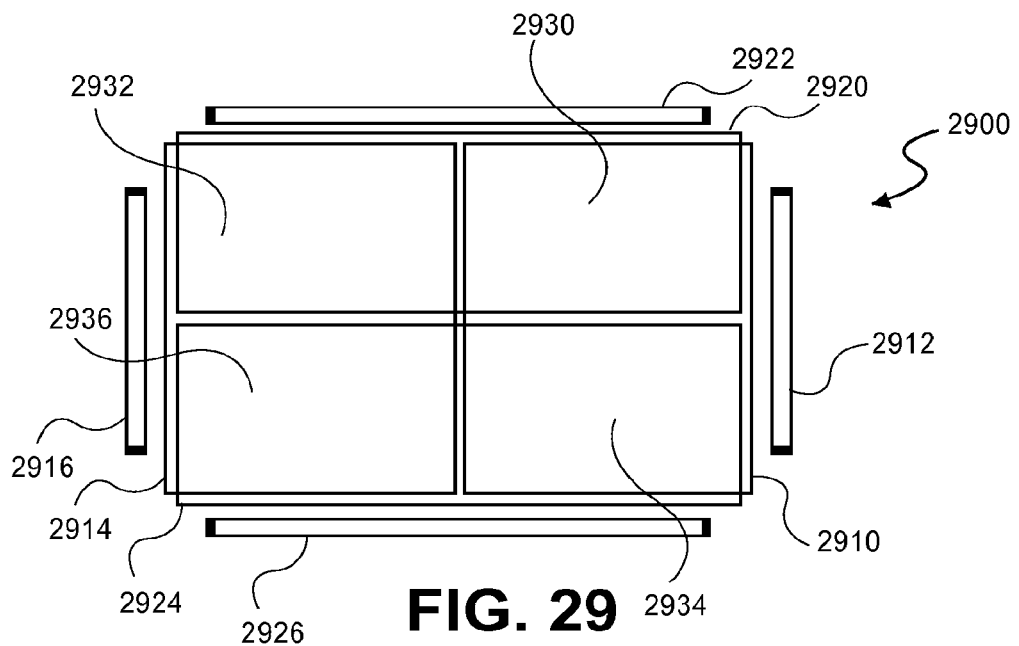
FIG. 29 depicts one embodiment of an improved backlight over the convention backlight of FIG. 28.

The process of segmenting the backlight may proceed further to increase the statistical improvement. FIG. 28 show a prior art backlight 2800 arrangement which is comprised of a flat light guide 2810 and four light emitters 2812. As before the light emitters 2812 may be CCFLs or LEDs. Novel backlight 2900 shown in FIG. 29 comprises four optically separate light guides 2910, 2914, 2920 & 2924. Light emitters 2912, 2916, 2922, & 2926 may then be exclusively coupled to light guides 2910, 2914, 2920 & 2924 respectively. For example, one pair of light guides 2920 & 2924 are divided along the horizontal axis, allowing for separation of the lower and upper half brightness level by independently controlled and exclusively coupled light emitters 2922 & 2926. Another pair of light guides 2910 & 2914 may lay either beneath or on top or pair 2922 & 2926. This pair of light guides 2910 & 2914 is divided along the vertical axis, allowing for separation of the right and left half brightness level by independently controlled exclusively coupled light emitters 2912 & 2916. This may allow all four of the light emitters 2912, 2916, 2922, & 2926 to have different brightness levels.

In operation, if one pixel in a quarter (e.g. in 2930) of the image were at full brightness, but the other three quarters of the image were at a lower brightness, at least that portion of the image may allow for a lower light emitter brightness. For example, suppose an image has a number of pixels on at full brightness in just one corner of the image, and the rest of the image is at a very low brightness. Assume that the full bright portion of the image occurs in the upper right corner. The upper light emitter 2922 and the right hand emitter 2912 would be turned on to full brightness while the lower light emitter 2926 and left hand emitter 2916 would be set at the very low brightness. The upper right hand quadrant 2930 would be illuminated at full brightness. The upper left hand 2932 and lower right hand 2934 quadrants would be illuminated at an intermediate brightness. The lower left hand quadrant 2936 would be illuminated at a very low brightness. Statistically, this arrangement may allow for lower overall average light emitter 2912, 2916, 2922, & 2926 brightness and power drain than the backlight 2800 in FIG. 28 with potential concomitant image improvement over the backlight 2700 in FIG. 27.

Likewise, the process of segmenting may proceed further to increase the statistical improvement of power and image quality. Shown in FIG. 30, a backlight 3000 may be formed from a matrix of overlapping light guides. In this example of the present invention, each quadrant is an independent matrix of light guides. Some number of the light guides 3020 with exclusively coupled light emitters 3022 could be primarily disposed in columns while some other number of the light guides 3010 with exclusively coupled light emitters 3012 could be primarily disposed in rows.

Figure 30:
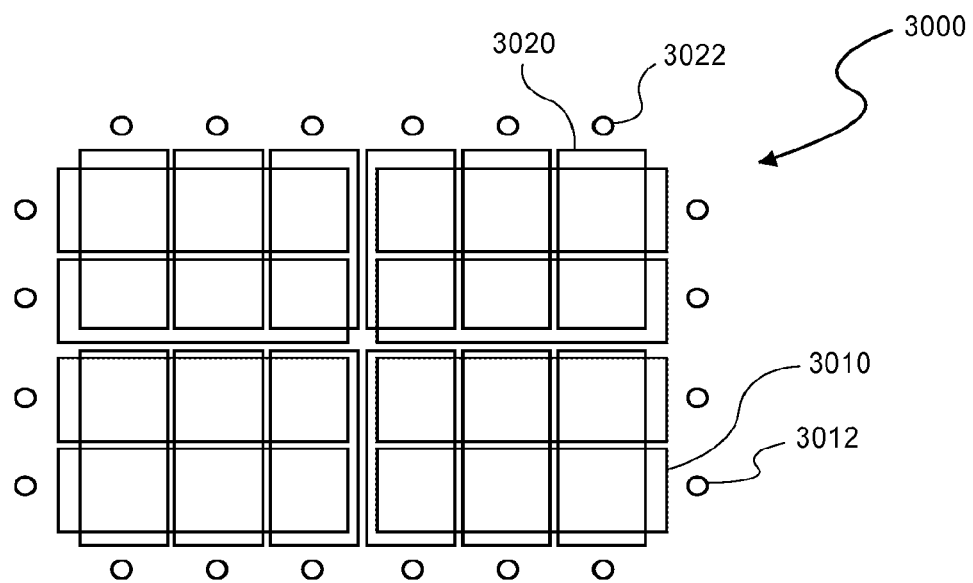
FIG. 30 depicts another embodiment of a novel segmented backlight for use in a display.

In this embodiment, to achieve approximately a N×M low resolution backlight, it is seen in FIG. 30 that this may be achieved by use of 2×(N+M) light guides and emitters—with two columns (e.g. at the right and left side of the backlight 3000) and two rows (e.g. at the top and bottom of backlight 3000) of emitters. In yet another embodiment, a similar N×M low resolution backlight is possible with the use of N+M light guides and emitters. This is achieved by use of only one column (e.g. at either the right or left side of the backlight) and one row of emitters (e.g. either the top or bottom of the backlight) and one light guide per row and column. Such an embodiment has the same number of matrix cross connections at the row and column intersections and may be a lower cost option. However, it may lose a bit of the statistical advantages of the backlight of FIG. 30 and the commensurate gain in power consumption. Additionally, as previously noted, emitters 3022 may be either white emitters or a combination of one or more colored emitters. Other embodiments making use of these principles are of course possible and are contemplated within the scope of the present application.

Figure 31:
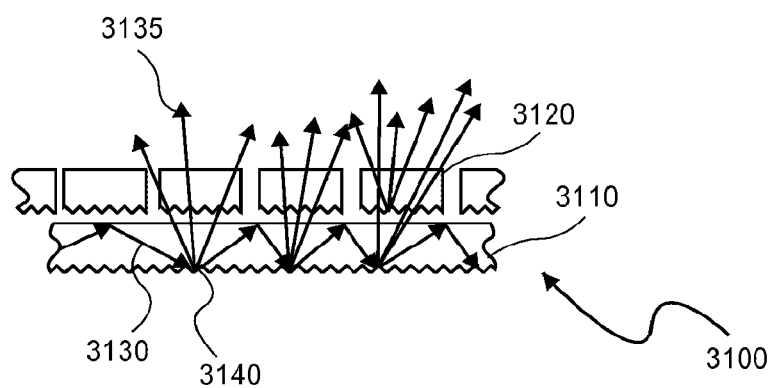
FIG. 31 shows a cross sectional view of across one light guide in one embodiment of a novel segmented backlight.

FIG. 31 shows a cross section of a backlight 3100 with one light guide 3110 primarily disposed in a row lying underneath a plurality of light guides 3120 disposed in columns. In the cross section of the backlight 3100, light ray beam 3130 is trapped in the light guide 3110 by total internal reflection until portions of the light rays 3135 are scattered, deflected into high angles that may escape by features 3140 on one surface of the light guide. These escaping light rays 3135 may pass through the overlying column light guides 3120. Likewise, light may also be trapped and subsequently scattered by the overlying light guides 3120. In operation, where both light guides are illuminated at full brightness, the scattered light from both light guides 3110 & 3120 will sum to full brightness. Where both are not illuminated, no light may be seen at their intersections. Where one light guide is illuminated and another is not, the light will sum to a lower value equal to the contribution from the illuminated light guide. Thus, a backlight made in accordance with the principles disclosed herein (e.g. backlight 200) may be considered, by analogy, as an N×M display with very high crosstalk in the rows and columns.

Figure 32A:
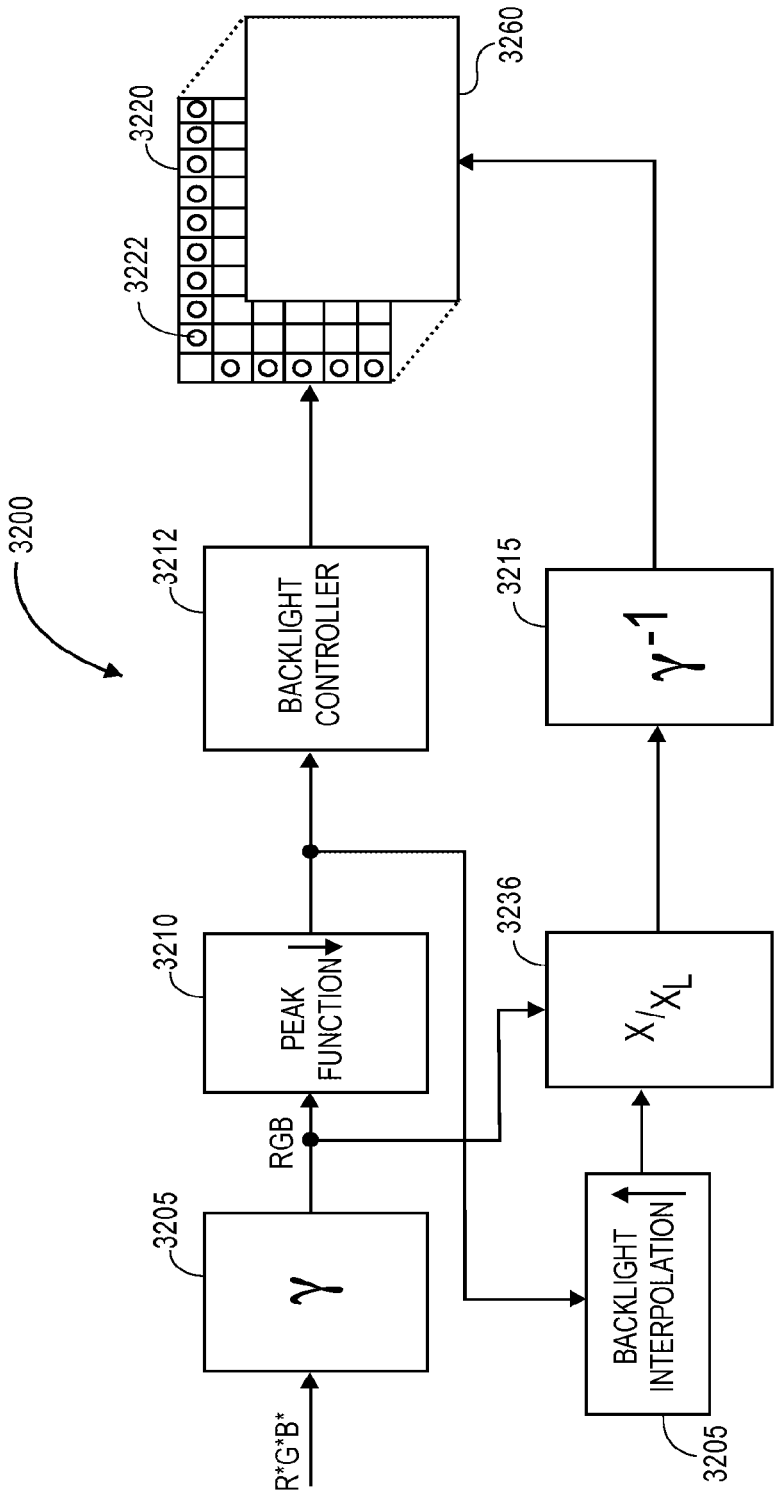
FIGS. 32A and 32B depict two display systems comprising novel segmented backlights in connection with a monochrome and a multiprimary colored front panel respectively.
Figure 32B:
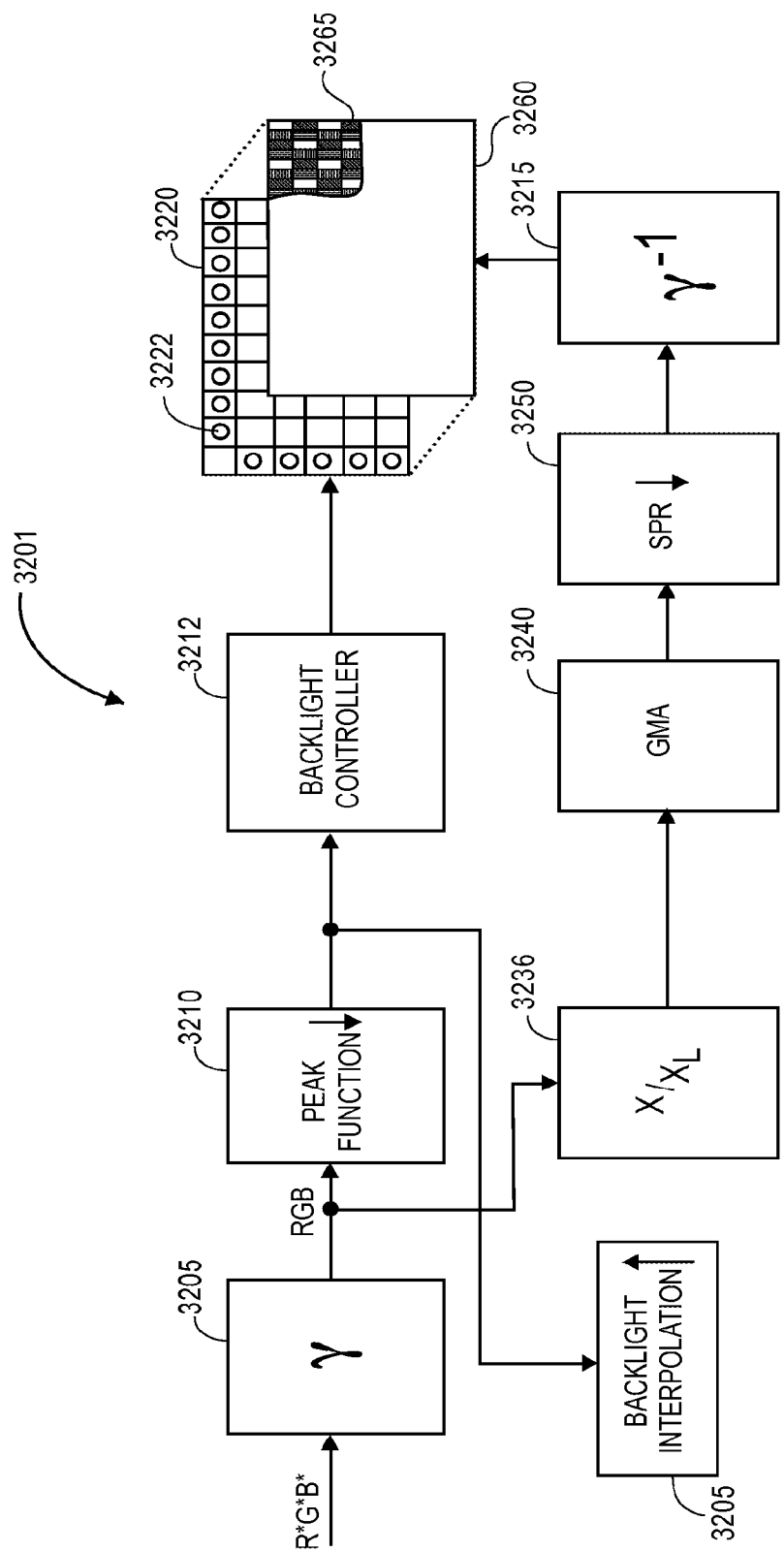
Figure 33:
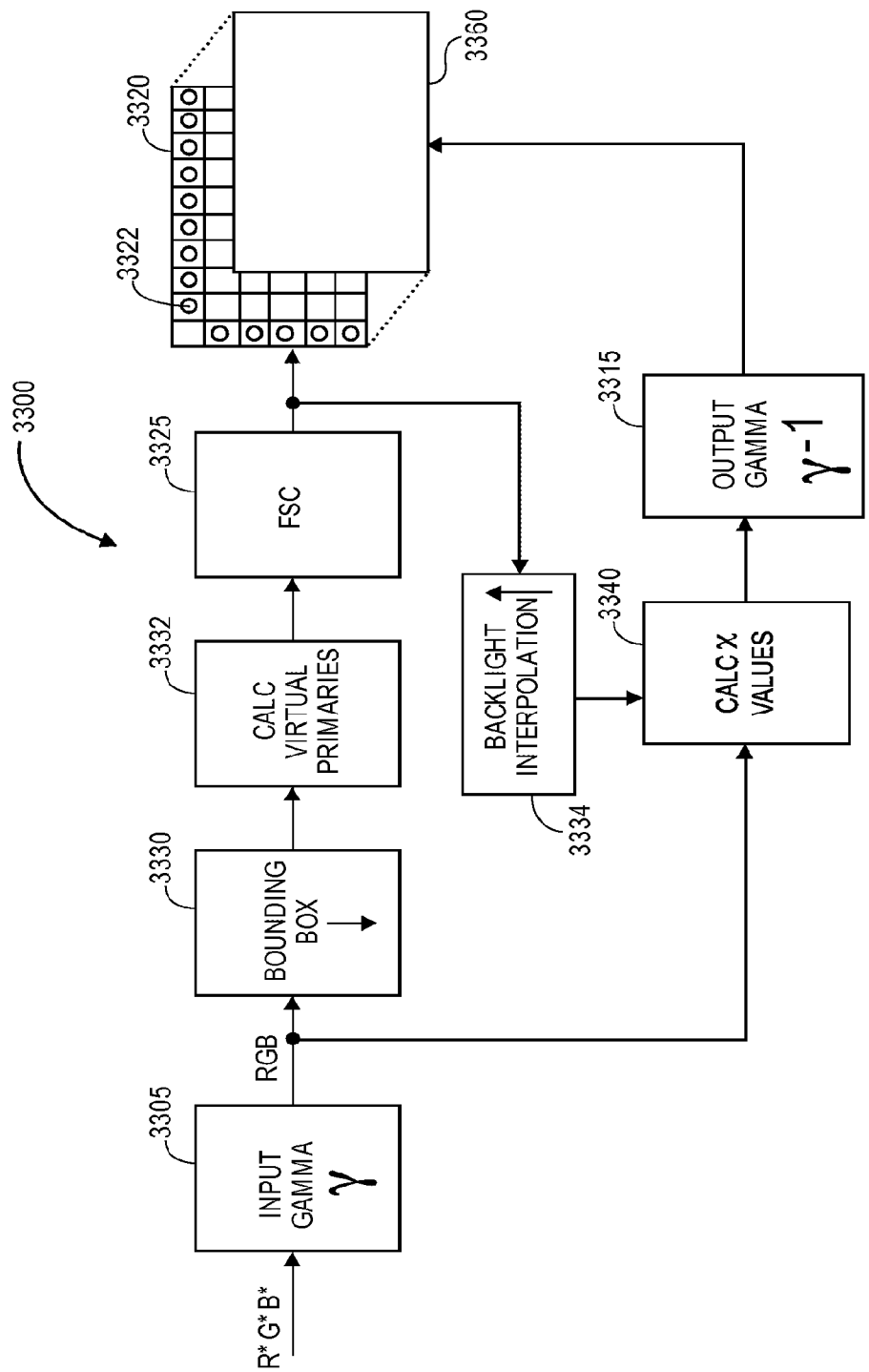
FIG. 33 depicts a display system comprising a novel segmented backlight in connection with a hybrid virtual primary-field sequential control system and methodology.

Such a segmented backlight with very high crosstalk may be advantageous for variety of display systems. For example, FIGS. 32A and 32B are two block diagrams of display systems might employ such a backlight, one with a monochrome front panel and one with a colored subpixelated front panel respectively. FIG. 32A depicts the block diagram of display system 3200 using a segmented backlight 3220 to illuminate a transmissive spatial light modulator 3260, such as a monochrome LCD. Typically, the spatial light modulator 3260 would be higher resolution than backlight 3220, but may be the same or even lower.

In operation, system 3200 could accept an input image data stream, such as e.g. a perceptually, gamma, digitally quantized R*G*B* image. Such data may be linearized by Gamma Function 3205. This linear RGB signal may be surveyed by Peak Function 3210 to find the peak brightness values of for pixels that map to, or lie within the area illuminated by, the rows and columns of the matrix backlight 3220. In one embodiment, light emitters 3222 could be broad spectrum, for instance, white light sources. In such a case, the RGB values may be surveyed for the maximum red, green, or blue values that map to each given column and each given row.

In another embodiment, light emitters 3222 could be comprised of independently controllable color primaries such as red, green, and blue. In such a case, the RGB values may be surveyed for the maximum red, green, and blue values that map to each given column and each given row independently. When the image to be rendered during a given frame is analyzed prior to assigning intensity values to individual colored emitters, there are certain degrees of freedom and constraints that may be taken into account. For merely one example, if in row M the maximum value for red across row M required by the image is a middle range intensity value and such maximum value is localized to, for example, one particular intersection of orthogonal light guides (say at (M, S) where S is the column number of that intersection), then that red intensity may be split between the red emitter for row M and the red emitter for column S.

One possible assignment of intensity values would be to set the red emitters of both column S and row M sufficiently such that each would separately contribute the required red intensity value at intersection (M,S)—and allow the front panel to restrict the amount of red light to the proper required level. However, such a choice might not be optimal from a power savings perspective. Another embodiment might be to assign all the red light from one red emitter (either row or column, if possible) and to reduce the amount in the other emitter. In such an embodiment, the uses of second order statistics might provide an improvement. For example, if it were the case that the middle range intensity value for red at (M, S) were also the local maximum across column S, then choice of red intensity for the two red emitters may be influenced by the next highest red intensity value required for column M and row S. The choice of intensity values for colored emitters would selected according to many possible optimization schemes—with the process optimizing for many possible metrics, e.g. power savings, etc.

In addition to spatial considerations for assigning intensity values, temporal consideration may also be used—either alone or in combination with spatial considerations. For example, another mode of operation may be to scan rows or columns with the desired illumination. For example, the columns may be kept dark save for one column at a time, being illuminated for a brief time. This may proceed in an ordered or random fashion. It may be in an orderly sequence from top to bottom or bottom to top. Similarly, the rows may be scanned in an ordered or random fashion. It may be in an orderly sequence from right to left or left to right. This scanning sequence may be in phase or step with the address scanning of the spatial light modulator illuminated by the backlight such that it allows the modulator, such as LCD pixels, to reach desired transmittance values before being illuminated.

With continued reference to FIG. 32, Peak Function 3210 output may be a form of matrix encoded down sampled image, denoted by the down arrow. The peak values may then be sent to Backlight Controller 3212 and subsequently to the light emitters 3222 of the backlight 3220. The peak values may also be sent to Backlight Interpolation block 3205 which may calculate the illumination that is present under each pixel of the image to be rendered on the spatial light modulator 3260. Such calculations may be accomplished according to a theoretical model of illumination based upon image data values. Alternatively, the calculations may be based on empirical data of measured illumination according to image data values applied.

Backlight Interpolation 3205 output may be an upsampled image denoted by the up arrow representing the backlight 3220 illumination $X_L$. The linear RGB image values X may then be divided by the interpolated backlight illumination values $X_L$ in the $X/X_L$ block 3236. The $X/X_L$ image may then be gamma correction quantized to match the gamma of the display in the Gamma Correction ($\gamma^{-1}$) block 3215. When the backlight 3220 illumination $X_L$ is convolved with the $X/X_L$ image on the spatial light modulator 3260, the desired image X may then be reconstructed.

The matrix backlight may also improve subpixel rendered RGBW or other multiprimary display systems. FIG. 32B depicts a block diagram of a display system 3201 using segmented backlight 3220 to illuminate a transmissive multiprimary (e.g. RGBW, RGBC, RGBY and the like) color filtered 3265 spatial light modulator 3260 such as an LCD using one of the layouts taught in several of the co-owned patent applications mentioned above. An incoming perceptually, gamma, digitally quantized R*G*B* image is linearized by the Gamma Function 3205. The linear RGB signal is surveyed by the Peak Function 3210 to find the peak brightness values of pixel that map to, lie within the area illuminated by, the rows and columns of the matrix backlight 3220. For light emitters 3222 that are broad spectrum, for instance, white light sources, the RGB values may be surveyed for the maximum red, green, or blue values that map to each given column and each given row in a manner taught in (new backlight control app). For light emitters 3222 which are comprised of independently controllable color primaries such as red, green, and blue, the RGB values may be surveyed for the maximum red, green, and blue values that map to each given column and each given row independently. The Peak Function's 3210 output could be in a form of matrix encoded down sampled image, denoted by the down arrow. The peak values may then be sent to the Backlight Controller 3212 and subsequently to the light emitters 3222 of the backlight 3220. The peak values may also be sent to the Backlight Interpolation block 3205 which calculates the illumination that is present at each pixel of the image to be rendered on the spatial light modulator 3260.

The Backlight Interpolation's 3205 output may be an upsampled image denoted by the up arrow representing the backlight 3220 illumination $X_L$. The linear RGB image values X may be divided by the interpolated backlight illumination values $X_L$ in the $X/X_L$ block 3236. The RGB $X/X_L$ image may then be converted to an RGBW $X/X_L$ image in the Gamut mapping (GMA) block 3240 using any suitable GMA method. This RGBW $X/X_L$ image may then be subpixel rendered, possibly using any suitable method described herein. The subpixel rendered RGBW $X/X_L$ image may then be gamma correction quantized to match the gamma of the display in the Gamma Correction ($\gamma^{-1}$) block 3215. When the backlight 3220 illumination $X_L$ is convolved with the subpixel rendered RGBW $X/X_L$ image on the spatial light modulator 3260, the desired image X may be reconstructed.

The matrix backlight may also improve Field Sequential Color systems. Consider the block diagram 3300 of a display system using a segmented backlight 3320 to illuminate a transmissive spatial light modulator 3360. An incoming perceptually, gamma, digitally quantized R*G*B* image may be linearized by the Gamma Function 3305. The linear RGB signal may be surveyed by the Bounding Box block 3330 to find the smallest box that bounds the color and brightness values of pixels that map to, lie within the area illuminated by, the rows and columns of the matrix backlight 3320. The values from the Bounding Box block 3330 may be used to calculate a set of virtual primaries in the Calc Virtual Primaries block 3332. These virtual primary values may then be used by the FSC to control the field sequential color brightness values of the light emitters 3322 in the segmented backlight 3320. It may be noted that these emitters may be comprised of red, green, blue LEDs, or red, green, blue, and cyan (or emerald green) LEDs in this or in any herein mentioned embodiment. The color and brightness of the light emitters 3320 may also be sent to the Backlight Interpolation block 3334 which calculates the illumination that is present under each pixel of the image to be rendered on the spatial light modulator 3360.

The Backlight Interpolation's 3334 output may be an upsampled image denoted by the up arrow. Using the interpolated illumination and linear RGB values to be rendered, the $\chi$ values are found by the Calc $\chi$ Values block 3340. These $\chi$ values are the relative transmission values that when convolved with the backlight illumination values for each of the color fields may sum substantially to the desired color to be rendered on the display. The $\chi$ values may be gamma corrected and quantized to match the transmissive spatial light modulator's 3360 quantized electro-optical transfer function by the Output Gamma block 3315.

It may be instructive to consider the case of a black&white movie on TV with a color station icon in the corner. Most of the columns and rows of the matrix light backlight 3320 will have virtual primaries that collapse to varying levels of grey. The column(s) and row(s) that intersect at the icon may have virtual primaries that have a large color gamut. At the intersection, this gamut may be substantially fully available. Those portions of each of the column(s) and row(s) that intersect with the columns and rows illuminated by levels of grey may blend in a substantially linearly manner with the wide color gamut virtual primaries to form pastel virtual primaries with a reduced color gamut spread. The Backlight Interpolation block 3334 will note this and the Calc $\chi$ Values block 3340 will compensate accordingly. The final result may be a black&white image with a substantially full color icon in the corner, possibly with very little, if any, color break-up visible in the rendered image.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on one or more computer-readable media for execution by, or to control the operation of, a data processing apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing instructions of one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. A computer can be embedded in another device, e.g., a display such as described above, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While the techniques and implementations have been described with reference to exemplary embodiments, it will be understood by those skilled in the art that various changes may be made and equivalents may be substituted for elements thereof without departing from the scope of the appended claims. In addition, many modifications may be made to adapt a particular situation or material to the teachings without departing from the essential scope thereof. Therefore, the particular embodiments, implementations and techniques disclosed herein, some of which indicate the best mode contemplated for carrying out these embodiments, implementations and techniques, are not intended to limit the scope of the appended claims.

What is claimed is:

1. A method of facilitating the display of an image, comprising:
    in a display system comprising a display panel having sub-pixels and a backlight having individually addressable colored light emitters configured to provide light to the sub-pixels of the display panel, receiving image data corresponding to an image for display upon the display panel, the sub-pixels each having a color to be displayed;
    from the image data, determining sub-pixel color values corresponding to color values transmitted by respective ones of the sub-pixels for display of the image;
    from the image data, determining backlight values corresponding to brightnesses of ones of the colored light emitters for display of the image;
    determining a portion of the sub-pixel color values and a portion of the backlight values that collectively correspond to a saturated or near-saturated yellow color proximate to a white color in the displayed image;
    in response to the determining, adjusting the backlight values by increasing an amount of yellow light to be emitted by emitters of the backlight; and
    in response to the determining, adjusting the color values by decreasing an amount of yellow light to be transmitted by the sub-pixels of the display panel.

2. The method of claim 1, further comprising:
    displaying the image using the adjusted backlight values and the adjusted color values.

3. The method of claim 1, wherein an amount of yellow light added by the increasing is at least approximately equal to an amount of yellow light reduced by the decreasing.

4. The method of claim 1, wherein the adjusting backlight values further comprises increasing an amount of red light to be emitted by red emitters from among the emitters of the backlight, and increasing an amount of green light to be emitted by green emitters from among the emitters of the backlight.

5. The method of claim 4, wherein the adjusting color values further comprises decreasing an amount of red light to be transmitted by red sub-pixels of the sub-pixels of the display panel, and decreasing an amount of green light to be transmitted by green sub-pixels of the sub-pixels of the display panel.

6. The method of claim 1, wherein the adjusting backlight values further comprises increasing an amount of yellow light so as to increase an amount of yellow light transmitted through white sub-pixels of the sub-pixels of the display panel.

7. The method of claim 1, wherein the colored light emitters include emitters of multiple different colors.

8. The method of claim 7, wherein the colored light emitters include red, green, blue, and white color emitters.

9. A method of reducing simultaneous contrast error in a displayed image, the method comprising:
    in a display system comprising a display panel having colored sub-pixels and white sub-pixels, and a backlight having individually addressable colored light emitters configured to provide light to the sub-pixels of the display panel, receiving image data corresponding to an image for display upon the display panel;

detecting a region of a saturated or near-saturated color proximate to a region of a white color in the image;

in response to the detecting, increasing an amount of the color to be emitted by the emitters of the backlight, so as to increase an amount of the color to be transmitted by the white sub-pixels of the display panel; and in response to the detecting, decreasing an amount of the color to be transmitted by the colored sub-pixels of the display panel, so as to compensate for the increased amount of the color to be transmitted by the white sub-pixels of the display panel;

wherein the color is a yellow color.

10. The method of claim 9, further comprising:

after the increasing and the decreasing, displaying the image.

11. The method of claim 9, wherein an amount of the color added by the increasing is at least approximately equal to an amount of the color reduced by the decreasing.

12. The method of claim 9, wherein the increasing further comprises increasing an amount of red light to be emitted by red emitters from among the emitters of the backlight, and increasing an amount of green light to be emitted by green emitters from among the emitters of the backlight.

13. The method of claim 12, wherein the decreasing further comprises decreasing an amount of red light to be transmitted by red sub-pixels of the display panel, and decreasing an amount of green light to be transmitted by green sub-pixels of the display panel.

14. The method of claim 9, wherein the colored light emitters include emitters of multiple different colors.

15. The method of claim 14, wherein the colored light emitters include red, green, blue, and white color emitters.

\* \* \* \* \*